(12) United States Patent
Zeira

(10) Patent No.: US 12,516,206 B2
(45) Date of Patent: Jan. 6, 2026

(54) EDIBLE INK FORMULATIONS, ARTICLES OF MANUFACTURE, AND RELATED METHODS OF FORMING IMAGES BY DROPLET DEPOSITION

(71) Applicant: RIPPLES LTD, Petah Tikva (IL)

(72) Inventor: Assaf Zeira

(73) Assignee: RIPPLES LTD, Petach Tikva (IL)

( * ) Notice: Subject to any disclaimer, the term of this patent is extended or adjusted under 35 U.S.C. 154(b) by 249 days.

(21) Appl. No.: 17/924,209

(22) PCT Filed: May 17, 2021

(86) PCT No.: PCT/IB2021/000327
§ 371 (c)(1),
(2) Date: Nov. 9, 2022

(87) PCT Pub. No.: WO2021/234448
PCT Pub. Date: Nov. 25, 2021

(65) Prior Publication Data
US 2023/0183504 A1 Jun. 15, 2023

Related U.S. Application Data

(60) Provisional application No. 63/026,038, filed on May 16, 2020.

(51) Int. Cl.
*C09D 11/32* (2014.01)
*A23G 3/34* (2006.01)
(Continued)

(52) U.S. Cl.
CPC ............ *C09D 11/32* (2013.01); *A23G 3/0089* (2013.01); *A23L 2/58* (2013.01); *A23L 5/43* (2016.08);
(Continued)

(58) Field of Classification Search
CPC ......... C09D 11/32; C09D 11/30; C09D 11/50; C09D 11/38; C09D 11/101; C09D 11/102;
(Continued)

(56) References Cited

U.S. PATENT DOCUMENTS

| | | |
|---|---|---|
| 7,166,154 B2 | 1/2007 | Barreto |
| 2002/0008751 A1* | 1/2002 | Spurgeon ........... H04N 1/00127 |
| | | 347/106 |

(Continued)

FOREIGN PATENT DOCUMENTS

| | | |
|---|---|---|
| CA | 3128912 A1 | 11/2020 |
| CN | 209431215 U | 9/2019 |

(Continued)

OTHER PUBLICATIONS

Colorant alimentaire en poudre rose fluo 3g—ScrapCooking [May 18, 2018].

(Continued)

*Primary Examiner* — Manish S Shah
(74) *Attorney, Agent, or Firm* — Momentum IP; Marc Van Dyke

(57) ABSTRACT

Embodiments of the invention relate to edible ink formulations comprising a fluorophore (e.g. riboflavin phosphate), articles of manufacture (e.g. an ink-jet cartridge containing any edible ink formulation(s) disclosed herein), methods for printing on a edible substrates (e.g. food or beverage) using any edible ink formulation(s) disclosed herein. Methods for manufacturing the edible ink formulation are also provided.

20 Claims, 46 Drawing Sheets

(51) Int. Cl.
| | |
|---|---|
| A23L 2/58 | (2006.01) |
| A23L 5/43 | (2016.01) |
| B41J 2/01 | (2006.01) |
| B41J 2/21 | (2006.01) |
| B41J 3/407 | (2006.01) |
| B41M 5/00 | (2006.01) |
| C09B 67/22 | (2006.01) |
| C09B 67/44 | (2006.01) |
| C09D 11/30 | (2014.01) |
| C09D 11/38 | (2014.01) |
| C09D 11/50 | (2014.01) |

(52) U.S. Cl.
CPC ............... *B41J 2/01* (2013.01); *B41J 2/2107* (2013.01); *B41J 3/407* (2013.01); *B41M 5/0047* (2013.01); *C09B 67/0033* (2013.01); *C09B 67/0083* (2013.01); *C09D 11/30* (2013.01); *C09D 11/50* (2013.01); *B41M 5/0064* (2013.01); *B41M 5/0076* (2013.01); *C09D 11/38* (2013.01)

(58) Field of Classification Search
CPC ......... C09D 11/52; C09D 11/36; C09D 11/40; C09D 11/322; C09D 11/324; C09D 11/328; C09D 11/005; C09D 11/54; C09D 11/106; A23G 3/0089; A23L 2/58; A23L 5/43; A23L 5/44; B41J 2/01; B41J 3/407; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41M 5/0047; B41M 5/0064; B41M 5/0076; B41M 5/0011; B41M 5/0017; B41M 5/0023; B41M 7/00; B41M 7/0072; B41M 5/52; B41M 5/5218; B41M 5/5227; C09B 67/0033; C09B 67/0083; A23P 2020/253; A23P 20/10; H05K 1/0393; H05K 1/092; H05K 2201/0154; H05K 2203/013; H05K 1/097; H05K 3/287; C08G 73/10; G03F 7/037

See application file for complete search history.

(56) References Cited

U.S. PATENT DOCUMENTS

| | | |
|---|---|---|
| 2004/0121050 A1 | 6/2004 | Thurman |
| 2005/0003055 A1* | 1/2005 | Baydo .................... C09D 11/30 426/383 |
| 2005/0061184 A1* | 3/2005 | Russell ................... C09D 11/02 106/31.86 |
| 2005/0099475 A1* | 5/2005 | Barreto .................. C09D 11/50 347/100 |
| 2006/0222702 A1 | 10/2006 | Barreto |
| 2007/0048407 A1 | 3/2007 | Collins |
| 2008/0032011 A1* | 2/2008 | Liniger ..................... A23L 5/42 426/302 |
| 2009/0317519 A1* | 12/2009 | Lavie ........................ A23L 2/58 705/50 |
| 2010/0166934 A1* | 7/2010 | Caiger ................... C09D 11/34 426/572 |
| 2015/0147444 A1* | 5/2015 | Eliav ..................... C09D 11/32 426/540 |
| 2015/0251470 A1 | 9/2015 | Lavie |
| 2016/0021907 A1 | 1/2016 | Cavin |
| 2017/0066252 A1* | 3/2017 | Eliav .......................... B41J 2/01 |
| 2019/0200799 A1 | 7/2019 | Meshulam |
| 2021/0106164 A1 | 4/2021 | Lavie |
| 2021/0153684 A1 | 5/2021 | Meshulam |
| 2021/0259455 A1 | 8/2021 | Meshulam |
| 2021/0395547 A1* | 12/2021 | Zeira .................... C09D 11/328 |
| 2023/0157480 A1 | 5/2023 | Zeira |
| 2023/0183504 A1 | 6/2023 | Zeira |

FOREIGN PATENT DOCUMENTS

| | | | |
|---|---|---|---|
| CN | 110122813 B | 12/2021 | |
| GB | 2438197 A | * 11/2007 | ............ C09D 11/30 |
| JP | 2004051650 A | 2/2004 | |
| JP | 2011241312 A | 12/2011 | |
| JP | 5488793 B2 | 5/2014 | |
| JP | 2018203934 A | 12/2018 | |
| WO | 2017/221077 A2 | 12/2017 | |
| WO | 2020/084328 A1 | 4/2020 | |
| WO | 2020/233101 A1 | 11/2020 | |

OTHER PUBLICATIONS

International Search Report for PCT/IB2021/000327 mailed Oct. 7, 2021.
International Search Report for PCT/IB2021/054189 mailed Sep. 1, 2021.
Written Opinion for PCT/IB2021/000327 mailed Sep. 1, 2021.
Written Opinion for PCT/IB2021/054189 mailed Sep. 1, 2021.

* cited by examiner

Examples describing contents of the first and second liquids

Example One → First fluid 194A comprises comprises a first colorant, the second fluid 194B comprises second colorant, wherein the first colorant is a white-light-visible colorant and at least the second colorant a fluorophore

Example Two → First liquid is an (e.g. acidic and/or edible) ink (e.g. having A pH-dependent color) and the second liquid is a base

Fig. 1E

| Illumination Conditions | White light |
|---|---|
| Visible-light colorants | Black Carrot Solids and riboflavin |
| Primary Fluorophore | Riboflavin |
| Substrate | Milk Foam |

_Note_ Milk Foam has pH of 5

| Illumination Conditions | Black light |
|---|---|
| Visible-light colorants | Black Carrot Solids and riboflavin |
| Primary Fluorophore | Riboflavin |
| Substrate | Milk Foam |

_Note_ Milk Foam has pH of 5

| Illumination Conditions | White light |
|---|---|
| Visible-light colorants | Black Carrot Solids and riboflavin |
| Primary Fluorophore | Riboflavin |
| Substrate | Beer Foam |

*Note* Beer Foam has pH of 4

| Illumination Conditions | Black light |
|---|---|
| Visible-light colorants | Black Carrot Solids and riboflavin |
| Primary Fluorophore | Riboflavin |
| Substrate | Beer Foam |

*Note* Beer Foam has pH of 4

| Illumination Conditions | White light |
|---|---|
| Visible-light colorants | Black Carrot Solids and riboflavin |
| Primary Fluorophore | Riboflavin |
| Substrate | Milk Foam |

*Note* Milk Foam has pH of 5

| Illumination Conditions | Black light |
|---|---|
| Visible-light colorants | Black Carrot Solids and riboflavin |
| Primary Fluorophore | Riboflavin |
| Substrate | Milk Foam |

*Note* Milk Foam has pH of 5

| Illumination Conditions | White light |
|---|---|
| Visible-light colorants | Black Carrot Solids and riboflavin |
| Primary Fluorophore | Riboflavin |
| Substrate | Milk Foam |

*Note* Milk Foam has pH of 5

| Illumination Conditions | Black light |
|---|---|
| Visible-light colorants | Black Carrot Solids and riboflavin |
| Primary Fluorophore | Riboflavin |
| Substrate | Milk Foam |

*Note* Milk Foam has pH of 5

| Illumination Conditions | White light |
|---|---|
| Visible-light colorants | Black Carrot Solids and riboflavin |
| Primary Fluorophore | Riboflavin |
| Substrate | Milk Foam |

*Note* Milk Foam has pH of 5

| Illumination Conditions | Black light |
|---|---|
| Visible-light colorants | Black Carrot Solids and riboflavin |
| Primary Fluorophore | Riboflavin |
| Substrate | Milk Foam |

*Note* Milk Foam has pH of 5

| Illumination Conditions | White light |
|---|---|
| Visible-light colorants | Black Carrot Solids and riboflavin |
| Primary Fluorophore | Riboflavin |
| Substrate | Milk Foam |

*Note* Milk Foam has pH of 5

| Illumination Conditions | Black light |
|---|---|
| Visible-light colorants | Black Carrot Solids and riboflavin |
| Primary Fluorophore | Riboflavin |
| Substrate | Milk Foam |

*Note* Milk Foam has pH of 5

DRINK ME
*i taste*
GOOD

Fig. 8A

DRINK ME
*i taste*
GOOD

Fig. 8B

| Illumination Conditions | White light |
|---|---|
| Visible-light colorants | Black Carrot Solids and riboflavin |
| Primary Fluorophore | Riboflavin |
| Substrate | Paper |

*Note*  Paper has pH of 5.5

| Illumination Conditions | Black light |
|---|---|
| Visible-light colorants | Black Carrot Solids and riboflavin |
| Primary Fluorophore | Riboflavin |
| Substrate | Paper |

*Note*  Paper has pH of 5.5

| Illumination Conditions | Black light |
|---|---|
| Visible-light colorants | Black Carrot Solids and riboflavin |
| Primary Fluorophore | Riboflavin |
| Substrate | Paper |

*Note* Paper has pH of 5.5

| Illumination Conditions | Black light |
|---|---|
| Visible-light colorants | Black Carrot Solids and riboflavin |
| Primary Fluorophore | Riboflavin |
| Substrate | Beer foam |

*Note* Beer foam has pH of 4

| Illumination Conditions | White light |
|---|---|
| Visible-light colorants | Grape Extract Solids and riboflavin |
| Primary Fluorophore | Riboflavin |
| Substrate | Milk Foam |

*Note* Milk Foam has pH of 5

| Illumination Conditions | Black light |
|---|---|
| Visible-light colorants | Grape Extract Solids and riboflavin |
| Primary Fluorophore | Riboflavin |
| Substrate | Milk Foam |

*Note* Milk Foam has pH of 5

| Illumination Conditions | White light |
|---|---|
| Visible-light colorants | Grape Extract Solids and riboflavin |
| Primary Fluorophore | Riboflavin |
| Substrate | Beer Foam |

*Note* Beer Foam has pH of 4

| Illumination Conditions | Black light |
|---|---|
| Visible-light colorants | Grape Extract Solids and riboflavin |
| Primary Fluorophore | Riboflavin |
| Substrate | Beer Foam |

*Note* Beer Foam has pH of 4

| Illumination Conditions | White light |
|---|---|
| Visible-light colorants | Grape Extract Solids and riboflavin |
| Primary Fluorophore | Riboflavin |
| Substrate | Milk Foam |

*Note* Milk Foam has pH of 5

| Illumination Conditions | Black light |
|---|---|
| Visible-light colorants | Grape Extract Solids and riboflavin |
| Primary Fluorophore | Riboflavin |
| Substrate | Milk Foam |

*Note* Milk Foam has pH of 5

| Illumination Conditions | White light |
|---|---|
| Visible-light colorants | Grape Extract Solids and riboflavin |
| Primary Fluorophore | Riboflavin |
| Substrate | Milk Foam |

*Note* Milk Foam has pH of 5

| Illumination Conditions | Black light |
|---|---|
| Visible-light colorants | Grape Extract Solids and riboflavin |
| Primary Fluorophore | Riboflavin |
| Substrate | Milk Foam |

*Note* Milk Foam has pH of 5

| Illumination Conditions | White light |
|---|---|
| Visible-light colorants | Grape Extract Solids and riboflavin |
| Primary Fluorophore | Riboflavin |
| Substrate | Beer Foam |

*Note* Beer Foam has pH of 4

| Illumination Conditions | Black light |
|---|---|
| Visible-light colorants | Grape Extract Solids and riboflavin |
| Primary Fluorophore | Riboflavin |
| Substrate | Beer Foam |

*Note* Beer Foam has pH of 4

| Illumination Conditions | White light |
|---|---|
| Visible-light colorants | Malt and riboflavin |
| Primary Fluorophore | Riboflavin |
| Substrate | Milk Foam |

*Note*  Milk Foam has pH of 5

| Illumination Conditions | Black light |
|---|---|
| Visible-light colorants | Malt and riboflavin |
| Primary Fluorophore | Riboflavin |
| Substrate | Milk Foam |

*Note*  Milk Foam has pH of 5

| Illumination Conditions | White light |
|---|---|
| Visible-light colorants | Malt and riboflavin |
| Primary Fluorophore | Riboflavin |
| Substrate | Beer Foam |

*Note* Beer Foam has pH of 4

| Illumination Conditions | Black light |
|---|---|
| Visible-light colorants | Malt and riboflavin |
| Primary Fluorophore | Riboflavin |
| Substrate | Beer Foam |

*Note* Beer Foam has pH of 4

| Illumination Conditions | White light |
|---|---|
| Visible-light colorants | Malt and riboflavin |
| Primary Fluorophore | Riboflavin |
| Substrate | Paper |

*Note* Paper has pH of 5.5

| Illumination Conditions | Black light |
|---|---|
| Visible-light colorants | Malt and riboflavin |
| Primary Fluorophore | Riboflavin |
| Substrate | Paper |

*Note* Paper has pH of 5.5

| Illumination Conditions | Black light |
|---|---|
| Visible-light colorants | Malt and riboflavin |
| Primary Fluorophore | Riboflavin |
| Substrate | Paper |

*Note* Paper has pH of 5.5

| Illumination Conditions | Black light |
|---|---|
| Visible-light colorants | Malt and riboflavin |
| Primary Fluorophore | Riboflavin |
| Substrate | Beer foam |

*Note* Beer Foam has pH of 4

| Illumination Conditions | Black light |
|---|---|
| Visible-light colorants | Chlorophyll pigment |
| Primary Fluorophore | Chlorophyll pigment |
| Substrate | Milkfoam |

<u>Note</u>  Milk Foam has pH of 5

First fluid 194A comprises comprises a first colorant,
the second fluid 194B comprises second colorant,
wherein the first colorant is a white-light-visible colorant and
at least the second colorant a fluorophore

Red Cabbage Indicator

Droplet position droplets

```
   L01    L02   L03
                       L04
L05    L06
              L07
           L10    L08
        L09
L08
          L12  L13  L14
     L11
```

Legend

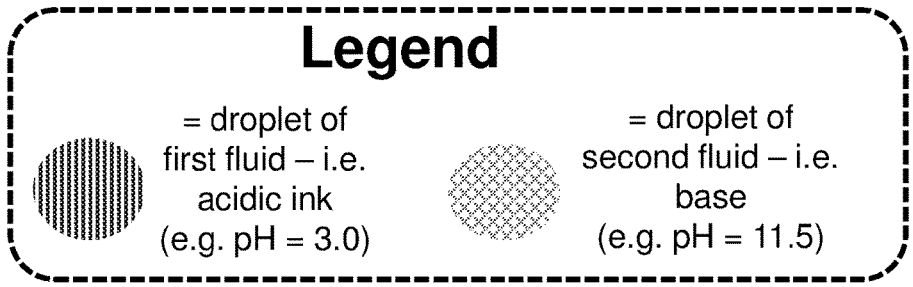

= droplet of first fluid – i.e. acidic ink (e.g. pH = 3.0)

= droplet of second fluid – i.e. base (e.g. pH = 11.5)

Droplet position droplets

L01  L02  L03  L04
L05  L06  L07  L08
     L09 L10
L08
     L11  L12  L13  L14

EXAMPLE 1 (no half-toning required) ---
For every location L01 through L14, *N* droplets of the first fluid, and *M* droplets of the second fluid are deposited
(e.g. to define a uniform mixing ratio for each of L01-L14)

NOTE -- Where as *M/N* increases, the pH increases

EXAMPLE 2 (halftoning) –
(i) L01 receives *N01* and *M01* droplets of the second fluid
(ii) L02 receives *N02* and *M02* droplets of the second fluid
etc

Fig. 29

Input digital image 178

Legend

Regions A, C, G, I → Mixing Ratio α

Regions D, F → Mixing Ratio β

Regions B, E, H → Mixing Ratio γ

Providing S201 any edible and fluorescent ink disclosed herein
[e.g. comprising
(A) Visible-liquid colorant (e.g. Extract of (e.g. unroasted)
natural-colorant-bearing plant matter)
or roasted malt colorant or roasted coffee colorant
(B) a fluorophore

Forming S209 an ink-image by depositing droplets of the edible and fluorescent
Ink onto a target substate [e.g. flowable matter or foam or an upper
Surface of a beverage or any edible
Substance]

Fig. 33A

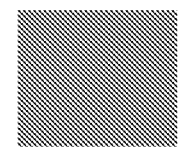 RECTANGLE 1
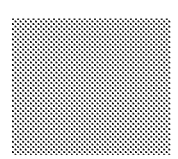 RECTANGLE 2
 RECTANGLE 3
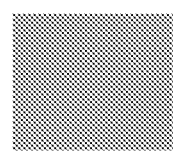 RECTANGLE 4
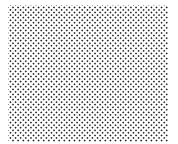 RECTANGLE 5
 RECTANGLE 6
RECTANGLE 7
RECTANGLE 8
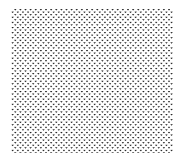 RECTANGLE 9
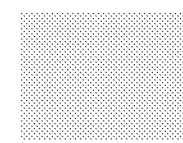 RECTANGLE 10
 RECTANGLE 11
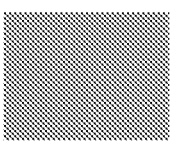 RECTANGLE 12
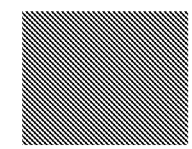 RECTANGLE 13
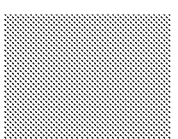 RECTANGLE 14
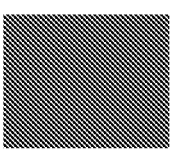 RECTANGLE 15
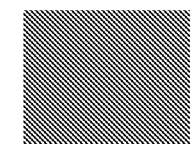 RECTANGLE 16
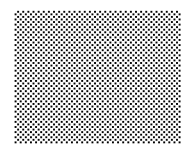 RECTANGLE 17
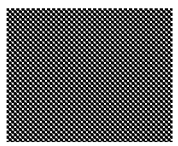 RECTANGLE 18
Fig. 33B First flag
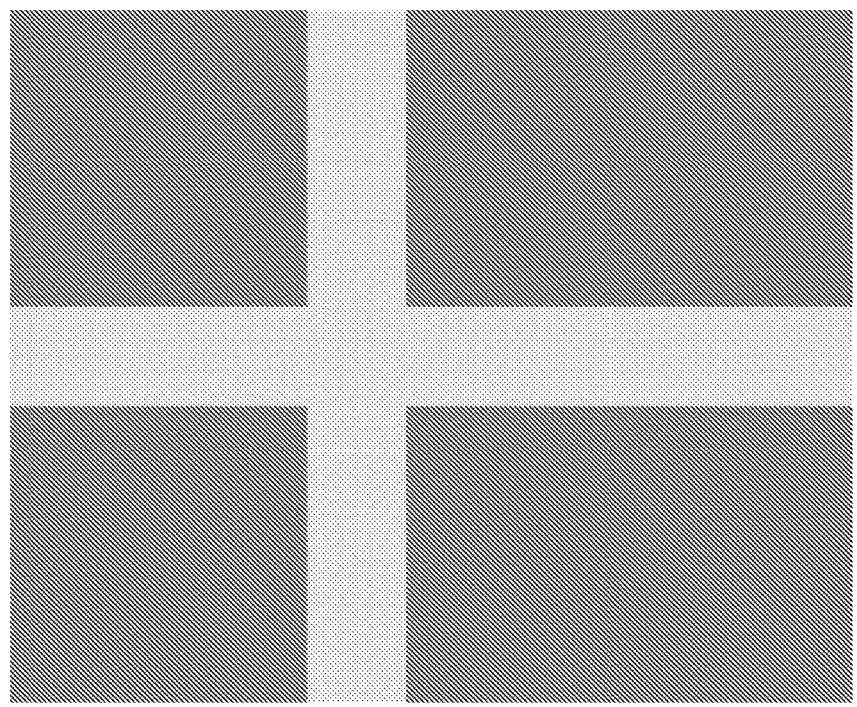
Fig. 35A
Second flag
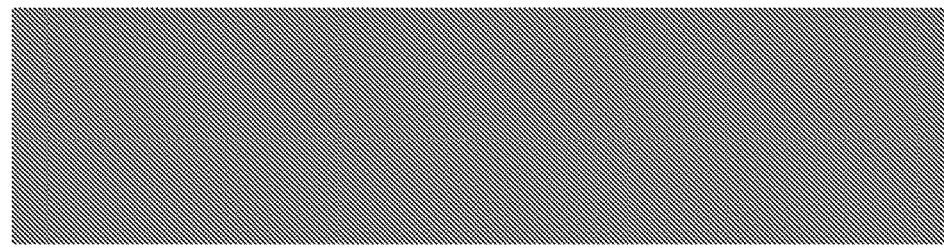
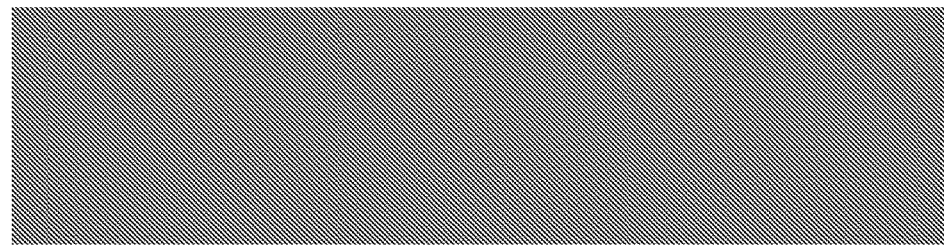
Fig. 35B Providing S301 an edible ink comprising natural-colorant-bearing plant matter and a fluorophore;

Receiving S305 into computer memory, both:
(A) a digital image (e.g. an input-image)
(B) multi-coloring directive [e.g. RBG data of the digital image or any other directive],
Wherein (i) the multi-coloring directive describes
how to color different portions of the digital image, and
(ii) the multi-coloring directive provides instructions to color a first portion
of the digital image as a first target-color
and a second portion of the digital image as a second target color;

Providing S309 multi-color but single-ink calibration data describing a relationship between:
(i) coverage fraction or line-thickness within an ink-image to be printed; and
(ii) a predicted color of a group of pixels [e.g. block] when printed at the coverage fraction
when viewed under black light conditions;

Depositing S313 droplets of the edible ink onto a target substrate to print the digital image,
wherein droplets of the edible ink are deposited at coverage fractions and/or
to produce line-thicknesses that are determined so as to
enforce the multi-coloring directive in accordance with multi-color but single-ink calibration data

Fig. 37

First fluid 194A comprises comprises a first colorant,
the second fluid 194B comprises second colorant
(e.g. the first colorant is an unfermented wort, and the
Second colorant is an extract of coffee (optionally roasted coffe)

First fluid 194A comprises comprises a first colorant,
the second fluid 194B comprises second colorant,
\the third fluid 194C comprises a fluorophore
(e.g. the first colorant is an unfermented wort, and the
Second colorant is an extract of coffee (optionally roasted coffee
And the fluorophore is e.g. riboflavin or riboflavin 5 phosphate)

EDIBLE INK FORMULATIONS, ARTICLES OF MANUFACTURE, AND RELATED METHODS OF FORMING IMAGES BY DROPLET DEPOSITION

CROSS-REFERENCE TO RELATED APPLICATIONS

This patent application claims the benefit of U.S. Provisional Patent Application No. 63/026,038 filed on May 16, 2020, which is incorporated herein by reference in its entirety.

FIELD

Embodiments of the invention relate to edible ink formulations, articles of manufacture comprising an ink-jet cartridge, and methods of printing ink-images—for example, edible ink-images.

BACKGROUND

It is known in the art to print on the upper surface of foamed beverages—see, for example, US 20190200799, US 20170066252, PCT/IB2018/058224, US 20150251470, US 20150147444, US 20090317519, all incorporated by reference herein.

SUMMARY OF EMBODIMENTS

Embodiments of the invention relate to ink-jet printing an edible ink image using an edible ink comprising both of the following ingredients: (i) a fluorophore; and (ii) an unfermented wort and/or an extract of plant matter (i.e. roasted or unroasted) or solids thereof. In some embodiments, the fluorophore is riboflavin and/or riboflavin phosphate.

In some examples related to riboflavin and/or riboflavin phosphate, the following features are simultaneously provided: (FEATURE A) the edible ink contains sufficient riboflavin and/or riboflavin phosphate for production of (i.e. by ink-jet printing) a fluorescent edible ink-image; and (FEATURE B) under visible white light, a color of ink-dots of the edible ink-image (e.g. which is printed on white or brown or light-brown foam) differs from a natural visible-light colorant of the fluorophore (i.e. for riboflavin and/or riboflavin phosphate, the natural visible-light colorant may be yellow). Thus, it is now possible to print fluorescent red and/or brown and/or purple ink-images (e.g. on a white or light-brown background) using an aqueous and edible ink.

For example, in certain commercial situation (e.g. in restaurants or bars or for beverage-vending machines), one does not want to print visible images using "yellow ink" but prefers red or brown or purple ink instead—these colors may be more acceptable than yellow to consumers. However, it is still desired to provide the fluorescence properties of riboflavin and/or riboflavin phosphate—e.g.. so the same consumers can observe a fluorescent ink-image (e.g. yellow under black light) under black light.

Instead of printing using a formulation whose primary visible-light colorant is riboflavin and/or riboflavin phosphate (i.e. 'yellow ink'), some presently-disclosed edible ink formulations (and related articles of manufacture, systems and methods) include a plurality visible-light colorants within the ink-formulation including: (i) an unfermented wort and/or colorant-bearing-plant material (e.g. an extract or solids thereof) which functions has (e.g. contains) a first visible-light colorant; and (ii) riboflavin and/or riboflavin phosphate, which is a second visible-light colorant. The relative concentrations between these two visible light colorants may be useful for proving the features disclosed in the previous paragraph.

In some embodiments, (i) the edible ink contains "large" amounts of riboflavin and/or riboflavin phosphate (i.e. at least 0.05% wt/wt—e.g. between 0.05% wt/wt and 0.5% wt/wt of riboflavin and/or riboflavin phosphate) and (ii) an unfermented wort is the primary colorant (i.e. visible-light colorant) of the ink formulation. This may produce an ink that is brown or reddish brown, and ink-dots of an edible ink image produced using this ink may have ink-dots of this color (i.e. under visible light) as well. However, such ink-images may still provide the desired fluorescent properties.

In different embodiments, the multi-color image may produced on edible substrate (e.g. foam of a foamed beverage, or rice-paper, or yogurt or pudding) in accordance with one or more of the following goals, some of which may compete with each other:
A) producing the edible multi-color image without relying on inks comprising artificial colors (or relying inks including only certain 'permitted' artificial colors such as riboflavin or riboflavin phosphate); and/or
B) producing the edible multi-color image using fluids which are ink-jettable (e.g. even after residing in an ink-jet pod for an extended period of time);
C) using inks (or in a printing-process) that are capable of producing a sharp image without droplet deflection (e.g. using thermal ink jet or bubble jet) and/or
D) using edible fluids that are stable against microbial growth.

This 'summary section' only describes a few embodiments—many more are described herein.

BRIEF DESCRIPTION OF THE DRAWINGS

FIG. 1E relates to examples describing contents of the first and second liquids.

FIGS. 8A-8B show an example digital image. FIGS. 28-29 relate to examples involving droplet positions. FIG. 32 shows photograph for specific examples where the substrate is milk foam and the primary fluorophore is Riboflavin phosphate.

FIGS. 33-37 relate to apparatus and methods for controlling or modulating a multi-color profile of an ink image.

DETAILED DESCRIPTION OF EMBODIMENTS OF THE INVENTION

Some embodiments relate to an article of manufacture comprising: a. a reservoir array of one or more ink-reservoir(s); b. a first ink disposed within one or more the reservoir(s), the first ink comprising a first colorant, said first colorant being a visible light colorant.

One example of a reservoir is an ink-jet cartridge or a chamber thereof.

The "one or more reservoirs" may be only a single reservoir (e.g. an ink-jet cartridge or a chamber thereof).

Figure 22A:
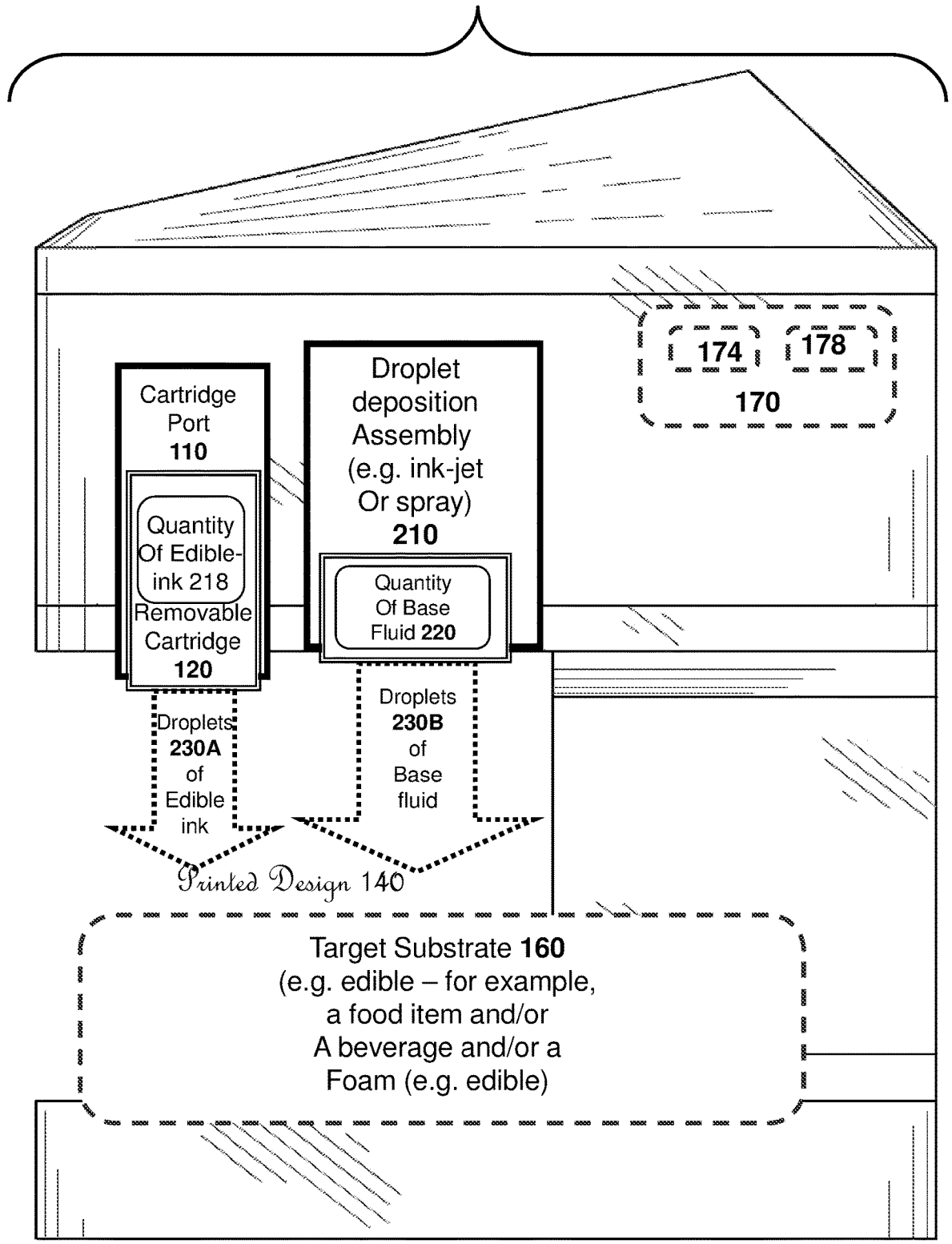
Figure 22B:
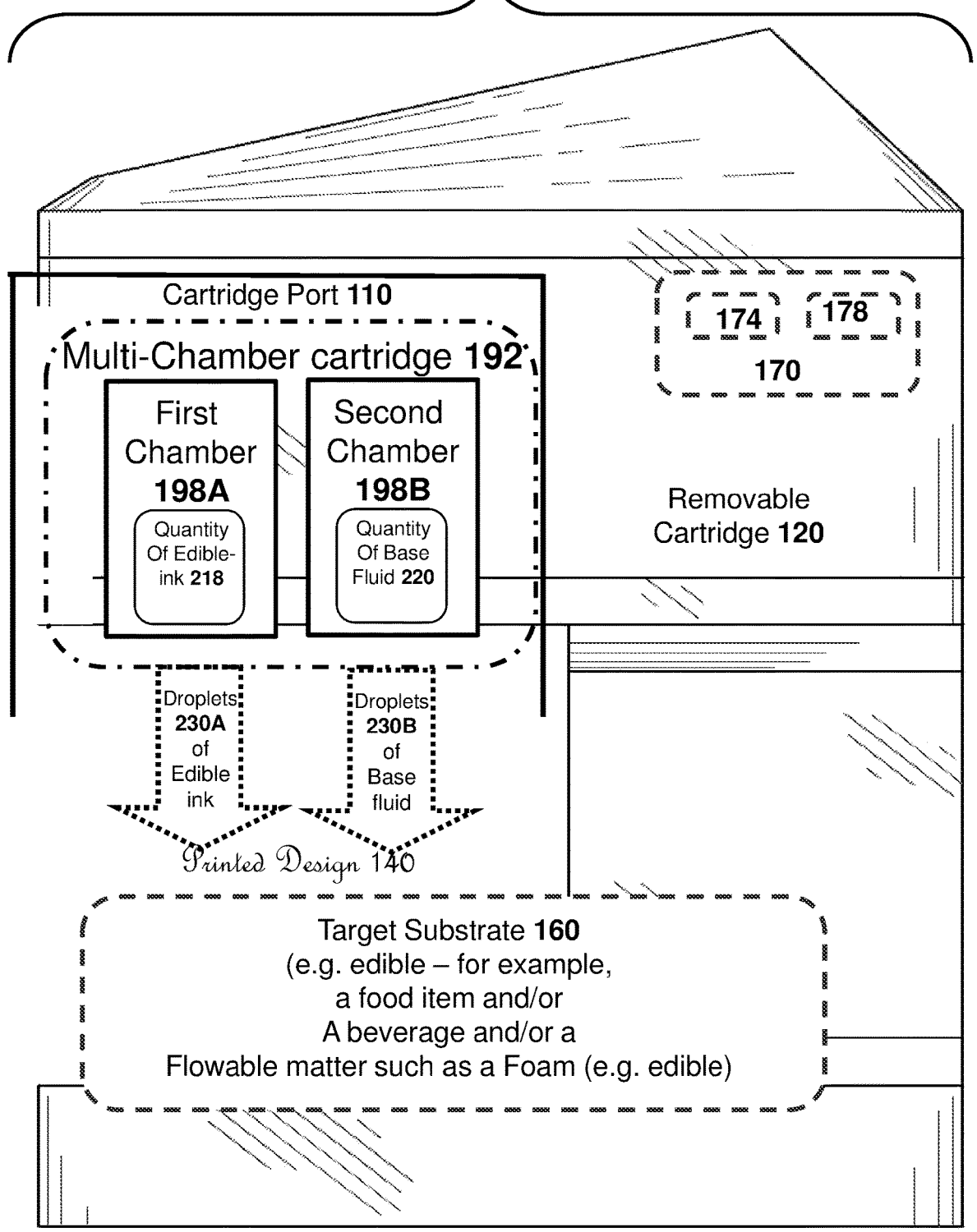
Figure 23:
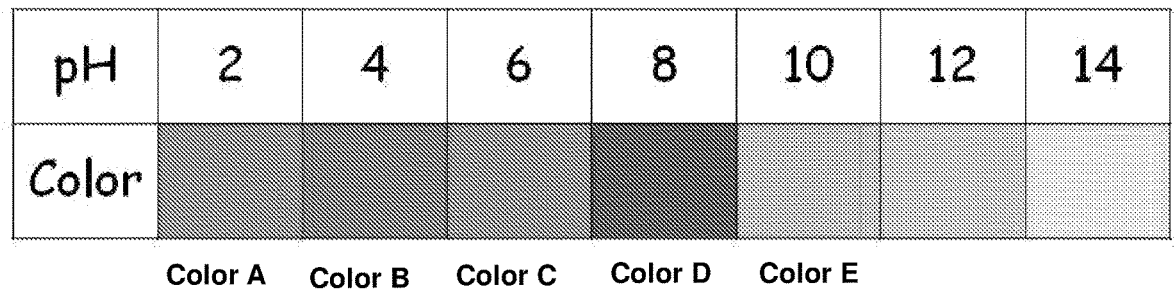
FIG. 23 describes a relationship between pH and color for a red cabbage indicator.
Figure 24:
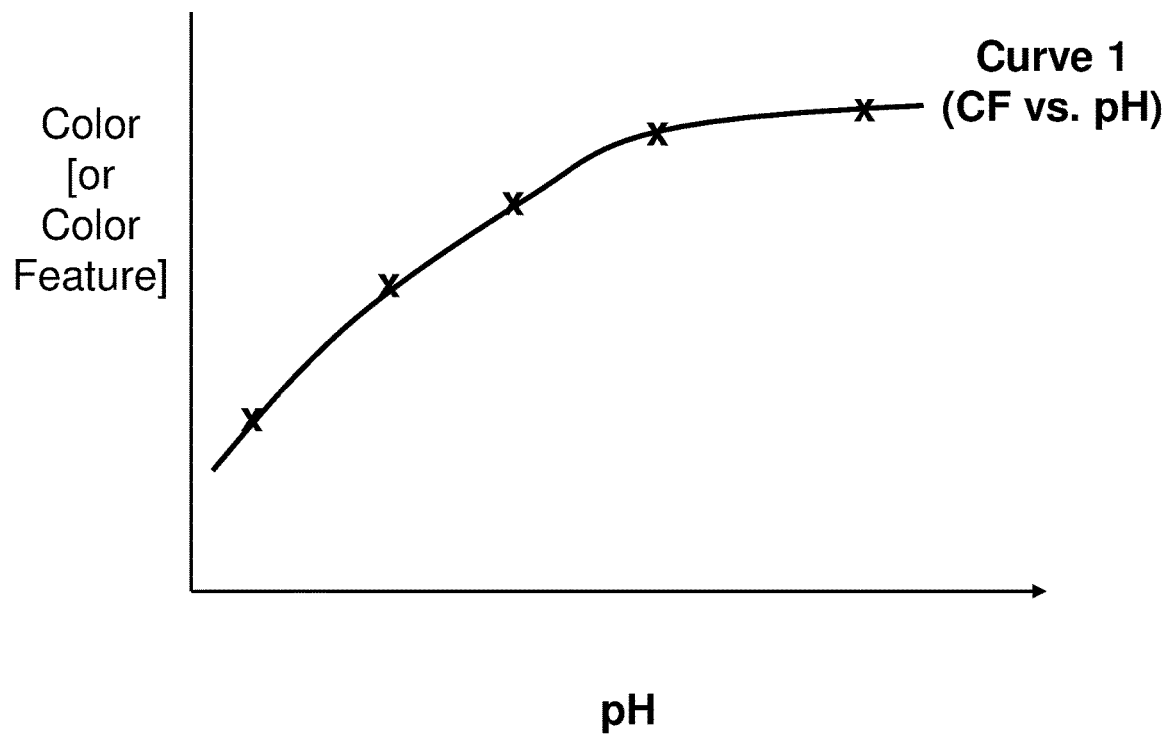
FIG. 24 illustrates a pH dependent of a color of red cabbage.
Figure 25:
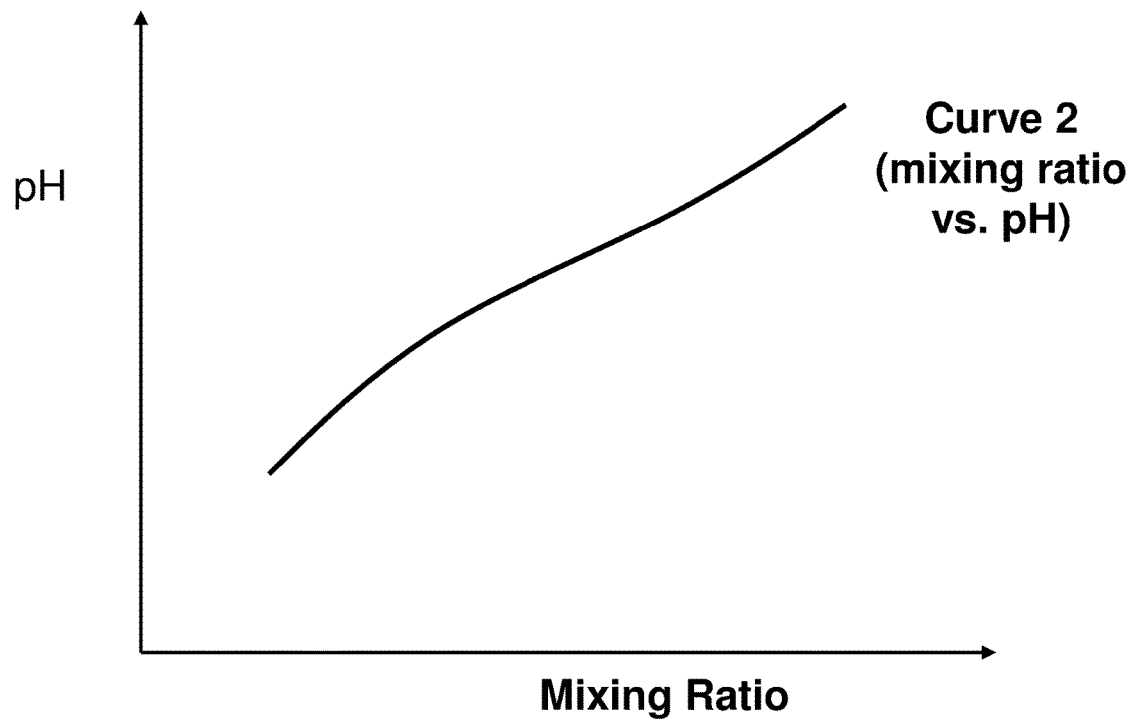
FIGS. 25-26 show curves involving the mixing ratio.
Figure 26:
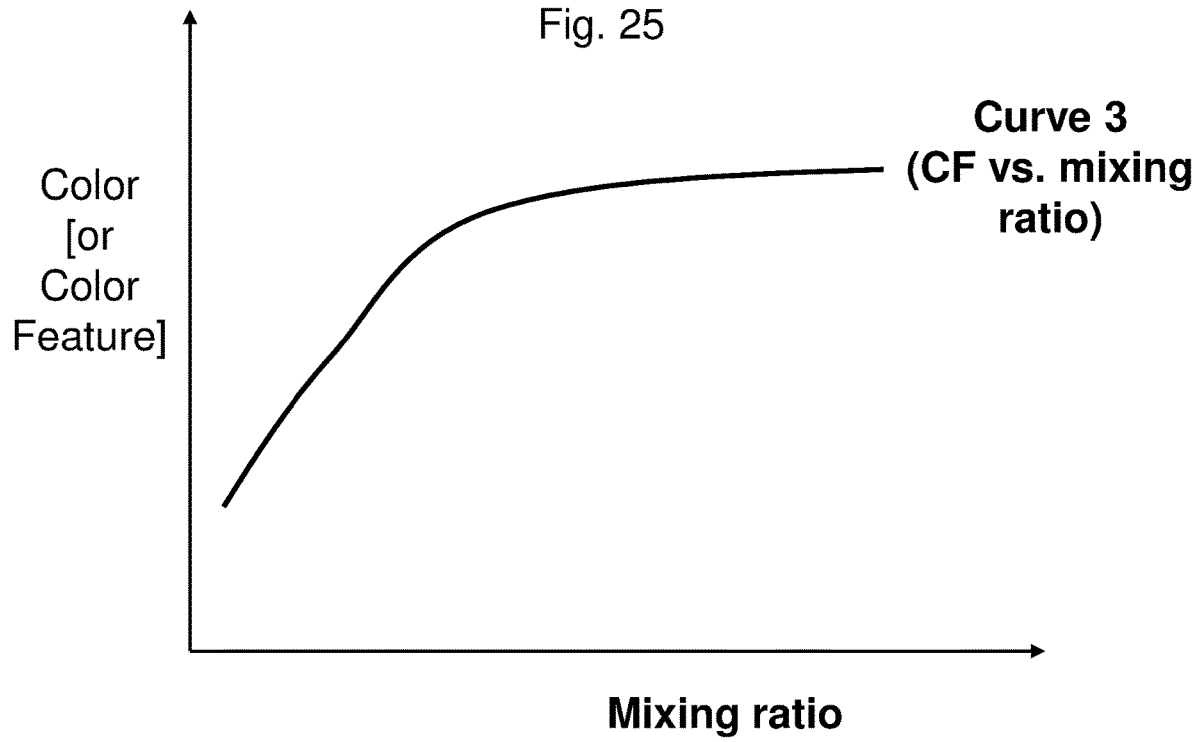
Figure 27A:
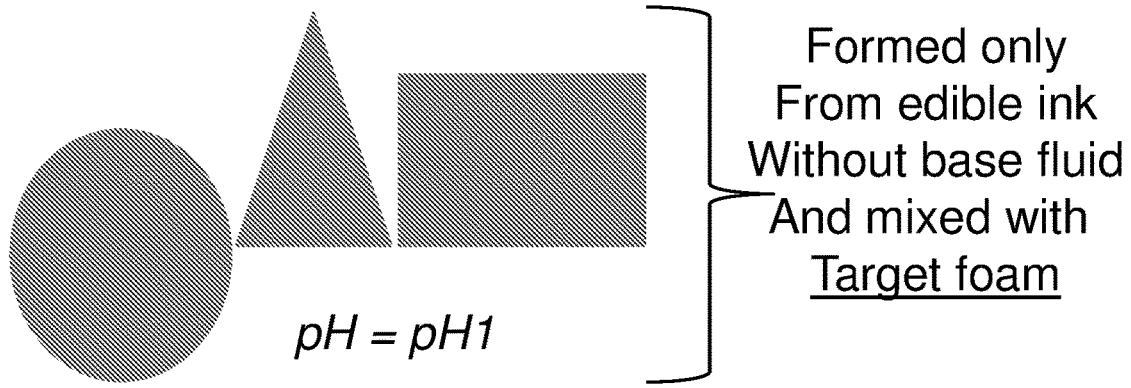
FIG. 27A shows an example where pH=pH1.
Figure 27B:
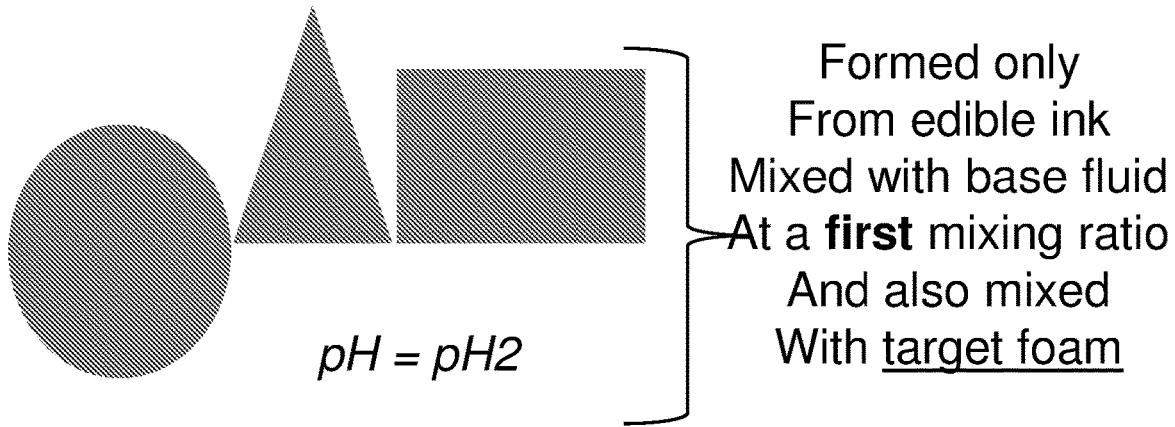
FIG. 27B shows an example where pH=pH2.
Figure 27C:
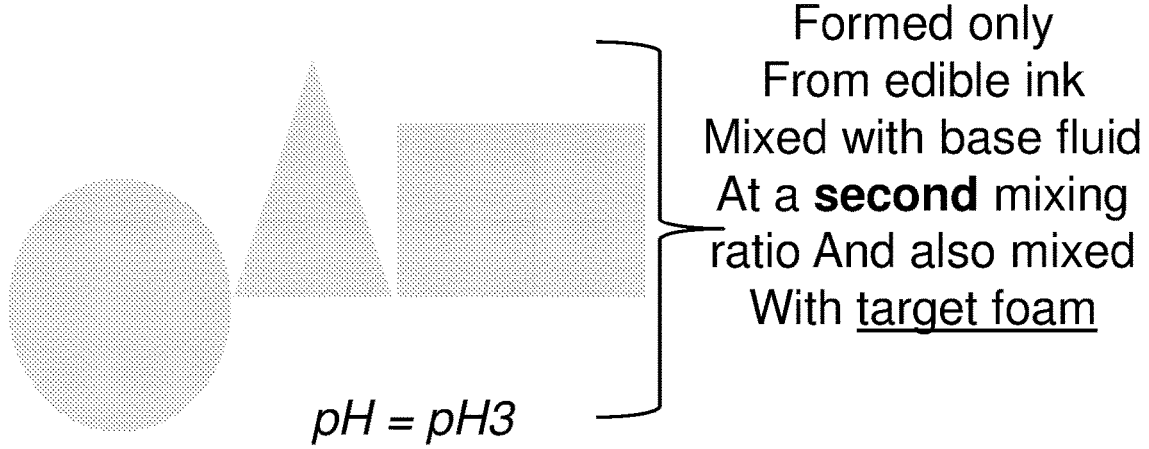
FIG. 27C shows an example where pH=pH3.
Figure 28:
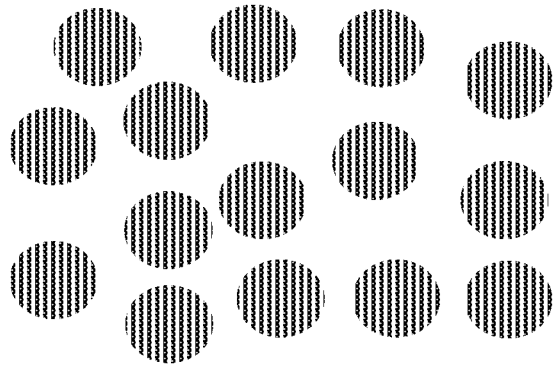
Figure 30:
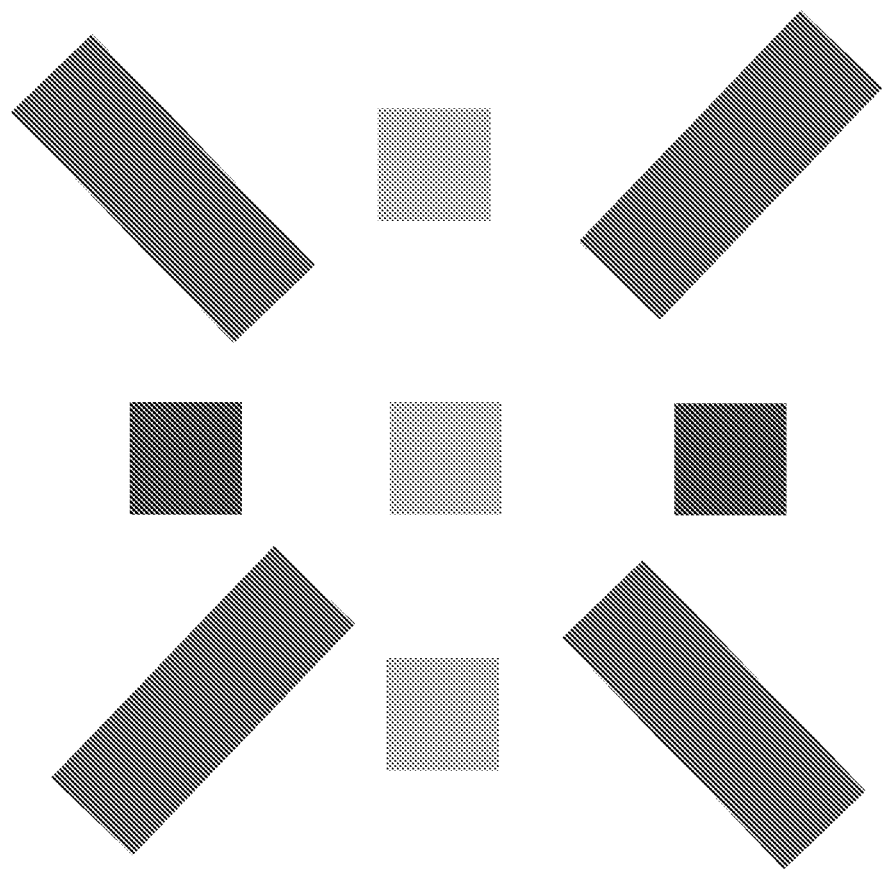
FIG. 30 relates to an example input digital image.
Figure 31:
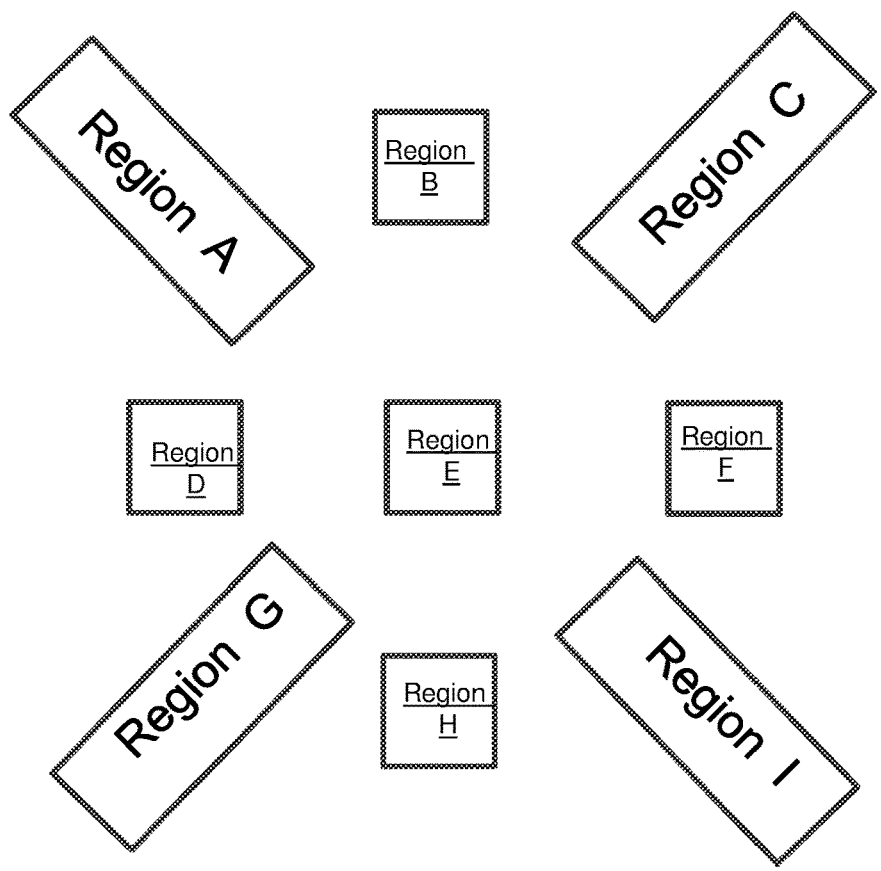
FIG. 31 shows regions A, B, C, D, E, F, G, H and I for a specific example.

Alternatively, the "one or more reservoirs" may be a plurality of reservoirs. For example (e.g. see FIG. 1D and FIG. 22B)—the "plurality of reservoirs" may be first and second ink-storage chambers of a single/common ink-jet cartridge. In another example—the "plurality of reservoirs" may be as follows: a first of the plurality of reservoirs is a first ink-jet cartridge or a portion thereof (e.g. an ink-storage chamber of) and a second of the plurality of reservoirs of is a second ink-jet cartridge or a portion thereof (e.g. an ink-storage chamber of) where the second ink-jet cartridge is different from the first ink-jet cartridge (NOT SHOWN in the drawings).

As noted above, embodiments of the invention relate to first ink disposed within one or more the reservoir(s). This first ink may comprise a single colorant or a plurality of colorants. Optionally, in addition to the 'first ink,' one or more additional fluids may be provided. For example, an additional ink or another additional fluid other than the first ink may be provided.

For example, the "another additional fluid" may be a basic fluid (i.e. pH>7) or a fluid which otherwise modifies a color of the 'first ink'—e.g. a clear and/or transparent basic fluid (e.g. see FIGS. 22A-32).

Figure 1A:
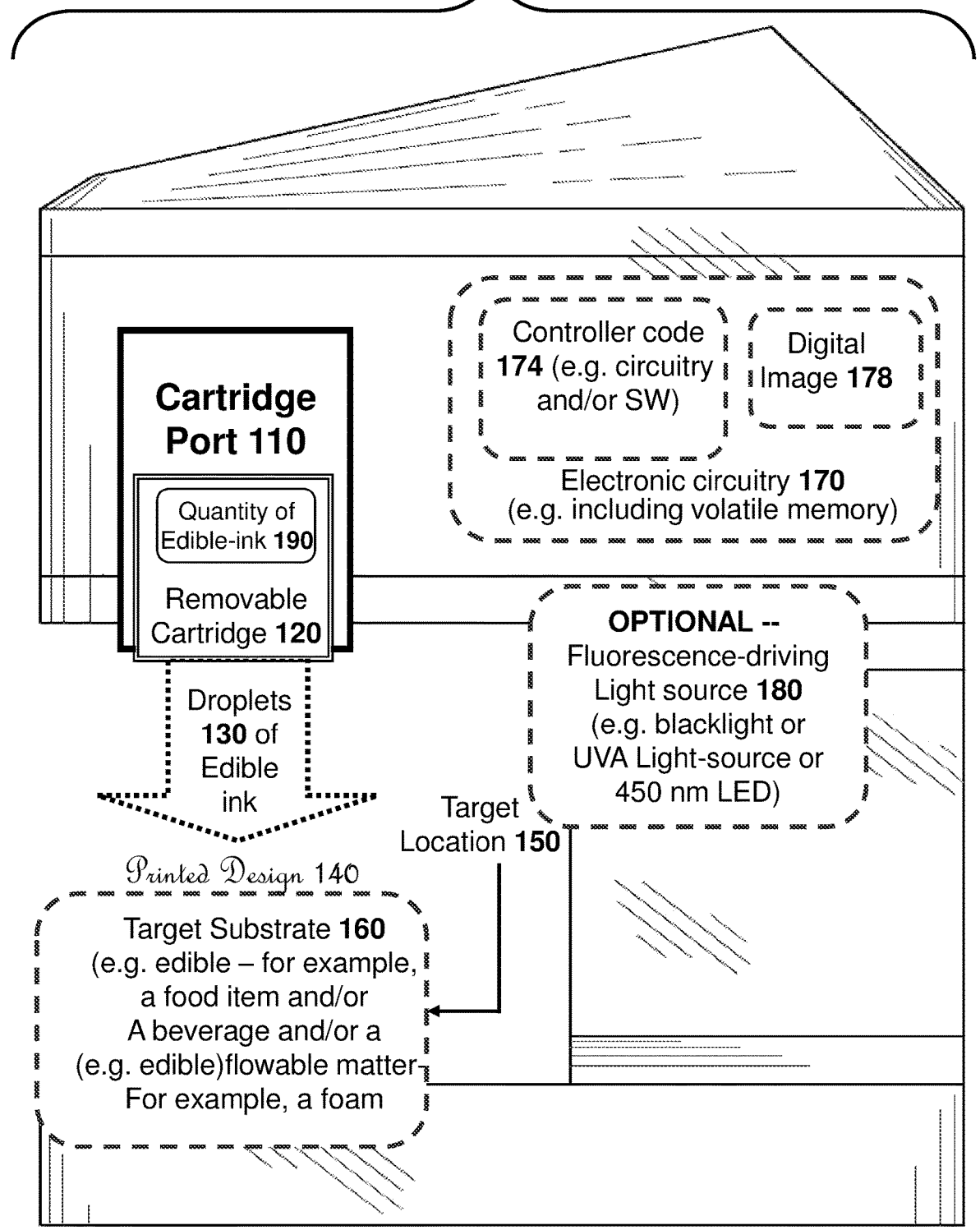
FIGS. 1A-1D and 22A-22B illustrate examples of an ink-jet printer.
Figure 1B:
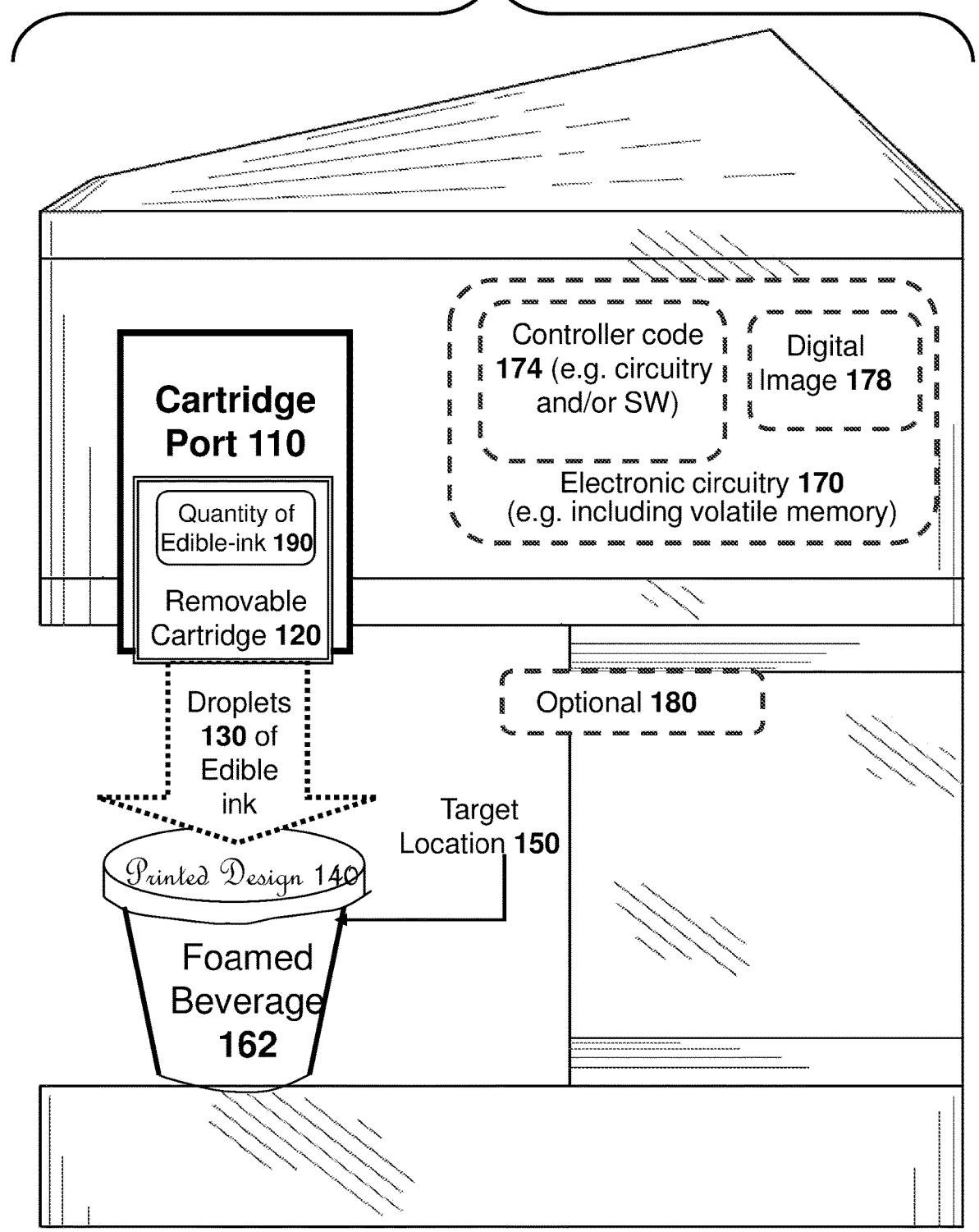

FIGS. 1A-1B—A System for Depositing Droplets of an Edible Ink Formulation

FIGS. 1A-1B illustrate a system comprising an ink-jet printer 100 loaded with an ink-jet cartridge 120 (e.g. removable cartridge) (e.g. a thermal ink-jet cartridge). At least one chamber or reservoir of cartridge 120 contains a quantity of an edible ink 190 which are to produce droplets 130 of which are deposited to a target substrate 160. The deposition is performed according to output of electronic circuitry 170 (e.g. including controller 174) to produce, from the droplets 130, a printed design 140 on a target substrate 160.

Examples of target substrate 160, relevant to any teaching or embodiment disclosed herein, include but are not limited to: any food, any foam (e.g. foam of a beverage), any beverage, yogurt, milkshakes, or solid material. For example, the foamed surface is selected from the group consisting of beer foam, egg-whites foam, milk-foam, and milk-substitute foam, soybean foam, aquafaba foam, chickpea foam, nitro foam (meaning a beverage infused with nitrogen, causing a foam mixture of the beverage and nitrogen bubbles), quillaia extract, yucca extract. For example, the target substrate 160 is selected from the group consisting of a cocktail, a beer, a coffee, tea (i.e. chai, matcha), milk shakes, fruit shakes, and vegetable shakes.

For example, controller 174 regulates locations at which droplets 130 are deposited (and/or droplet size(s)) to produce a pattern (i.e. of the printed design 140) on target substrate 160. For example, the droplet deposition is performed to reproduce geometric and/or color features of digital image 178 (e.g. to 'print the image') stored in volatile and/or non-volatile computer storage. In some embodiments, cartridge 120 is deployed to a cartridge port 110.

In some embodiments, cartridge 120 has only a single chamber of fluid—e.g. having a structure similar to that of well-known "black ink only" ink-jet cartridge. Alternatively, cartridge 120 has multiple chambers of fluid, at least one of which is loaded with edible ink 190—e.g. cartridge .

Figure 1C:
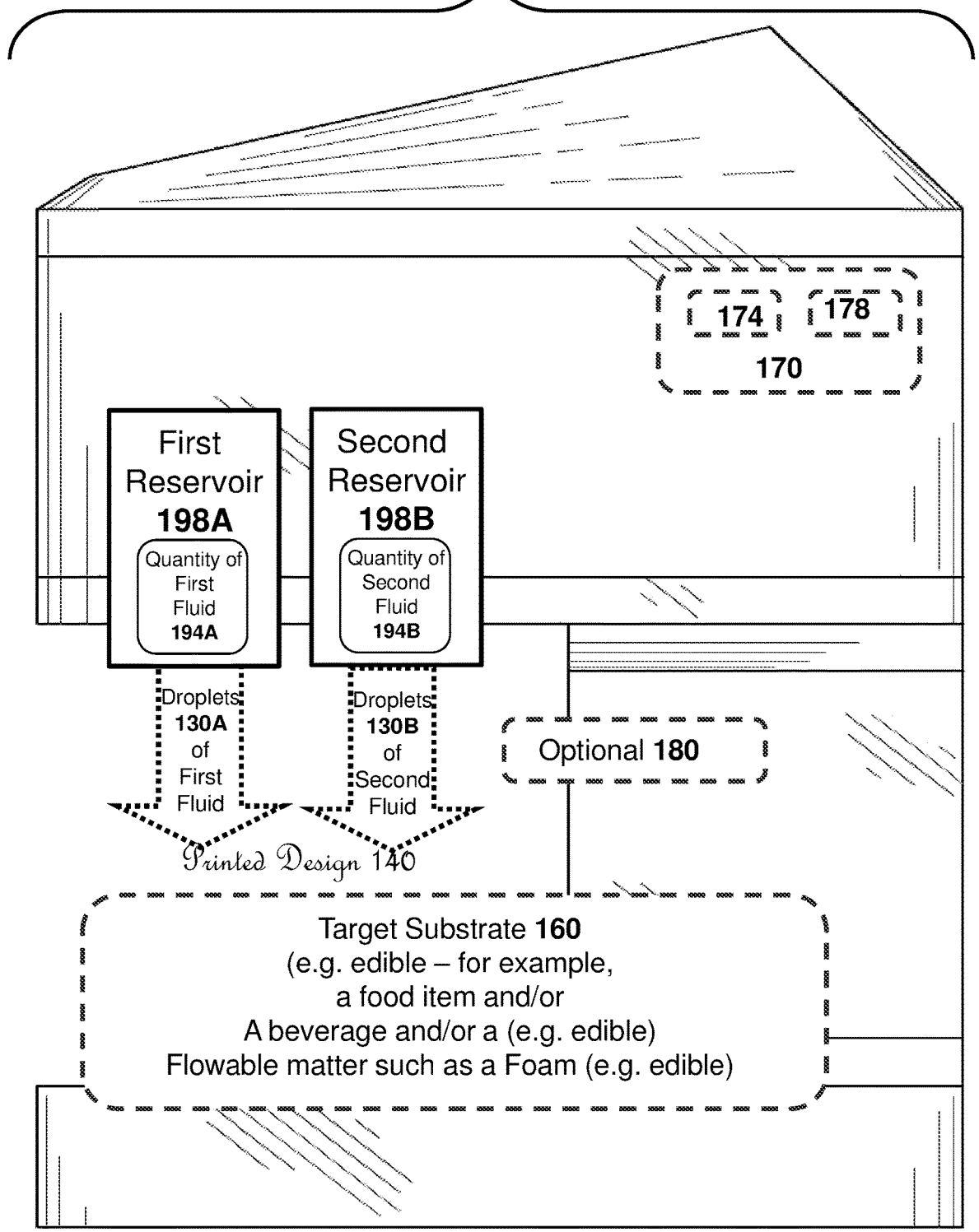

FIG. 1C shows an ink-jet printer configured to despot droplets from multiple reservoirs 198A, 198B of fluids. In particular, first fluid 194A resides in first reservoir 194A and second fluid 194B resides in second reservoir 194B. One non-limiting example of FIG. 1C is shown in FIG. 1D—in this example, the first reservoir 194A is a first chamber 222A of a multi-chamber cartridge 192 and the second reservoir 194B is a second chamber 222B of a multi-chamber cartridge 192.

In one example, both of first and second fluids are inks—e.g. the first fluid may comprise at least a first colorant which is at least a visible-light colorant and the second fluid may comprise at least a second colorant which is at least a fluorophore.

Figure 1D:
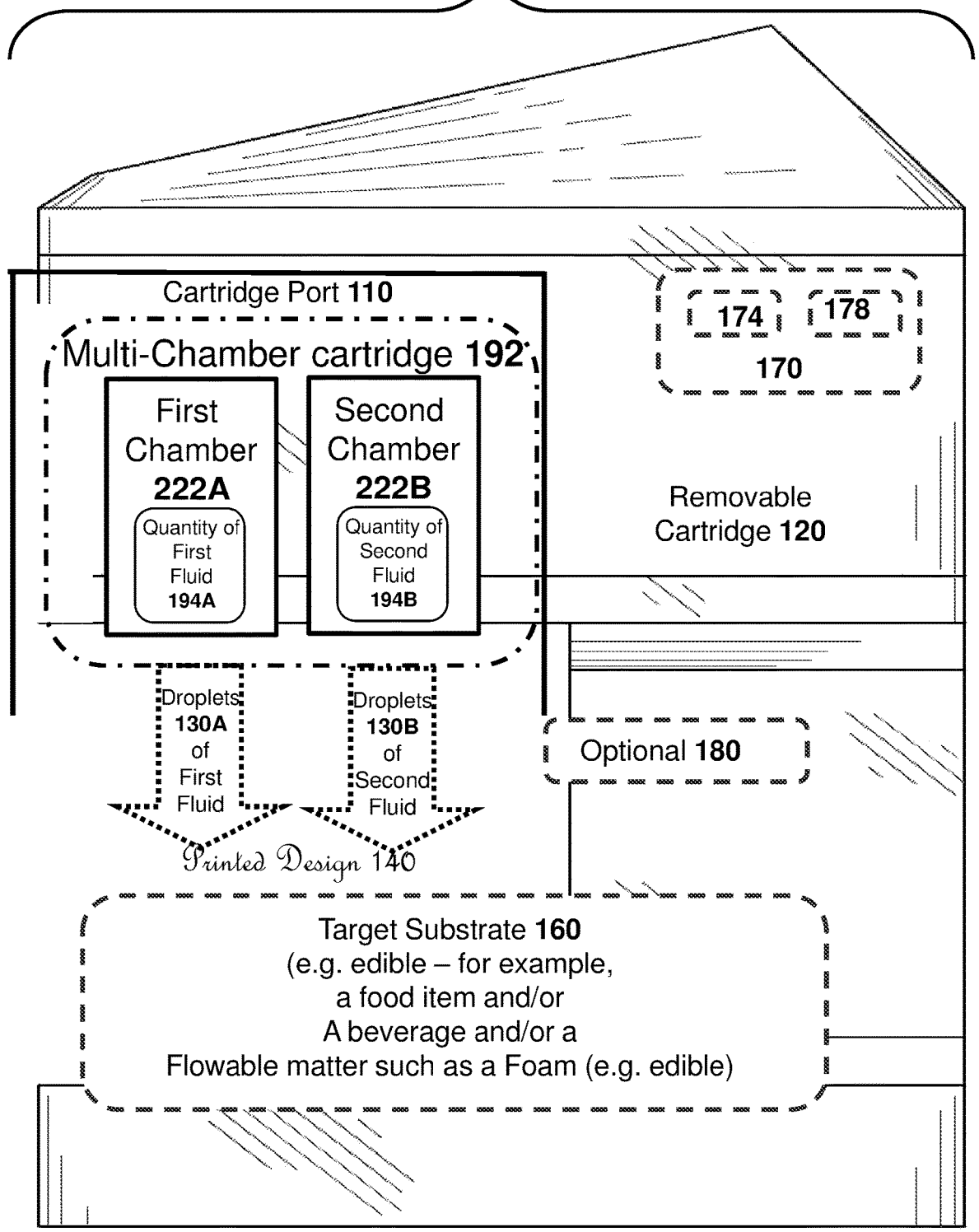

In the embodiments of FIG. 1C or 1D, the droplets may be deposited according to (e.g. controlled by) output of circuitry 170. For example, this output may control droplet size and/or location from either reservoir. For example, output of circuitry 170 may be configured to regulate mixing between droplets 130A, 130B (mixing in or on substrate 160) from the first and second reservoirs—e.g. cause deposition of these droplets common locations or to locations close enough for mixing therebetween. Output of circuitry 170 may be used to control mixing between droplets (e.g. relative quantities of the first and second fluids) in or on the substrate and/or halftoning of droplets in or on the substrate.

In some embodiments, the target substrate 160 is or comprises flowable and/or edible matter—e.g. an upper surface of beverage and/or a foam (see, for example, FIG. 1B).

FIG. 1E illustrates some examples related to FIGS. 1C-1D.

Note about electronic circuitry 170—'electronic circuitry' or 'circuitry'—any hardware (e.g. digital and/or analog electronics), or software or combinations thereof. In some embodiments, 'circuitry' includes a digital computer. "Analysis circuitry" is electronic circuitry configured to perform a data-analysis function. "Memory" or "storage" (used interchangably) refers to volatile (e.g. RAM) and/or non-volatile (e.g. flash or magnetic medium) computer storage. "Circuitry" or "memory" may be local to a given device (or locally-coupled devices) or may be non-locally distributed. Although circuitry 170 is shown outside of ink-jet cartridge(s), this is not a limitation and in some embodiments at least some of circuitry 170 resides in any (e.g. ink-jet and/or removable) cartridge.

FIG. 1E Shows Examples Related to FIGS. 1C-1D. Types of Edible Ink 190

The present disclosure present multiple types of edible inks in a single document. Some, but not all, of the edible inks described herein are fluorescent. Some, but not all, of the edible inks described herein comprise extract of unroasted natural-colorant-bearing plant matter (e.g. as a primary colorant of the ink).

Figure 1F:
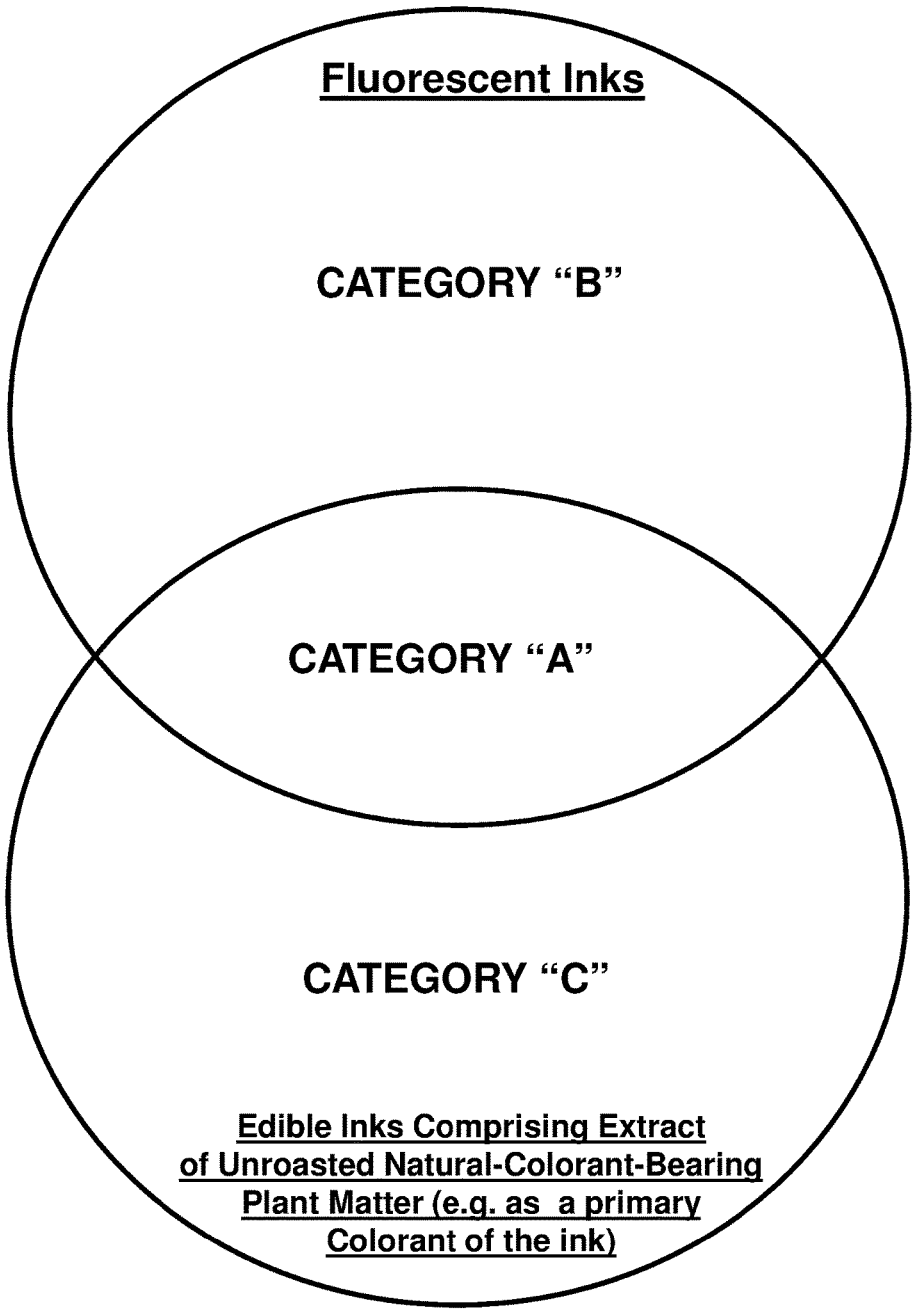
FIG. 1F is a Venn Diagram.

FIG. 1F is a Venn diagram some of the different types of ink discussed in the present document.

Inks which are both fluorescent and comprise extract of natural-colorant-bearing plant matter as a visible-light colorant are referred to as Category "A" inks in the present document. Examples of Category A inks are those described in Examples 1-43 of the Examples section.

Inks which are both fluorescent and do not comprise extract of natural-colorant-bearing plant matter are referred to as Category "B" inks in the present document. Examples of Category B inks are those described in Example 4 of the Examples section.

Inks which are not fluorescent and comprise extract of natural-colorant-bearing plant matter as a visible-light colorant are referred to as Category "C" inks in the present document. Examples of Category C inks are those described in Examples 7-8 of the Examples section.

In some embodiments, the edible inks (i.e. any ink disclosed herein, including Category A, Category B, and Category C inks) may provide one more of (i.e. any combination of) the following types of features:

(I) Features related to avoiding artificial ingredients or ingredients.

In some embodiments, the ink is free of artificial visible-light colorants, or contains only minimal quantities thereof. In some embodiments, (1) the ink fluorescent and comprises only a single artificial visible-light colorant which is a fluorophore such as riboflavin phosphate; and (2) other than this single visible-light colorant (i.e. required for fluorescence).

In embodiments of the invention, the ink formulation meets US Department of Agriculture (USDA) Food Safety and Inspection Service Food Standards and Labelling Policy Book (Policy Book) which requires that products can only carry a 'natural' claim if they contain no artificial or synthetic ingredients or chemical preservative, and if they are minimally processed (USDA 2005). This is referred to herein as "complying with USDA Policy book to carry a natural claim."

(II) features related to ink-jetability—e.g. related to jetability from a thermal ink-jet printer. This may require, for example, relate to viscosity and/or surface-tension of the ink formulation.

(III) features related to the shelf-life of the edible ink. For example, this may relate to the shelf-life of the edible ink formulation as an edibile product, requiring specific pH and/or a presence of anti-microbial. Alternatively or additional, this may relate to the ability of the ink formulation to retain its jetability properties (i.e. either in general, or specific properties such as the ability to avoid nozzle clogging or to avoid droplet deflection or to the ability to expel the ink formulation from a nozzle of a thermal ink-jet cartridge to form droplets from the ink jet formulation) over an extended period of time (e.g. at least days or weeks or months).

(IV) features related to having a high visible-light optical density, e.g. at one or more visible-light wavelength(s);

(V) features related to a specific visible-light color of the ink. For example, as will be discussed below, in some embodiments (ethere is a need for the visible-light color of the ink to differ from fluorophore(s) thereof.

(vi) features related to ability of the ink to produce, by droplet deposition and from a single reservoir of liquid, an ink image which is multi-color when viewed under ultraviolet (e.g. UVA) light.

(vii) features related to water content of an ink formulation. In different embodiments, the ink formulation comprises at least 40% wt/wt or at least 50% wt/wt water, and/or at most 85% wt/wt or at most 80% wt/wt or at most 70% wt/wt water.

In some embodiments, the need for an ink formulation to provide more than one of these features may relate to competing design concerns. For example, the need for the ink to providing an ink which avoid artificial anti-microbials while still having an acceptable shelf life. In another example, there may be a need for the ink's viscosity to be below a maximum value (e.g. for jetability) while the ink should further provide a minimum optical density or fluorescence (i.e. increased concentrations of visible-light colorant and/or fluorophore may increase the viscosity).

Definitions

Some definitions are presented in this section. Other definitions are presented elsewhere in the present document.

A blacklight (or often black light), also referred to as a UV-A light, Wood's lamp, or ultraviolet light, is a lamp that emits long-wave (UV-A) ultraviolet light and very little visible light.

For the present disclosure, a 'white-light-visible colorant' is a colorant which has an optical density in the visible spectrum. Such a colorant is visible under white light. An ink or colorant thereof may have a different color when viewed under black light and under white (i.e. broadband and visible) light.

A 'white-light-visible color' of an item (e.g. ink or colorant thereof or image printed therefrom) refers to the ordinary meaning of a 'color' of the item—i.e. the color when viewed under white (i.e. broadband and visible) light. For the present disclosure, unless specified otherwise (or clear otherwise from the context) a 'color' of an item is the 'white-light-visible color' of an item.

When an object is viewed under white light conditions, the object is illuminated by white broadband visible light.

The presently-disclosed ink formulations exhibit optical density at least in visible wavelengths, and this optical density fluctuates as a function of wavelength. A 'visible wavelength of the greatest optical density' is the visible wavelength at which the optical density of an ink formulation is the greatest.

When a given ingredient (e.g. black carrot extract solids, grape extract solids, an unfermented wort) is the 'primary colorant' of an ink formulation', this means that a presence of the given ingredient in the ink formulation contributes at least 75% or at least 80% or at least 85% or at least 90% or at least 95% or at least 97%) of the light absorbance of the ink formulation at the 'visible wavelength of the greatest optical density.'

When a given ingredient (e.g. riboflavin, riboflavin phosphate, chlorophyll) is 'primary fluorophore of the ink formulation', this means that a presence of the given ingredient in the formulation contributes at least 75% or at least 80% or at least 85% or at least 90% or at least 95% or at least 97%) of the fluorescence of the ink formulation.

Edible Inks 190

Preliminary Discussion—Novel Ink Formulations are Disclosed Herein.

In some embodiments, the edible ink 190 comprises an extract of natural-colorant-bearing plant matter, discussed below. For example, the natural-colorant-bearing plant matter may be roasted or unroasted. For example, the extract of natural-colorant-bearing plant matter (e.g. from one type of plant matter, or collectively from multiple types of plant matter) may be the primary colorant of the ink formulation.

Alternatively or additionally, the edible ink comprises one or more fluorophore(s).

Some embodiments relate to fluorescent, edible and aqueous ink formulations which comprise first and second colorants, wherein at least the first colorant is a white-light-visible colorant and the second colorant is a fluorophore. For example, the first colorant may be an extract of natural-colorant-bearing plant matter or a malt extract (e.g. extract of roast malt) or a coffee extract (e.g. extract of roast coffee).

In some embodiments, (i) both of the first and second colorants are white-light-visible colorants (i.e. the second colorant is both a white-light-visible colorant as well as a fluorophore); and (ii) a presence of the first colorant within the ink formulation means that a white-light-visible color of the ink formulation a whole (e.g. the ink of Example 1 is red or orange) is "significantly different" from a white-light-visible color of the second colorant (e.g. the second colorant of Example 1 is yellow or yellowish).

This may be useful to solve a previously unrecognized problem—how to provide an edible and ink-jettable formulation where (i) the 'primary fluorophore of the ink formulation' provides visible-light optical-density and has a particular 'white-light-visible color'; and (ii) this particular 'white-light-visible color' is undesirable, and a different color (i.e. for the ink formulation as a whole) is preferred. In one particular example, it is desired to employ riboflavin or riboflavin phosphate as a fluorophore, or the primary fluorophore . However, it is preferred for the ink formulation as a whole to have a color that significantly differs from the yellow or 'yellowish' color which characterized riboflavin—e.g. to provide an ink formulation whose white-light-color is red or brown or purple or orange.

Consider the ink formulation of Example 1 of the Examples section below (comprising riboflavin 5' phosphate as the 'second colorant' and black carrot extract as the 'first colorant), discussed in greater detail below. Despite a presence of Riboflavin 5' phosphate in the ink-formulation at a concentration level of 0.1% wt/wt, a white-light-visible color of the ink-formulation is red or reddish, significantly different from a white-light-visible color of the primary fluorophore thereof. See FIGS. 2A, 3A, 4A, 5A, 6A, and 7A discussed below.

Consider the ink formulation of Example 2 of the Examples section below (comprising riboflavin 5' phosphate as the 'second colorant' and grape extract as the 'first colorant'), discussed in greater detail below. Despite a presence of Riboflavin 5' phosphate in the ink-formulation at a concentration level of 0.1% wt/wt, a white-light-visible color of the ink-formulation is red or reddish or brownish-red, significantly different from a white-light-visible color of the primary fluorophore thereof. See FIGS. 11A, 12A, 13A, 14A and 15A discussed below.

For the ink formulation of Example 3 of the Examples section below (comprising riboflavin 5' phosphate as the 'second colorant' and unfermented wort as the 'first colorant'), despite a presence of Riboflavin 5' phosphate in the ink-formulation at a concentration level of 0.1% wt/wt, a white-light-visible color of the ink-formulation is brownish or brownish red, significantly different from a white-light-visible color of the primary fluorophore thereof. See FIGS. 16A, 17A and 18A discussed below.

In some embodiments, the relative concentrations of the first and second colorants are selected to provide a particular 'target' color for the ink-formulation as a whole.

Photographs of Images Printed Using the Ink Formulation of Examples 1-3 (a Second Discussion Related to White-Light Conditions Versus Black-Light Conditions)—

FIGS. 2-7 and 11-15, present photographs of images printed by depositing, onto a milk or beer foam, droplets of an edible ink comprising both an extract of natural-colorant-bearing plant matter and a fluorophore.

Figure 2A:
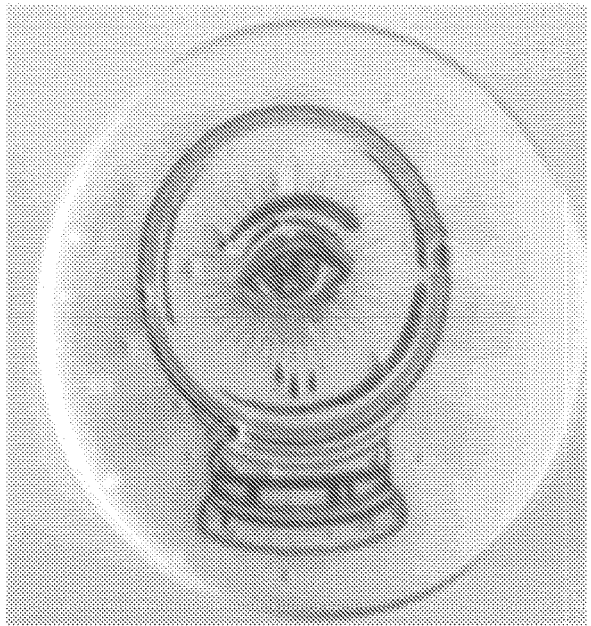
FIGS. 2A-2B, FIGS. 3A-3B, FIGS. 4A-4B, FIGS. 5A-5B, FIGS. 6A-6B, FIGS. 7A-7B, FIGS. 9A-9B, FIGS. 10A-10B, FIGS. 11A-11B, FIGS. 12A-12B, FIGS. 13A-13B, FIGS. 14A-14B, FIGS. 15A-15B, FIGS. 16A-16B, FIGS. 17A-17B, FIGS. 18A-18B, FIGS. 19A-19B, FIG. 20, and FIG. 32 each present photographs of images printed by depositing, onto a milk or beer foam or paper, droplets of an edible ink comprising both an extract of natural-colorant-bearing plant matter and a fluorophore.
Figure 2B:
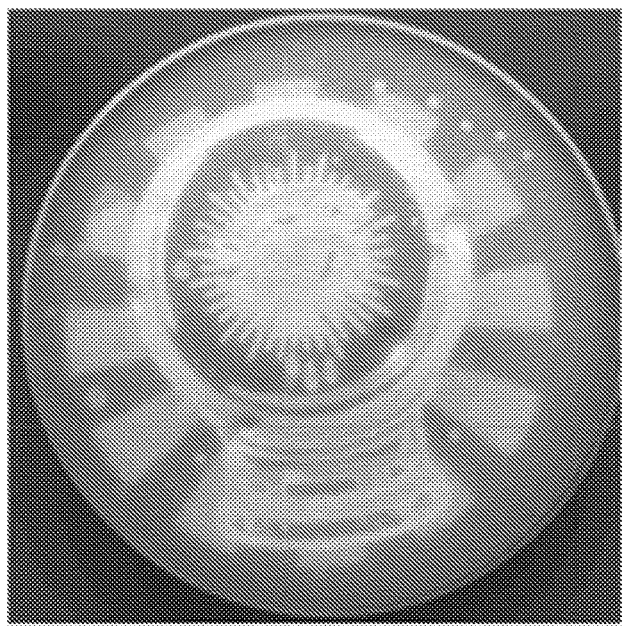
Figure 3A:
Figure 3B:
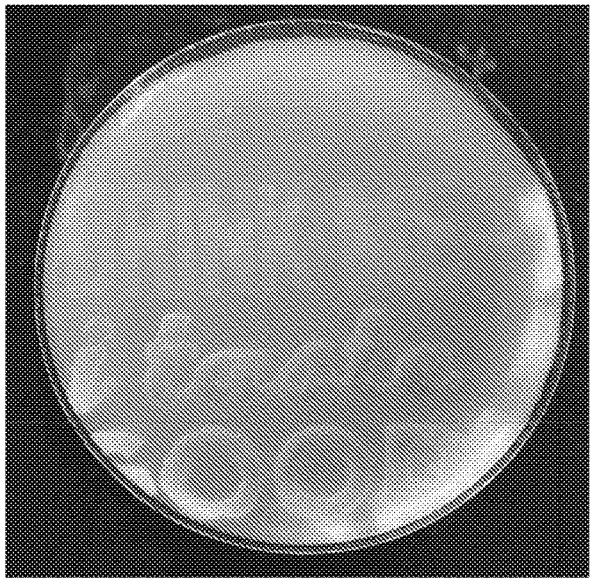
Figure 4A:
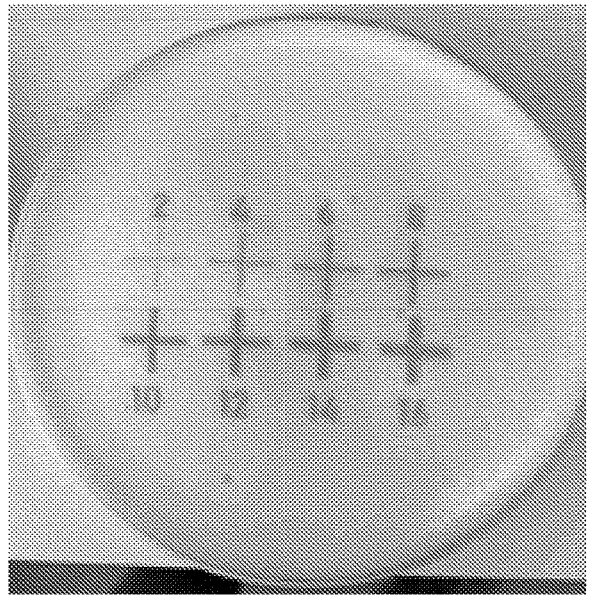
Figure 4B:
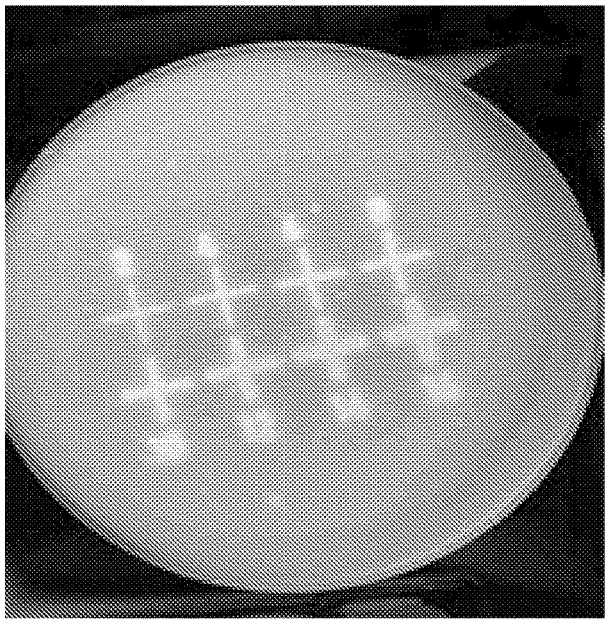
Figure 5A:
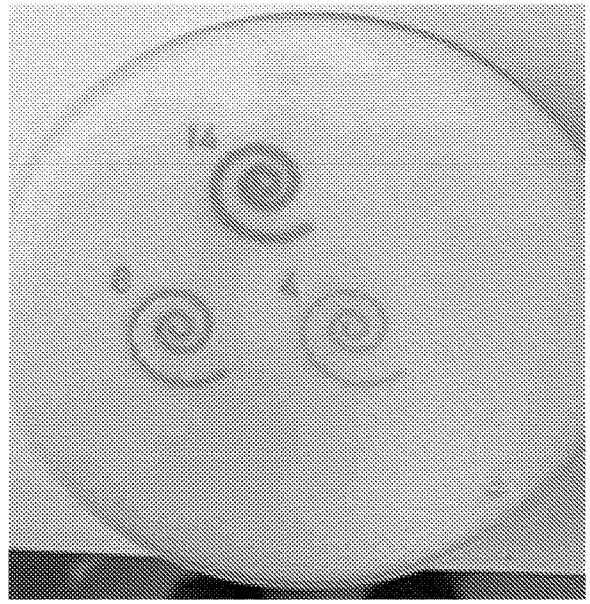
Figure 5B:
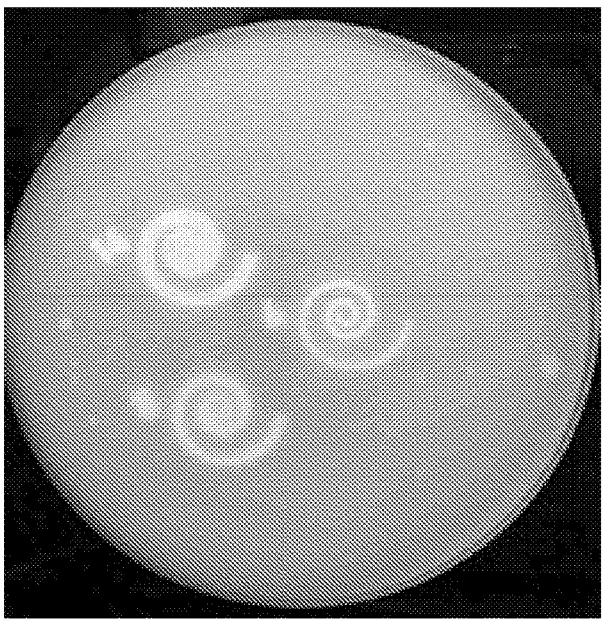
Figure 6A:
Figure 6B:
Figure 7A:
Figure 7B:

In particular, FIGS. 2A-2B are photographs of a first ink-image (i.e. the same ink image) produced using the ink of Example 1, FIGS. 3A-3B are photographs of a second ink-image (i.e. the same ink image) produced using the ink of Example 1, FIGS. 4A-4B are photographs of a third ink-image (i.e. the same ink image) produced using the ink of Example 1, FIGS. 5A-5B are photographs of a fourth ink-image (i.e. the same ink image) produced using the ink of Example 1, FIGS. 6A-6B are photographs of a fifth ink-image (i.e. the same ink image) produced using the ink of Example 1, FIGS. 7A-7B are photographs of a sixth ink-image (i.e. the same ink image) produced using the ink of Example 1. The photographs of FIGS. 2A, 3A, 4A, 5A, 6A and 7A were all produced under white-light, while the photographs of FIGS. 2B, 3B, 4B, 5B, 6B and 7B were all produced under black-light. The photographs of all of FIGS. 2-7 relate to situations where the target substrate 160 is an edible foam—either beer foam or milk foam. In some embodiments, instead of milk foam, foam manufactured from a milk substitute or from egg whites (or any other edible foam as appropriate) may be employed.

Figure 11A:
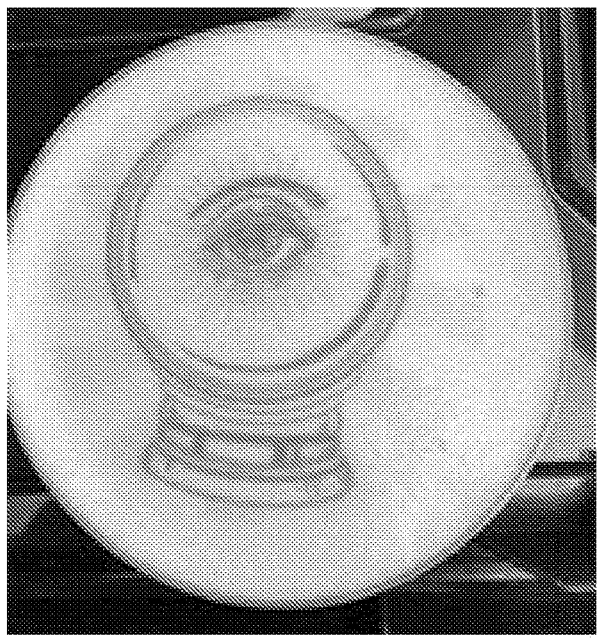
Figure 11B:
Figure 12A:
Figure 12B:
Figure 13A:
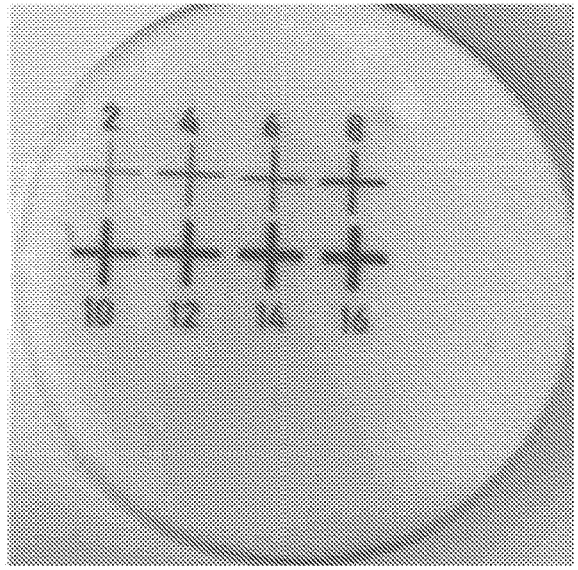
Figure 13B:
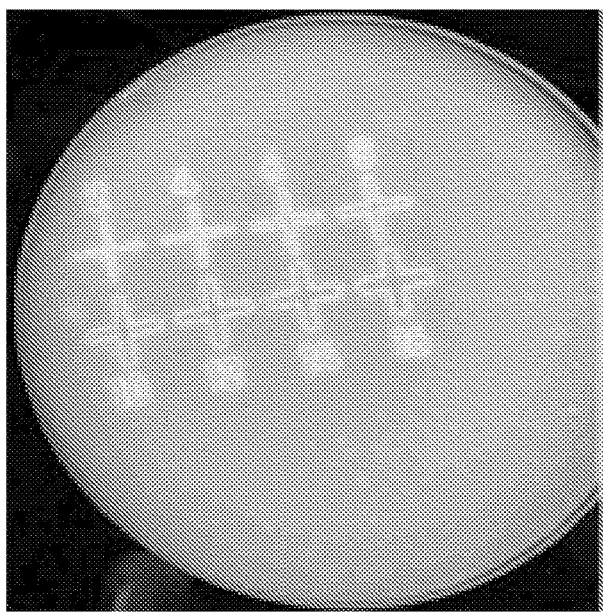
Figure 14A:
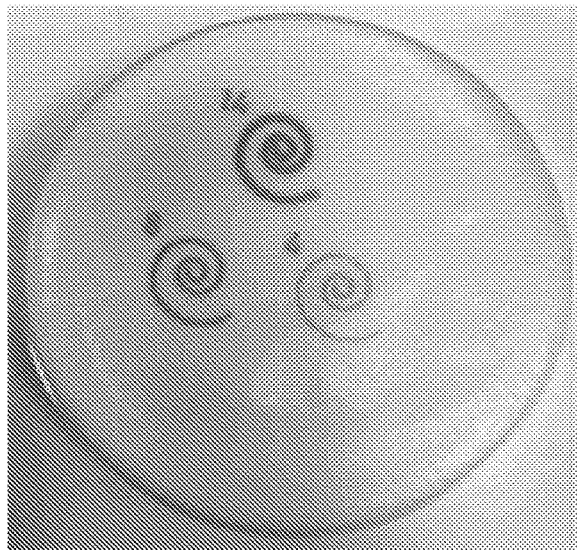
Figure 14B:
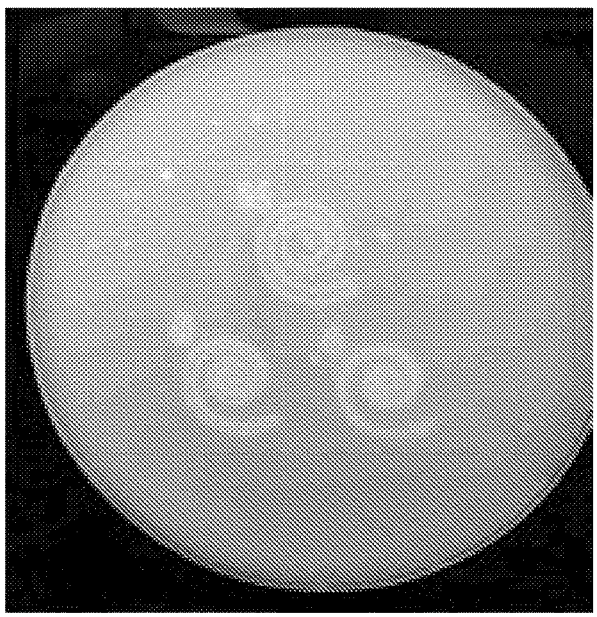
Figure 15A:
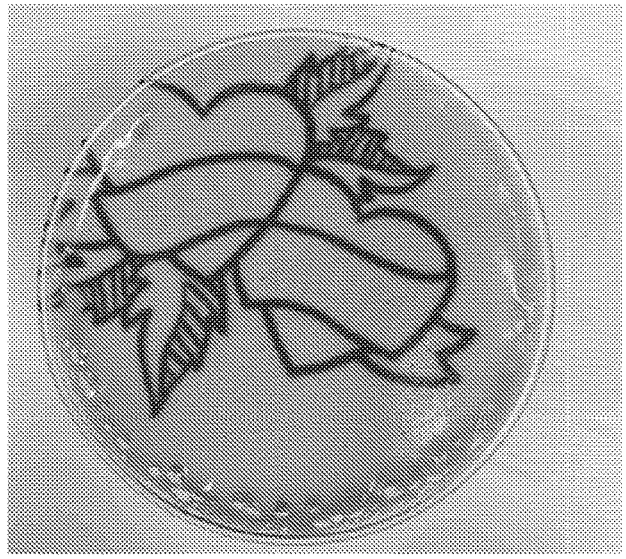
Figure 15B:

In particular, FIGS. 11A-11B are photographs of a first ink-image (i.e. the same ink image) produced using the ink of Example 2, FIGS. 12A-12B are photographs of a second ink-image (i.e. the same ink image) produced using the ink of Example 2, FIGS. 13A-13B are photographs of a third ink-image (i.e. the same ink image) produced using the ink of Example 2, FIGS. 14A-14B are photographs of a fourth ink-image (i.e. the same ink image) produced using the ink of Example 2, FIGS. 15A-15B are photographs of a fifth ink-image (i.e. the same ink image) produced using the ink of Example 2. The photographs of FIGS. 11A, 12A, 13A, 14A, and 15A were all produced under white-light, while the photographs of FIGS. 11B, 12B, 13B, 14B, and 15B were all produced under black-light. The photographs of all of FIGS. 11-15 relate to situations where the target substrate 160 is an edible foam—either beer foam or milk foam. In some embodiments, instead of milk foam, foam manufactured from a milk substitute or from egg whites (or any other edible foam as appropriate) may be employed.

FIGS. 16-17 present photographs of images printed by depositing, onto a milk or beer foam, droplets of an edible ink comprising both an unfermented wort (e.g. wort of a malted grain) and a fluorophore (i.e. riboflavin phosphate).

Figure 16A:
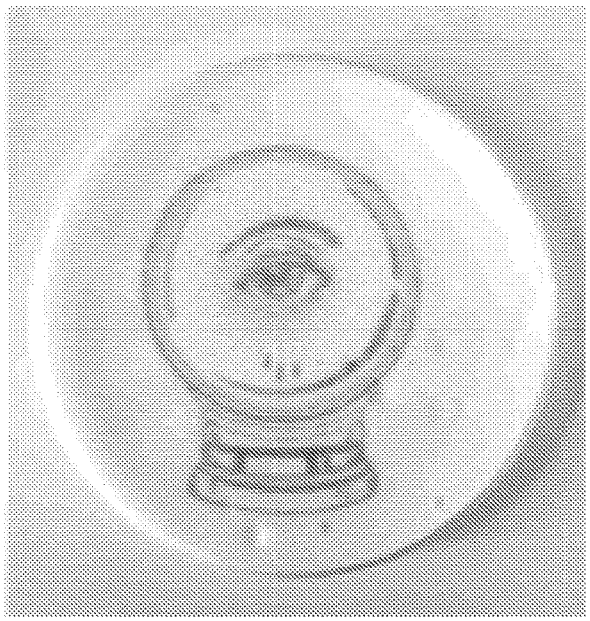
Figure 16B:
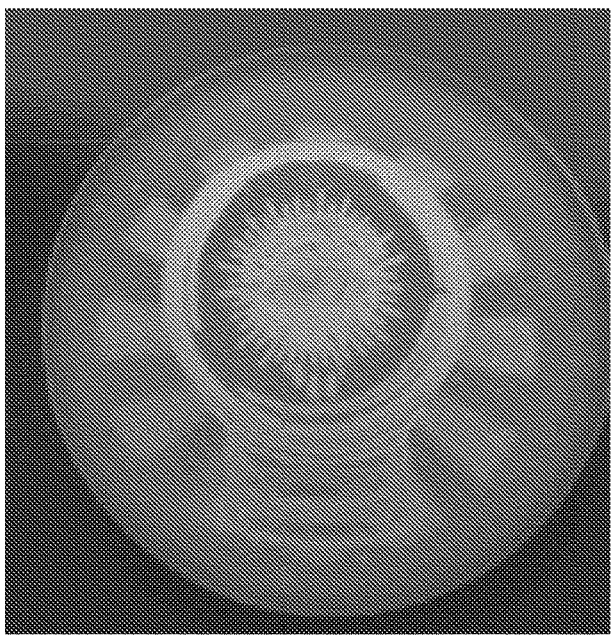
Figure 17A:
Figure 17B:
Figure 18A:
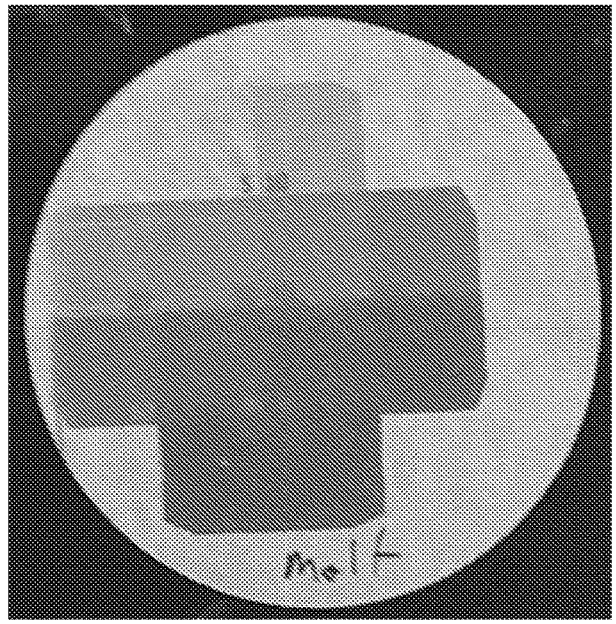
Figure 18B:
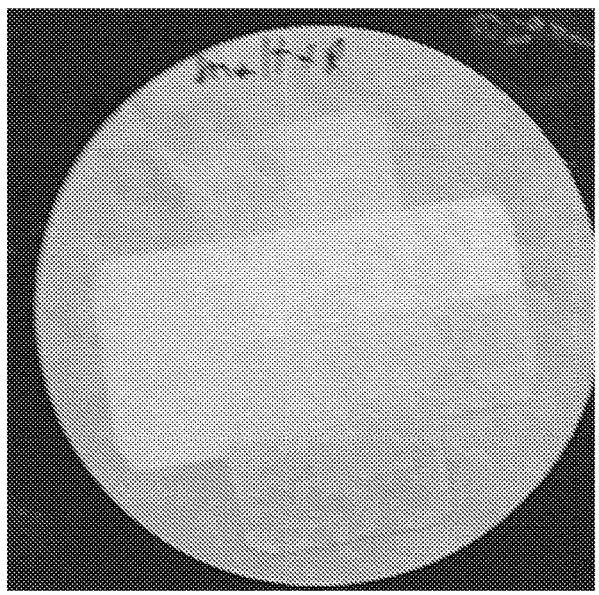
Figure 19A:
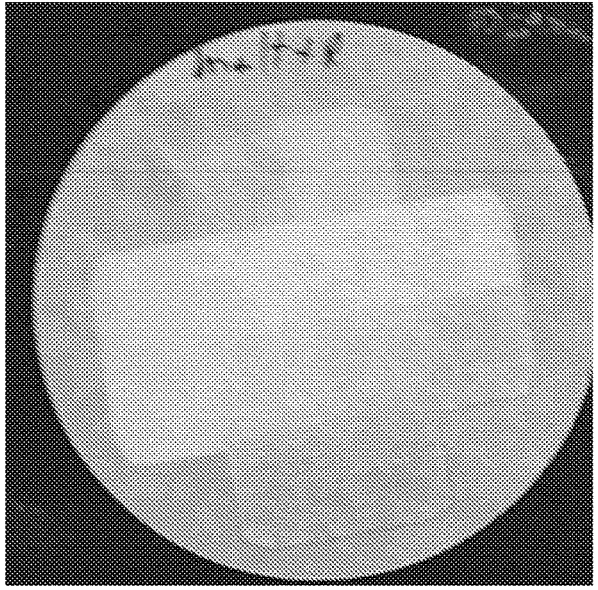
Figure 19B:

In particular, FIGS. 16A-16B are photographs of a first ink-image (i.e. the same ink image) produced using the ink of Example 3, and FIGS. 17A-17B are photographs of a second ink-image (i.e. the same ink image) produced using the ink of Example 3. The photographs of all of FIGS. 16-17 relate to situations where the target substrate 160 is an edible foam—either beer foam or milk foam. In some embodiments, instead of milk foam, foam manufactured from a milk substitute or from egg whites (or any other edible foam as appropriate) may be employed.

Figure 20:
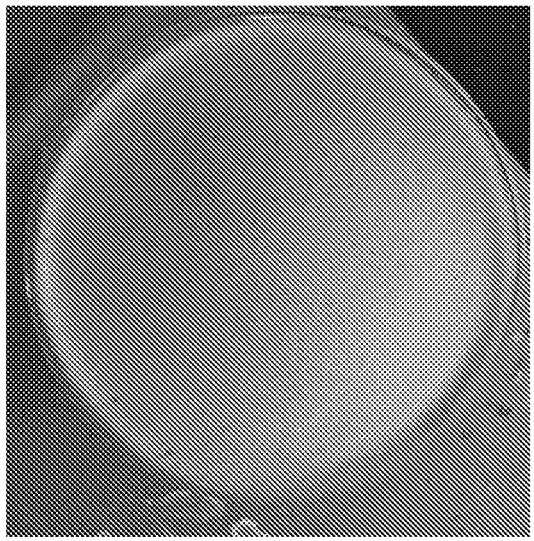

FIG. 20 presents a photograph of an image printed by depositing on milk foam, droplets of an edible ink comprising chlorophyll which functions as a fluorophore(s). The photograph of FIG. 20 was produced under black light.

As will be discussed below with reference to FIGS. 34-37 some embodiments relate to methods of regulating locations and/or sizes of droplets of a fluorescent and edible ink so as to produce, from only a single ink-jet cartridge, an image which is multi-color when viewed under black (i.e. UVA) light. A discussion of these methods is presented below.

NOTE—in certain images (FIG. 3B) the letters of the word "I taste good" appear in red (or light red) with a yellow outline.

Figure 9A:
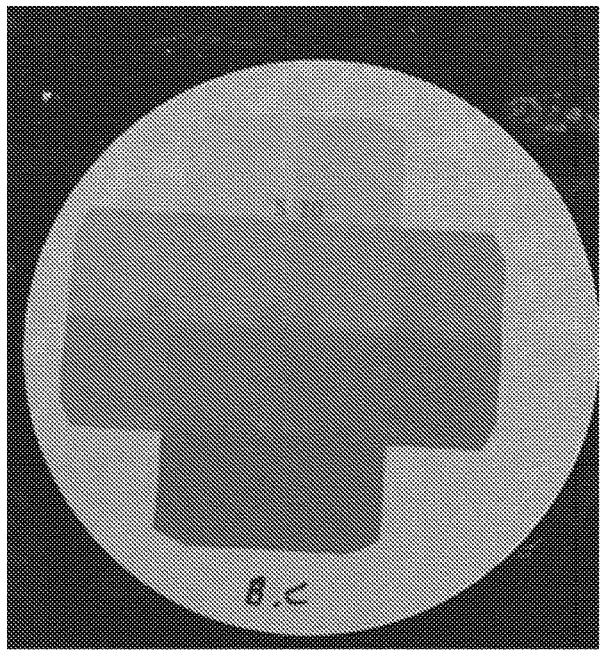
Figure 9B:
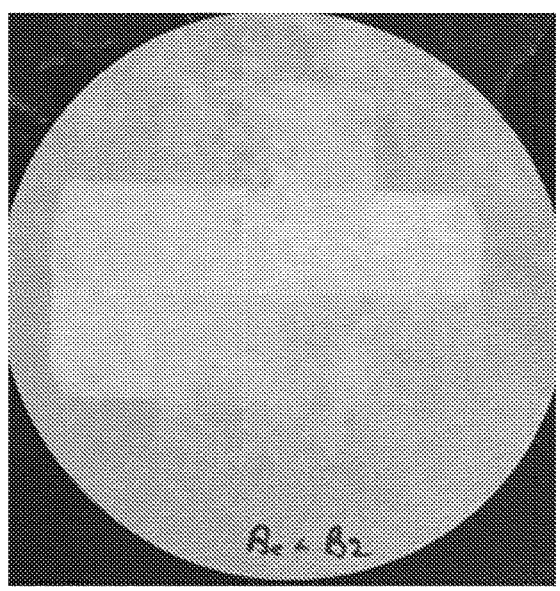
Figure 10A:
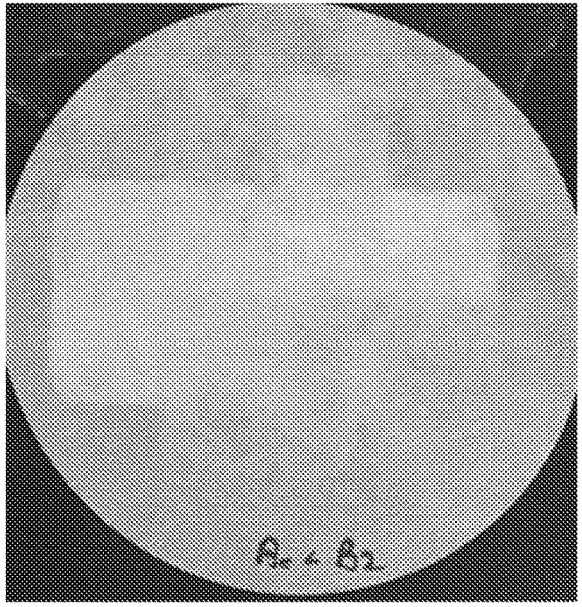
Figure 10B:
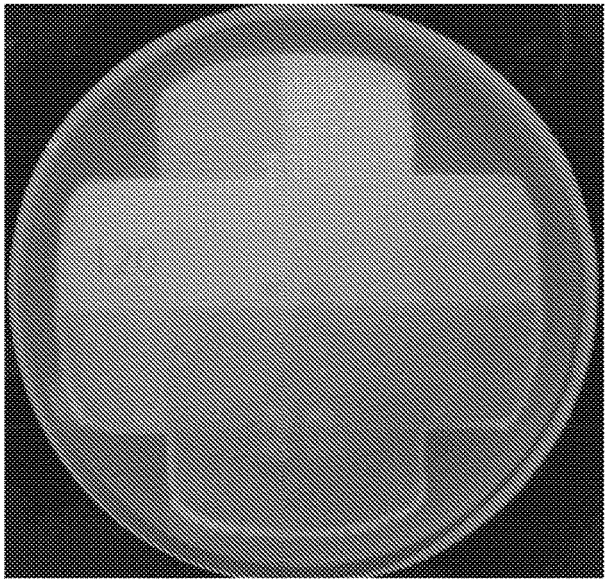

The following RGB follows may be relevant for the colored figures (e.g. letters in FIG. 3A of "I taste good")—FIG. 3A RGB: 148, 62, 41; FIG. 3B RGB: 167, 134, 98; FIG. 4A RGB: 143, 91, 74 FIG. 4B RGB: 214, 219, 72; FIG. 5A RGB: 169, 104, 85; FIG. 5B RGB: 223, 231, 82; FIG. 6A RGB: 189, 102, 86; FIG. 6B Drink me—>RGB: 187, 226, 158 I taste good —>RGB: 193, 171, 101; FIG. 7A RGB: 183, 177, 168; FIG. 7B RGB: 180, 236, 115; FIG. 9A RGB: 131, 77,197 FIG. 9B RGB: 208, 175, 154; FIG. 10A RGB: 208, 175, 154

Ink Comprising Unroasted Natural-Colorant-Bearing Plant Matter—In some embodiments, the edible inks comprise an extract of natural-colorant-bearing plant matter—i.e. unroasted plant matter.

Unroasted natural-colorant-bearing plant matter or colorant(s) thereof are in contrast to colorant produced by an artificial process (e.g. roasting and/or pyrolysis)—i.e. in contrast to Maillard and/or caramelization products such as Mallaird particles or caramel.

Natural-colorant-bearing plant matter is plant matter that includes any combination of one or more naturally-occurring colorants which naturally occur within the plant matter. The natural colorant(s) may be a natural dye or pigment.

The colorant is present within the ink formulation as solids (e.g. dissolved and/or suspended within water of the formulation) of extract of the plant matter. In embodiments of the invention, this is in contrast to colorant which is pre-isolated from the plant matter origin and then added to the ink formulation.

In different embodiments, the extract of natural-colorant-bearing plant matter may comprise extract of one or more of the following (or combinations thereof):
  (i) fruit—e.g. extract of grapes, cranberries, currant, blueberry, tomato, black currant, annatto, and/or any berry.
  (ii) vegetables and/or leaves and/or flowers and/or peels and/or root and/or seed and/or stem and/or bark and/or husk—e.g. extract of carrot, black carrot, beet, beetroot, spinach, yellow carrot, cabbage and/or red rice.
  (iii) grains—e.g. extract of red rice; and
  (iv) spices—e.g. turmeric, paprika.

As noted above, natural-colorant-bearing plant matter is plant matter that includes natural colorants. Colorants include one or more of (i.e. any combination of) anthocyanin, chlorophyllin (e.g. Copper chlorophyllin), carotenoid pigments, bixin, norbixin, flavonoids, indole-derived pigments (e.g. betalains), carmine, lutein, xanthophyll or any other colorant which occurs in nature.

Instead of providing such colorant from artificial sources, it is possible to rely on (e.g. to rely exclusively on) extract of plant matter, and specifically on extract of unroasted plant matter. For example, to rely on the This provides an edible ink which both complies with natural food requirements and has sufficient optical density to print an image (e.g. by ink-jet image) on a food or beverage (e.g. on foam of a foamed beverage such as beer, a beverage (e.g. cocktail) having egg white material on an upper surface thereof, and a coffee beverage such as a cappuccino). Towards this end, it may be necessary for the extract of the (e.g. unroasted) plant matter to be present in the edible ink formulation at a sufficient concentration to provide a requisite optical density.

Without limitation, such a requisite optical density may enable the printing of an image using relatively small droplets—e.g. having a size of at most 60 picoliters or at most 50 picoliters or at most 40 picoliters—e.g. using only a single droplet per pixel without a need for 'double pass' printing.

In some embodiments, the edible ink has the following property: when diluted 1:90 with water to produce a diluted colorant formulation, an optical density of the diluted colorant formulation at a visible wavelength (e.g. 520 nanometers) is at least $OD_{MIN}$, a value of $OD_{MIN}$ being at least 0.5.

In different embodiments, a value of $OD_{MIN}$ is at least 0.4, 0.5, or at least 0.6, or at least 0.7, or at least 0.8, or at least 0.9, or at least 1.0.

In some embodiments and without limitation, such small droplets and/or such a high optical density may be useful in situation where the ink formulation includes one or more 'bad-tasting' ingredients. In such situations, contradicting design requirements may be the following: (i) the need for a clearly visible image which requires deposition of a relatively 'large' quantity of colorant to form the image; and (ii) the need to employ at most a 'small' amount of ink to deliver this relatively 'large' quantity.

Edible Ink Comprising One or More Fluorophore(s)—In some embodiments, edible ink is fluorescent and/or comprises one or more fluorophore(s).

The ink may comprise one or more of (i.e. any combination of) the following edible fluorophore(s) (or any other edible fluorophore(s)): Riboflavin, Riboflavin phosphate including riboflavin 5'-phosphate, Pyridoxine hydrochloride, Folic acid, Quinine sulfate, Niacin, Nicotinamide, and Chlorophyll.

In some embodiments, the ink comprises at least 0.05% wt/wt (e.g. at least 0.075% wt/wt or at least 0.1% wt/wt) Riboflavin or Riboflavin phosphate or riboflavin 5'-phosphate. Alternatively or additionally, a concentration of Riboflavin or Riboflavin phosphate or riboflavin 5'-phosphate is at most 1% wt/wt or at most 0.5% wt/wt or at most 0.4% wt/wt or at most 0.3% wt/wt or at most 0.2% wt/wt.

The fluorophore may be present as a separate ingredient from the from the extract of the plant matter and/or present in the ink formulation at a relatively 'high' concentration—for example, a ratio between a $$\frac{\text{concentration of the fluorophere in the ink formulation}}{\left(\begin{array}{c}\text{concentration of plant matter}\\\text{in the ink formulation} \times\\\text{concentration of the fluorophore as it}\\\text{naturally occurs in the plant matter}\end{array}\right)}$$

may be 5, or at least 10, or at least 15, or at least 20.

A Discussion of Color Properties (e.g. LAB Values) of the Fluorescent Inks, Ingredients Thereof and Ink-Images Produced therefrom Some embodiments of the present invention relate to a method for producing, by ink-jet printing and from a fluorescent (e.g. edible) ink, an image into a target substrate where the resulting image, when viewed must be visible (e.g. highly visible) and/or have a significant contrast with the target substrate.

This may be expressed in terms of the CIELAB color space (also known as CIE L*a*b* or sometimes abbreviated as simply "Lab" color space), where the lightness value, L* (or just L value), represents the darkest black at L*=0, and the brightest white at L*=100.

Below is a table of LAB values for various colors [TABLE 1]:

| Color | L value | a value | b value |
|---|---|---|---|
| Orange | 55 | 53 | 64 |
| Brown | 27 | 13 | 17 |
| Red | 41 | 59 | 48 |
| Cream-White | 90 | 1 | 8 |
| Jet-Black | 4 | 0 | −1 |
| Yellow | 78 | 11 | 94 |
| Maroon | 26 | 48 | 38 |

The darker colors have lower L values.

One feature of the LAB space is the ability to describe the difference between colors—this is done by the Cartesian distance between LAB coordinates of respective colors, also known as the LAB distance.

Below is a table of LAB distances between various colors [TABLE 2]:

| Color | LAB distance to Orange | LAB distance to Brown | LAB distance to Red | LAB distance Cream-White | LAB distance to Jet-Black | LAB distance to yellow | LAB distance to Maroon |
|---|---|---|---|---|---|---|---|
| Orange | 0 | 68 | 22 | 84 | 98 | 57 | 39 |
| Brown | 68 | 0 | 57 | 65 | 32 | 92 | 41 |
| Red | 22 | 57 | 0 | 86 | 85 | 76 | 21 |
| Cream-White | 84 | 65 | 86 | 0 | 86 | 87 | 85 |
| Jet-Black | 98 | 32 | 85 | 86 | 0 | 121 | 66 |
| Yellow | 57 | 92 | 76 | 87 | 121 | 0 | 85 |
| Maroon | 39 | 41 | 21 | 85 | 66 | 85 | 0 |

Thus, we see that orange is relatively "close" to red (LAB distance of 22)—orange is much closer to red (LAB distance of 22) than it is to yellow (LAB distance of 57).

Below is a table which only relates to an absolute value of DELTA L—i.e. how dark a color is. Thus, we see that brown and maroon have relatively the same 'darkness' reflected by $|L_{BROWN}-L_{MAROON}|$ of only 1 [Table 3]:

| Color | absolute value(ΔL) to Orange | absolute value(ΔL) to Brown | absolute value(ΔL) to Red | absolute value(ΔL) to Cream-White | absolute value(ΔL) to Orange | absolute value(ΔL) to Jet-Black | absolute value(ΔL) to Maroon |
|---|---|---|---|---|---|---|---|
| Orange | 0 | 28 | 14 | 35 | 51 | 23 | 29 |
| Brown | 28 | 0 | 14 | 63 | 23 | 51 | 1 |
| Red | 14 | 14 | 0 | 49 | 37 | 37 | 15 |
| Cream-White | 35 | 63 | 49 | 0 | 86 | 12 | 64 |
| Jet-Black | 51 | 23 | 37 | 86 | 0 | 74 | 22 |
| Yellow | 23 | 51 | 37 | 12 | 74 | 0 | 52 |
| Maroon | 29 | 1 | 15 | 64 | 22 | 52 | 0 |

We now make some observations about FIGS. 2A-2B:
(i) when viewed under white-light conditions, the target substrate is approximately cream-white, and $L_{TARGET-SUBSTRATE-UNDER-WHITE-LIGHT}$ 80.
(ii) when viewed under white-light conditions, the fluorescent ink used to produce the image of FIG. 2A is approximately maroon in color, $L_{INK-UNDER\_WHITE\_LIGHT} \approx 40$.
(iii) when viewed under white light conditions, an LAB distance between the fluorescent ink and the target substrate (e.g. LAB between maroon and cream-white is at about 85) is at least 50 or at least 60 or at least 70;
(iv) the fluorescent ink as viewed under white light conditions is significantly darker than the target substrate as viewed under white light conditions (64 for the case of maroon and cream white)—i.e.$|L_{INK-UNDER\_WHITE\_LIGHT}-L_{TARGET-SUBSTRATE-UNDER-WHITE-LIGHT}|$ is at least 35 or at least 40 or at least 45 or at least 50 or at least 55 or at least 60.
(v) when viewed under white-light conditions, the pixels of the image of FIG. 2A is approximately maroon in color—thus, FIG. 2A-2B relate to method of ink-jetting an image onto a target substrate where, when: (A) viewed under white light, pixels (e.g. at least 30% of, or at least a majority of, or at least 70% of the ink-image produced by ink-jetting the fluorescent ink) pixels of the image, are darker (e.g. significantly darker than) the target substrate (i.e. $|L_{PIXELS-OF-INK-IMAGE-UNDER\_WHITE\_LIGHT}-L_{TARGET-SUBSTRATE-UNDER-WHITE-LIGHT}|$ is at least 35 or at least 40 or at least 45 or at least 50 or at least 55 or at least 60.

Figure 21:
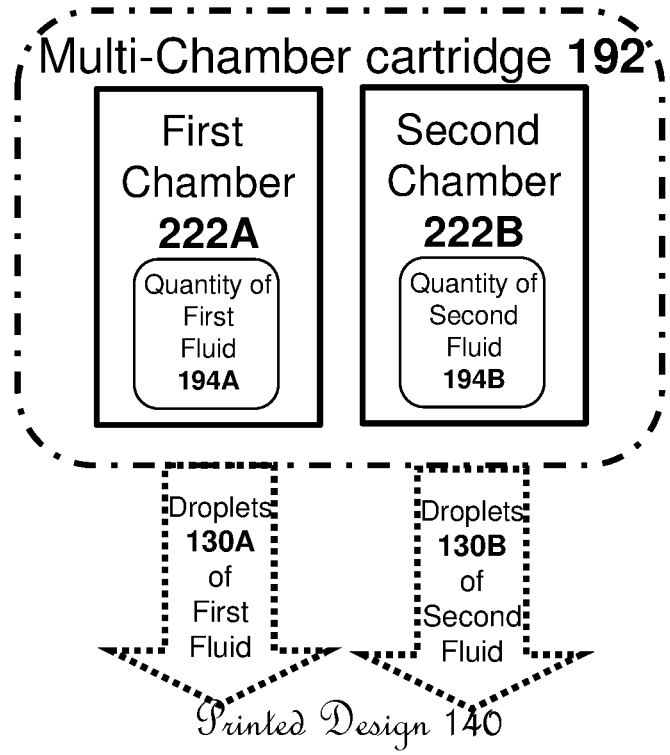
FIG. 21 relates to an embodiment employing a multi-chamber cartridge.

The ink-image of FIGS. 2A-2B was produced by ink-jetting only a single ink, which is fluorescent. For example, using an arrangement such as that presented in FIGS. 1A-1B (e.g. only a single ink-jet cartridge having in which only a single ink is stored, the single (e.g. edible and/or aqueous) ink comprising first and second colorants, at least the first colorant being a visible-light colorant and the second colorant being a fluorophore. Alternatively, the present inventor contemplates embodiments such as the illustrated in FIG. 21—the image may be formed from multi-colorant, for example, by half-toning between droplets of the first and second fluids.

Additional Note about Certain Multi-colorant Inks Comprising a First Colorant which is a White-light Visible Colorant and a Second Colorant which is a Fluorophore—

In some embodiments, (i) both of the first and second colorants are white-light-visible colorants (i.e. the second colorant is both a white-light-visible colorant as well as a fluorophore); and (ii) a presence of the first colorant within the ink formulation means that a white-light-visible color of the ink formulation a whole is "significantly different" from a white-light-visible color of the first colorant.

For example (numbers may relate to the ink of Example 1), an LAB distance between (i) white-light-visible color of the ink formulation a whole (e.g. in Example 1 red or orange due to a presence of black carrot which functions as the 'second colorant') and (ii) a white-light-visible color of the second colorant (i.e. a fluorophore e.g. riboflavin 5 phosphate which is yellow or yellowish) may be (see Table 3—see e.g. Orange to Yellow LAB distance or Red to Yellow LAB distance) at least 30 or at least 40 or at least 50 or at least 60.

Additional Design Considerations and Features Related to Fluorescent Inks—

As will be noted above , ink formulations including a fluorophore(s) may be required both to be fluorescent and to have visible-light properties.

As will be discussed below with reference FIGS. 6B, the present inventor has discovered that when droplets of the some presently-disclosed ink formulations are deposited on certain substrates (e.g. flowable matter such as a foam and/or a surface of a bed), it is possible to produce an ink-image which is multi-color when viewed under black-light.

In some embodiments, this ink-image is both multi-color when viewed under black-light and monochrome when viewed under white-light.

The term 'multi-color' is in contrast to gray scale or different shades of the same color.

The present inventor is not aware of any prior-art whereby it is possible to produce a multi-color image using by depositing droplets of only a single ink comprising multiple colorants. The present inventor is not aware of any prior-art whereby it is possible to produce a multi-color image by depositing fluid from only a single reservoir.

In some embodiments, the relative concentrations of the first and second colorants of the edible ink are selected to provide particular black-light properties—i.e. in particular, related to the ability to print a multi-color image when viewed under black light.

Consider an ink-formulation (e.g. that of Example 1) as follows: (i) the ink comprises first and second colorants; (ii) riboflavin 5' phosphate is the 'first colorant' and black carrot extract is the second colorant. If a ratio between relative concentrations of the first and second colorants is relatively 'high' (e.g. 'too high'), the visible-light ink color might be "undesired" yellow or yellow-green. However, if this ratio is 'too low,' the ink formulation might not be sufficiently fluorescent and/or the ink 'black carrot extract' might "overpower" the riboflavin 5' phosphate, thereby compromising the ability to print images (or certain images) that are multi-color (i.e. including at least yellow and red) when viewed under black light.

As noted above, the present inventor is not aware of any prior-art whereby it is possible to produce a multi-color image using by depositing droplets of only a single ink. As noted above, the present inventor is not aware of any prior-art whereby it is possible to produce a multi-color image by depositing fluid from only a single reservoir.

Some embodiments of the invention relate to methods and apparatus for targeting and/or controlling multi-color properties of images (i.e. multi-color images as viewed under black light or any other UVA light or light from a 450 nm LED) produced depositing droplets of an edible fluorescent ink onto a target substrate (e.g. flowable matter such as a foam and/or a surface of a bed).

Additional Ingredients and/or Properties of the Ink Formulation

In different embodiments, the ink formulation (e.g. Category "A" or Category "B" or Category "C" or any ink formulation disclosed or employed in any method disclosed herein) may provided one or more of the following:

I. The ink formulation may be rich in apple cider vinegar—e.g. comprising at least 2% wt/wt or at least 2.5% wt/wt or at least 3% wt/wt or at least 3.5% wt/wt or at least 4% wt/wt. Alternatively or additionally, the ink formulation comprises GSE (grapefruit seed extract)—e.g. comprising at least 0.1% wt/wt or at least 0.25% wt/wt or at least 0.5% wt/wt or at least 1% wt/wt or at least 1.5% wt/wt or at least 2% wt/wt or at least 3% wt/wt or at least 5% GSE.

II. The edible ink formulation comprises a pH controlling agent for regulating the pH to at most 4 or to at most 3.8 or at most 3.5 or at most 3.25 or at most 3.1 or at most 3. For example, the edible ink formulation includes lemon juice and/or citric acid. The pH controlling agent may function as an anti-microbial agent.

Experiments of the invention relate to extending the shelf-life of ink formulations using only natural ingredients. For example, a presence pH controlling agents may sufficiently impede the growth of only some microbes (e.g. bacteria)—e.g. mold may grow at an unacceptable rate even at a relatively low pH. In some embodiments, a presence of a 'large' quantity (e.g. an extremely large quantity) of apple cider vinegar and/or GSE may impede microbe growth (e.g. growth of mold) to extend the shelf life of ink formulation—e.g. without a need for a standard anti-microbial such as potassium sorbate.

III. The ink formulation may include a very high concentration of extract of natural-colorant-bearing plant matter (e.g. roasted natural-colorant-bearing plant matter) and/or of colorants thereof—for example (and without limitation), in order to overcome the fact that an ink formulation rich in apple cider vinegar and/or GSE is liable to ruin the taste of the target food and/or beverage on which the image is printed (e.g. by ink-jet printing), IV. In order to meet natural foods requirements, certain colorants may only be present in the form of an extract (e.g. solids thereof) of the plant matter (e.g. extract of roasted plant matter), rather than as agents that are first separated from the plant matter and then added to the ink formulation.

V. In different embodiments, the ink formulation lacks metal ions and/or a concentration of metal ions within the ink formulation is at most 0.1% or at most 0.05% or at most 0.01% wt/wt.

VI. in different embodiments, the edible ink includes a humectant. Different humectants known in the art include: glycerol GRAS, propylene glycol, Propylene glycol—MISC, polyethylene glycol 200, polyethylene glycol 400, polyethylene glycol 600, or mixtures thereof. Glucose, sorbitol, Xylitol, mannitol, ethanol, sucrose, dextrose, and fructose, A preferred ink formulation may include about 5% to about 20% by weight of glucose, about 1% to about 20% by weight sorbitol, and about 5% to 40% by weight glycerol. Preferably, the humectant is selected to comply with USDA Policy book to carry a natural claim.

For the present disclosure, any time it is stated that an ink (or other composition) comprises at least X % wt/wt humectant, this may also refer to at least one of the following limitations: (i) the ink (or other composition) comprises at least X % glycerol; (ii) the ink (or other composition)

comprises at least X % sorbitol; (iii) the ink (or other composition) comprises at least X % mannitol; (iv) the ink (or other composition) comprises any combination of glycerol (at a concentration of x1% wt/wt, x1%) and/or sorbitol (at a concentration of x2% wt/wt, x2%) and/or mannitol (at a concentration of x3% wt/wt, x3%) and optionally additional humectant), where (x1+x2+x3)≥X.

VI. in different embodiments, the edible ink comprises a pH adjusting agent. Examples include Citric acid, Acetic acid, Ascorbic acid, Malic acid, Propionic acid, Tartaric acid and Fumaric acid. The pH adjusting agent is used, for example, in an amount ranging from about 0.5% by weight to about 10% by weight of the ink composition. The selection of a pH adjusting agent and the amount thereof depends on the required adjustment of the pH.

VII. in different embodiments, the edible ink comprises an anti-microbial agent. For example, the anti-microbial is selected to comply with USDA Policy book to carry a natural claim—e.g. anti-microbials that do not meet USDA policy book are absent so that the ink as a whole meets USDA policy book. Examples of antimicrobrial agents which may comply with USDA Policy book to carry a natural claim include: Apple cider Vinegar, Prune juice concentrate, Raisin paste concentrate, Raisin juice concentrate, Cinnamon, clove, Grapefruit seed extract (GSE). Note—Although prune juice and raise-based anti-microbials may be employed for some applications, in other applications they may be less preferred due to their cost and/or ability to increase the viscosity of the ink and/or color-properties. Thus, in some embodiments, Apple Cider Vinegar (e.g. at a concentration of at least 2% or at least 3% or at least 4% wt/wt, or at least 6% wt/wt depending on the desired shelf-life of the edible ink) and/or GSE is the preferred anti-microbial. Furthermore, in some applications GSE is preferred as an anti-microbial agent—in other applications, GSE may be avoided—e.g. due to cost which is greater than that of Apple cider vinegar.

Wetting Agent—preferably wetting agent which meets USD policy book.

Discussion of FIGS. 22-31

Note—the current section does not require fluorescent inks, and the teachings disclosed herein may be practiced using any of Category A, Category B and Category C inks (see FIG. 1F).

Additional Discussion of FIGS. 6A-6B and 8A-8D

Further discussions of fluorescent inks and related apparatus and methods are now provided.

Figure 8C:
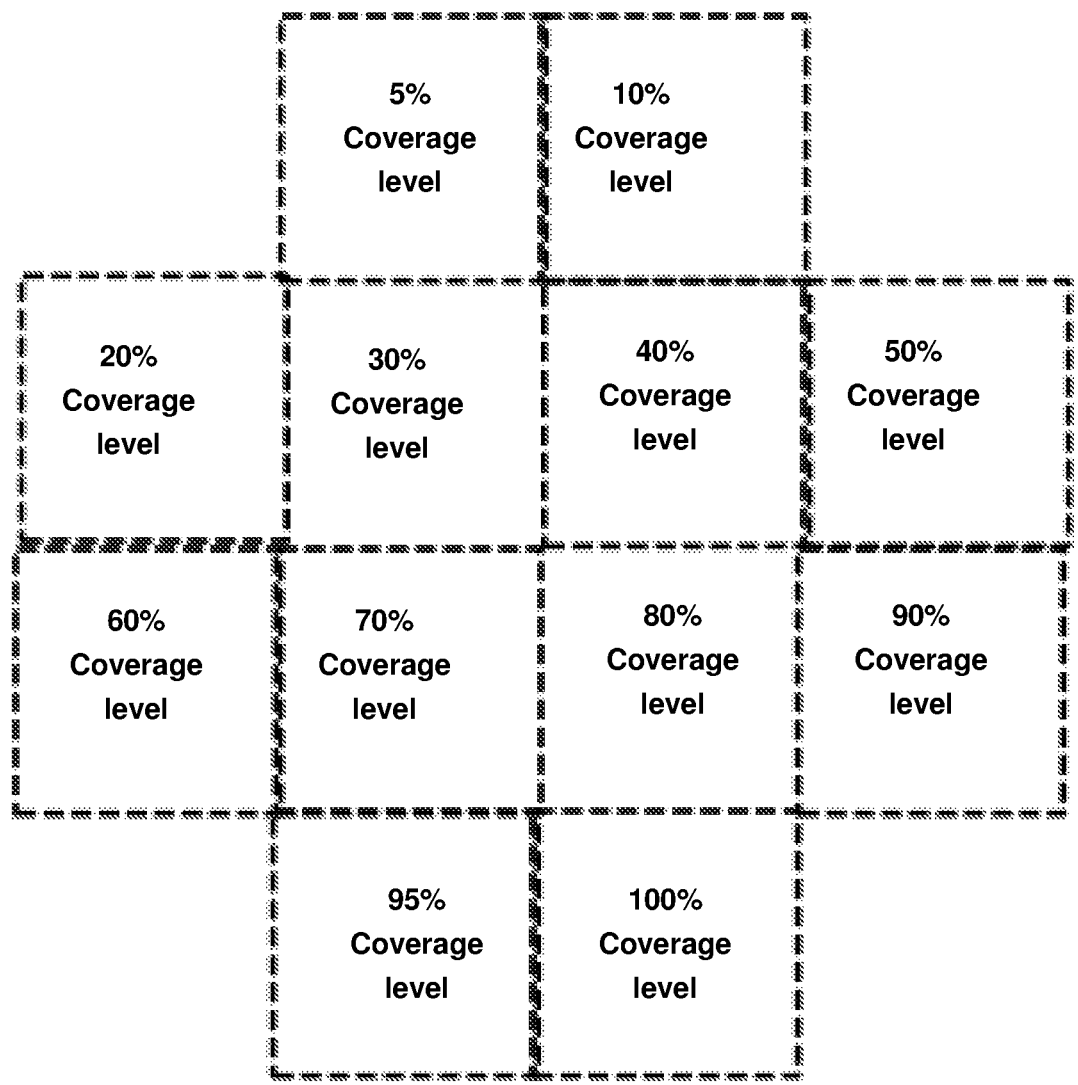
FIG. 8C-8D illustrate coverage levels in a cross-sheme.
Figure 8D:
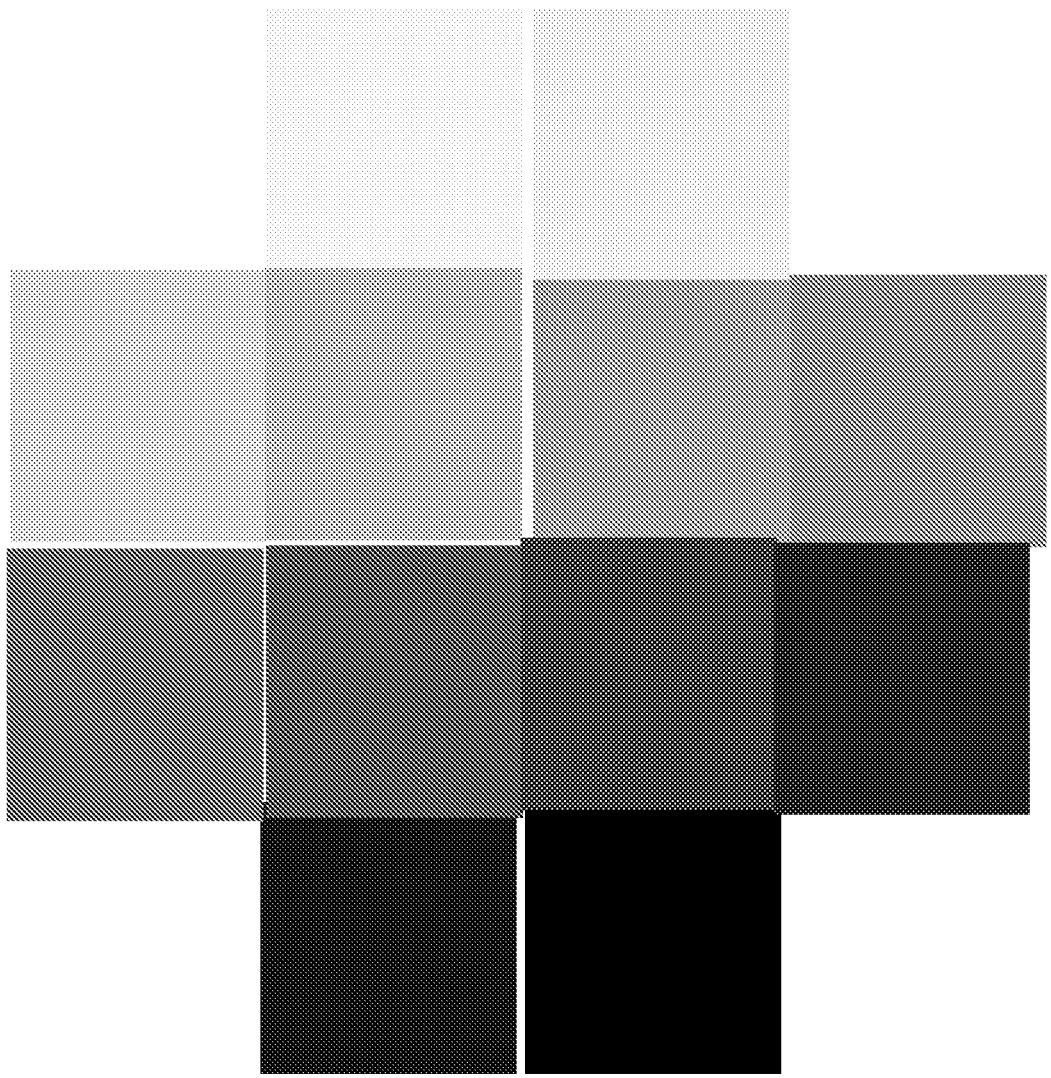

FIGS. 8C-8D illustrate coverage levels in a cross-scheme. This 'cross scheme' of FIGS. 8C-8D describes the digital images 178 that were printed (e.g. by ink-jet printer 100) to produce the ink images of FIGS. 9-10 and 18-19.

FIGS. 6A-6B are photographs of a fifth ink-image (i.e. the same ink image) produced using the ink of Example 1. In particular, the ink-image is printed as in FIG. 1A—a digital image 178 stored in digital memory (e.g. pixel-data) is converted into an ink-jet image by ink-jet printer 100 whereby droplets 130 of ink 190 (e.g. the ink of Example 1) are deposited onto a foam target substrate 160.

In order to produce the ink-images of FIGS. 6A-6B, the digital image 178 of FIG. 8B is printed onto the foamed substrate. This digital image includes the words "DRINK ME I taste GOOD." In FIG. 6B, the words DRINK ME are in yellow and the words I taste word are mostly in red (with a yellow envelop).

Not wishing to be bound by theory, the present inventor believes that generally speaking riboflavin 5'-phosphate can be highly fluorescent and has a distinct yellow color. In locations where the physical density of the ink (i.e. as a whole) is relatively "high," there may be sufficient red black carrot extract to 'overpower' the yellow. In particular, the riboflavin 5'-phosphate has an emittance peak at around 540 nm, and this light may be absorbed by the black carrot extract so that the color of portions of the ink image where the physical density of ink is 'relatively high' appear red. However, in areas where the droplet density is lower (e.g. due to the lower coverage of the words 'DRINK ME' in the digital image 178 of FIG. 8B), there may be insufficient black carrot extract for this to occur, and in this portion of the image is yellow, the color of riboflavin 5'-phosphate.

The term 'coverage' (used synonymously with 'coverage fraction') or greyscale level is borrowed from the art of half-toning. The term 'coverage' may related to an entire digital image 178 or to an object within the digital image 178 (e.g. the letters of FIG. 8B) or a portion of the digital image 178 or portion of an ink image printed/produced from the digital image 178. For example, the aforementioned 'portion' of the digital or ink image (e.g. corresponding to a group of pixels in step S309 or S313 of FIG. 37) may comprise at least square region which is (i) at least 5 pixels by 5 pixels or (ii) at least 10 pixels by 10 pixels or (iii) at least 15 pixels by 15 pixels or (iv) at least 20 pixels by 20 pixels or (v) at least 30 pixels by 30 pixels or (vi) at least 40 pixels by 40 pixels or (v) at least 50 pixels by 50 pixels or (vi) at least 75 pixels by 75 pixels or (v) at least 100 pixels by 100 pixels or (vi) at least 150 pixels by 150 pixels or (vii) at least 200 pixels by 200 pixels or (viii) at least 300 pixels by 300 pixels. Alternatively or additionally, the aforementioned 'portion' (e.g. corresponding to a group of pixels in step S309 or S313 of FIG. 37) of the corresponding ink image may comprise a square region whose size is (i) at least 5 mm by 5 mm or (ii) at least 1 cm by 1 cm or (iii) at least 1.5 cm by 1.5 cm or (iv) at least 2 cm by 2 cm or (v) at least 3 cm by 3 cm or (vi) at least 4 cm by 4 cm or (vii) at least 6 cm by 6 cm or (viii) at least 8 cm by 8 cm or (x) at least 10 cm by 10 cm.

The Applicant notes that in the prior art, when an ink image is printed from only a single reservoir of ink (e.g. within an ink-jet cartridge), variations in coverage (i..e. within the digital image 178 that is converted into an ink image by droplet deposition) of features may be employed to achieve different coverage or gray-scales of a single color (i.e. the color of the ink). Thus, in the prior art, it is possible to modify/pre-process (i.e. by a digital computer—for example, of electronic circuitry 170) the digital image 178 of FIG. 8A into that FIG. 8B in order to target a 'grey portion' in the 'DRINK ME' portion of the resulting ink image.

Embodiments of the invention relate to disclosing something different. Not only is it possible, for the first time, to produce a multi-color ink-image (i.e. specifically as viewed under black light) from a only single reservoir of liquid (i.e. fluorescent and edible ink), but it is possible to control color (i.e. first versus second colors—as opposed just to color shade) of each portion of the image by pre-processing an input digital image (e.g. see FIG. 8A) into an output digital image (e.g. see FIG. 8B) which is subsequently converted into an ink image by ink-jet printing.

Black light 'conditions' may be provided when sufficient ambient light is blocked out (e.g. in one example when substantially all ambient light is blocked out or in another example when the object is viewed at night with no artificial light provided) so that an object is illuminated primarily under black light.

Figure 32:
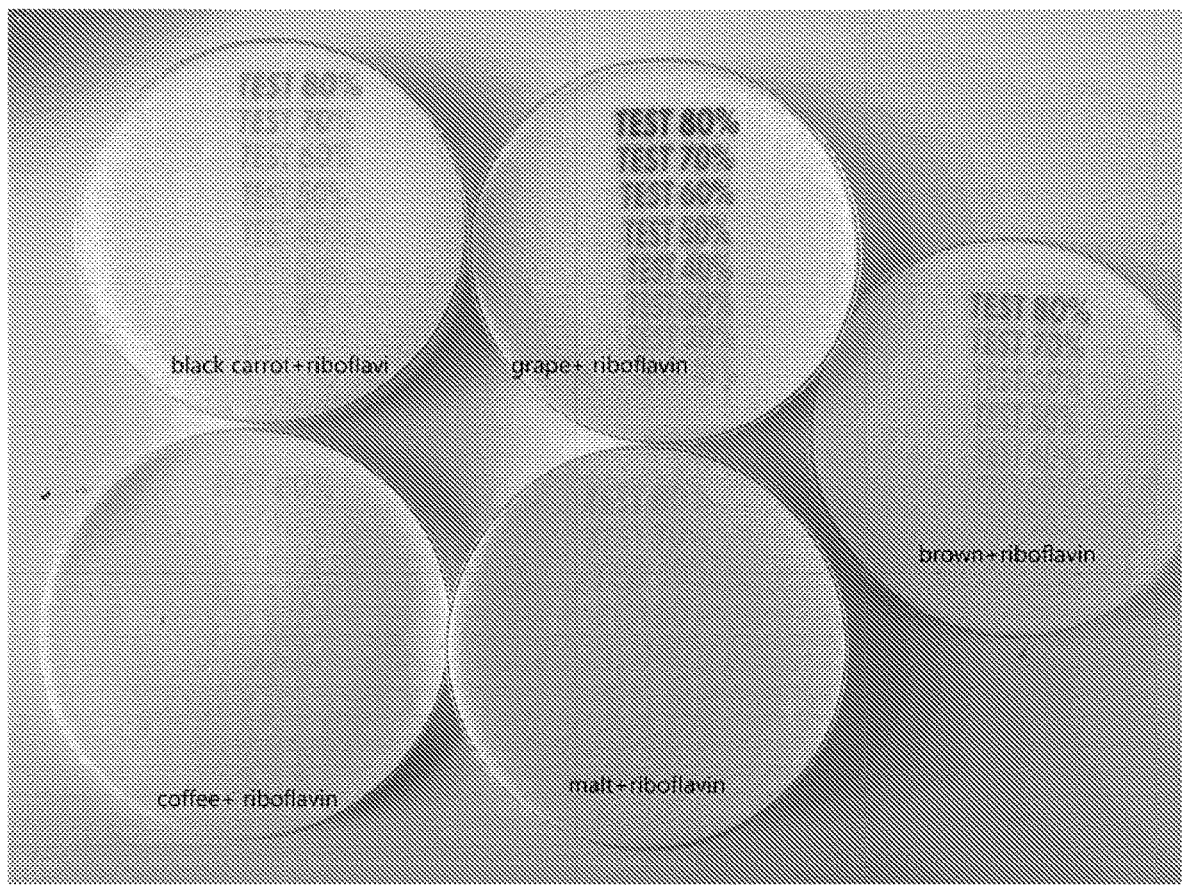

Note—various embodiments of the invention, discussed above, relate to an ink formulation comprising fluorescent, edible and aqueous ink formulations which comprise first and second colorants, wherein the first colorant is a fluorophore and least the second colorant is a white-light-visible colorant. These ink formulations are useful for printing ink-images that both provide visible-light properties (e.g. as viewed under white-light) and fluorescence properties. FIG. 32 illustrates additional examples including photographs of an image printed using several types of ink at different coverage levels (i.e. 10%, 20%, . . . 80%) for different fluorescent and edible inks, in particular—(A) a first ink comprising black carrot extract and riboflavin; (B) a second ink comprising grape extract and riboflavin; (C) a third ink comprising roasted coffee extract and riboflavin and (D) a third ink comprising roasted coffee extract and riboflavin. FIG. 33

FIG. 22 illustrates a method for printing an image from an edible and fluorescent ink by deposition of droplets the ink (e.g. ink-jetting) onto a target substrate 160 (e.g. an ediblre substrate and/or a foam and/or an upper surface of a foamed beverage).

In some embodiments (see. FIG. 1A) a light-source 180 such as a blacklight or another UVA light source a 450 nm LED is mounted onto the printer 100 and/or the method of FIG. 22 is performed under fluorescence conditions.

For the present disclosure, fluorescence conditions are when the primary illumination of the ink image on the target substrate is not white light (e.g. daylight or other ambient light other than that of a 450 nm LED [if present] is blocked from the ink image) but is rather one of the following: (A) black light; (B) other UVA light; and (C) a 450 nm LED.

Reference is made to FIG. 33A.

In step S201 an ink is provided. In step S209, an ink-image is formed on the target substrate 160 is formed by depositing droplets 130 of the edible ink.

In some embodiments, when viewed under white light, the ink-image (or portions thereof) and/or the substrate to which the ink-image is printed (e.g. foam) may be characterized in terms of the CIELAB color space (also known as CIE L*a*b* or sometimes abbreviated as simply "Lab" color space).

For example, when viewed under white light conditions, the ink-image or portion(s) thereof (e.g. a majority thereof) is red, having an LAB value of (L=40, a=59, b=48) and the target substrate (e.g. foam such as beer foam or milk foam or egg-white-foam) is cream white, having an LAB value of (90, 0.6, 8).

In some embodiments, the method of FIG. 33A is performed so that when viewed under white-light condition, the target substrate has an LAB value of ($L_{target-substrate-under-white-light}$, $a_{target-substrate-under-white-light}$, $b_{target-substrate-under-white-light}$) and the ink-image or portion(s) thereof (e.g. a majority thereof) has an LAB value of of ($L_{ink-image-under-white-light}$, $a_{ink-image-under-white-light}$, $b_{ink-image-under-white-light}$). For example, $L_{target-substrate-under-white-light}=90$, $a_{target-substrate-under-white-light}=0.6$, $b_{target-substrate-under-white-light}=8$, $L_{ink-image-under-white-light}=40$, $a_{ink-image-under-white-light}=59$, $b_{ink-image-under-white-light}=48$. In this particular example, $L_{target-substrate-under-white-light}-L_{ink-image-under-white-light}=50$ and $L_{target-substrate-under-white-light}/L_{ink-image-under-white-light}=2.25$.

Conclusion—in some embodiments, when viewed under white-light conditions, the ink image may be darker 140 or significantly darker than the substrate—e.g. $L_{target-substrate-under-white-light}-L_{ink-image-under-white-light} \geq 40$
or $L_{target-substrate-under-white-light}-L_{ink-image-under-white-light} \geq 50$
or $L_{target-substrate-under-white-light}-L_{ink-image-under-white-light} \geq 60$
or $L_{target-substrate-under-white-light}-L_{ink-image-under-white-light} \geq 70$
or $L_{target-substrate-under-white-light}-L_{ink-image-under-white-light} \geq 80$.
Alternatively or additionally,
$L_{target-substrate-under-white-light}/L_{ink-image-under-white-light} \geq 1.25$
Or $L_{target-substrate-under-white-light}/L_{ink-image-under-white-light} \geq 1.5$
Or $L_{target-substrate-under-white-light}/L_{ink-image-under-white-light} \geq 1.5$
Or $L_{target-substrate-under-white-light}/L_{ink-image-under-white-light} \geq 1.75$
Or $L_{target-substrate-under-white-light}/L_{ink-image-under-white-light} \geq 2.0$.

These features may be combined with the fact that when viewed under dark light conditions or under the light of 450 nm, at least a portion of the ink-image 140 on its substrate 160 is fluorescent.

FIGS. 6B and 15B both illustrate images that are multi-color when viewed in black light conditions. In particular, the images of FIGS. 6B and 15B have red portions and yellow portions, despite that fact that the image was formed from only a single fluid as deposited on a substrate.

Conclusion—the images of FIGS. 6B and 15B comprise respective portions two distinct colors (i.e. yellow and red)—drink me is yellow and at least the inner portion of I taste Good is yellow. It is noted that two different colors is different from two greyscale-shades of a single color. FIG. 33B is used to distinguish between situations of two distinct colors and two greyscale-shades of a single color. The rectangles in the same row are different greyscale-shades of a single color. In contrast, rectangles in different rows are of different colors.

Clearly, rectangle 1 and rectangle 4 are two distinct colors—red and orange. Clearly, rectangle 4 and rectangle 7 are two distinct colors—orange and yellow. In contrast, rectangles 10 and 11 are different greyscale-shades of a single color—i.e. green.

The present inventor has discovered, for the first time, that one an ink image is formed (e.g. to a foam) by depositing droplets of a single ink (e.g. fluorescent and edible ink), that (A) the resulting ink-image is multi-color when viewed under black light and/or 450 nm LED light and (B) the determination of whether a portion of the image is one color (e.g. red) or another color (e.g. yellow) depends on the coverage fraction of that portion.

In the example of FIGS. 6B and 15B, portions of the ink-image printed at relatively low coverage (e.g. 15%—drink me) appear yellow under black light, while portions of the ink-image printed at relatively high coverage (e.g. 70%—I taste good) appear yellow. Also please see FIG. 24. In some examples, this rule may also work for link-thicknesses—i.e. thinner lines may appear yellow while thicker lines may appear red.

Based on this discovery, FIGS. 33-37 relate to apparatus and methods for controlling or modulating a multi-color profile of an ink image. For example, in accordance with a multi-coloring-directive to print the words drink me in yellow and to print the words I taste good in yellow, respective coverages one or more portions of digital image 178 may be modified (e.g. according to data such as that of FIG. 24) so as to enforce the multi-coloring-directly.

In one example, this may entail reducing a coverage/greyscale of the words drink me down to about 15%, without concomitantly reducing a coverage/grey-scale of the words I taste good and/or even increasing the coverage/grey-scale to about 70%.

Figure 34:
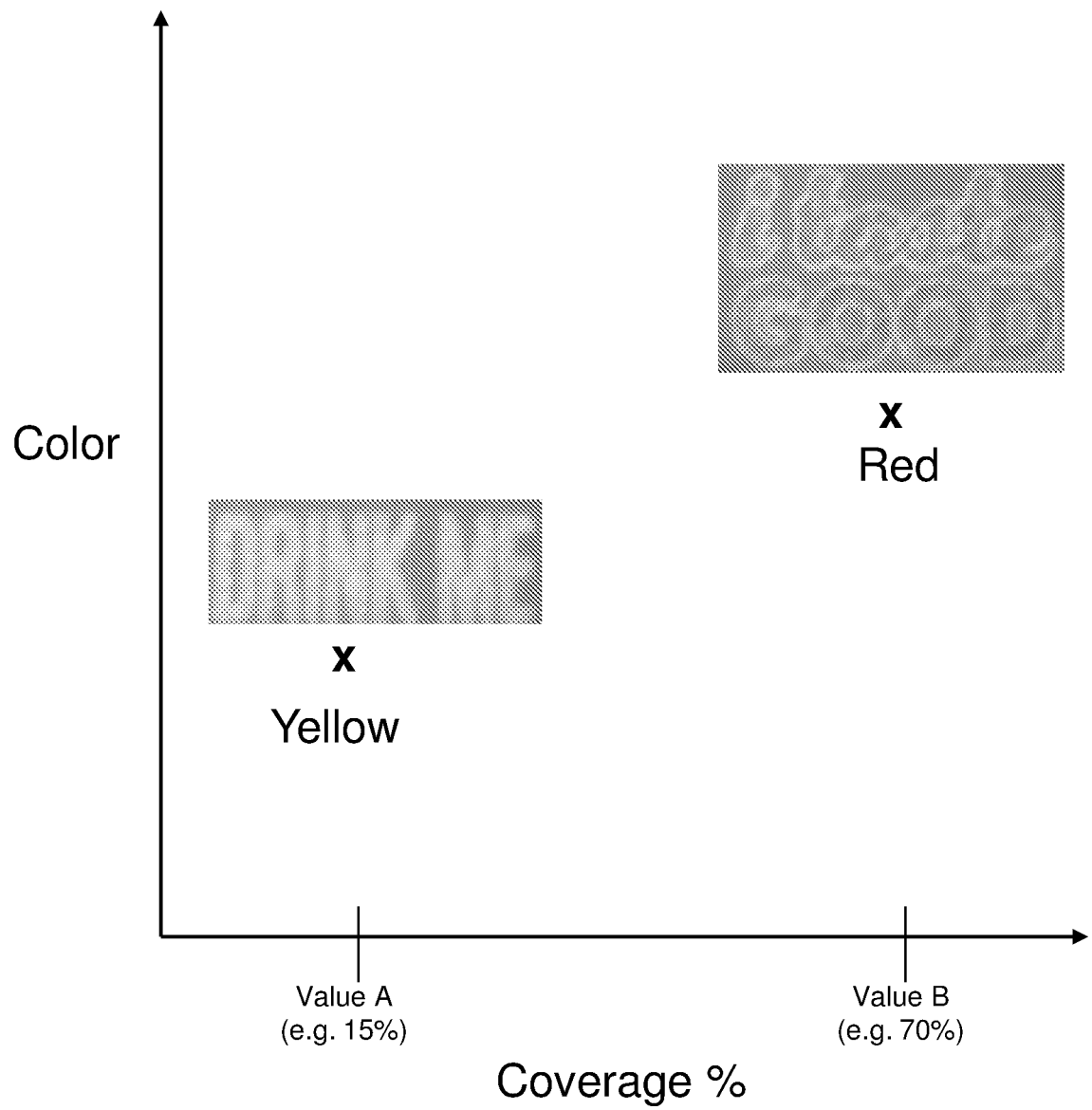
Figure 36A:
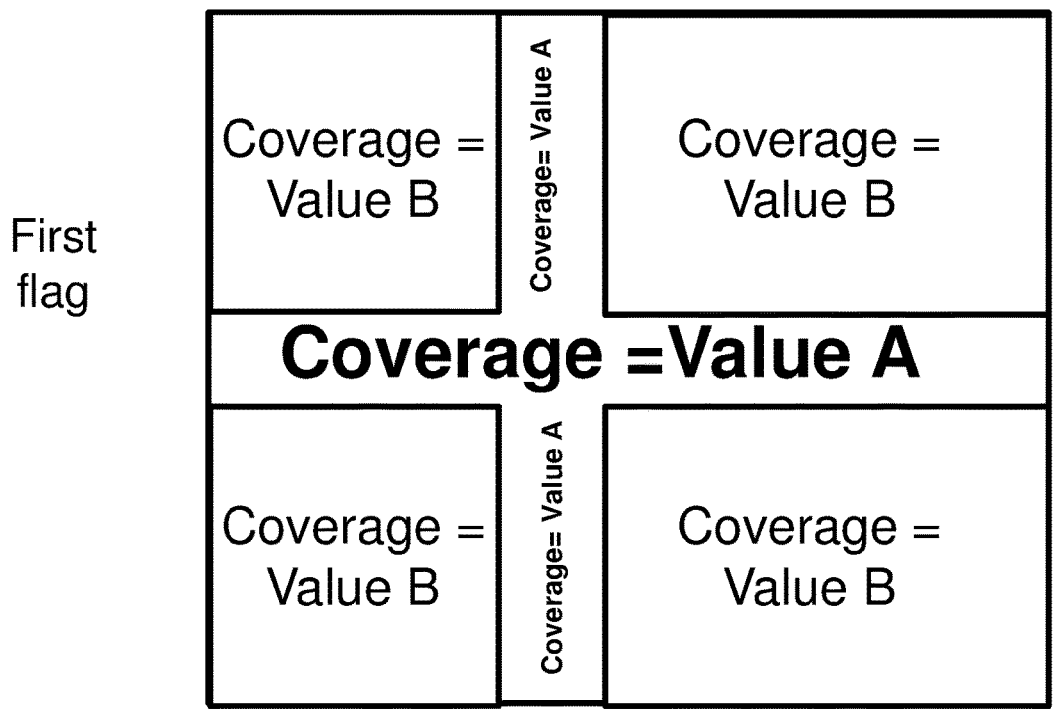
Figure 36B:
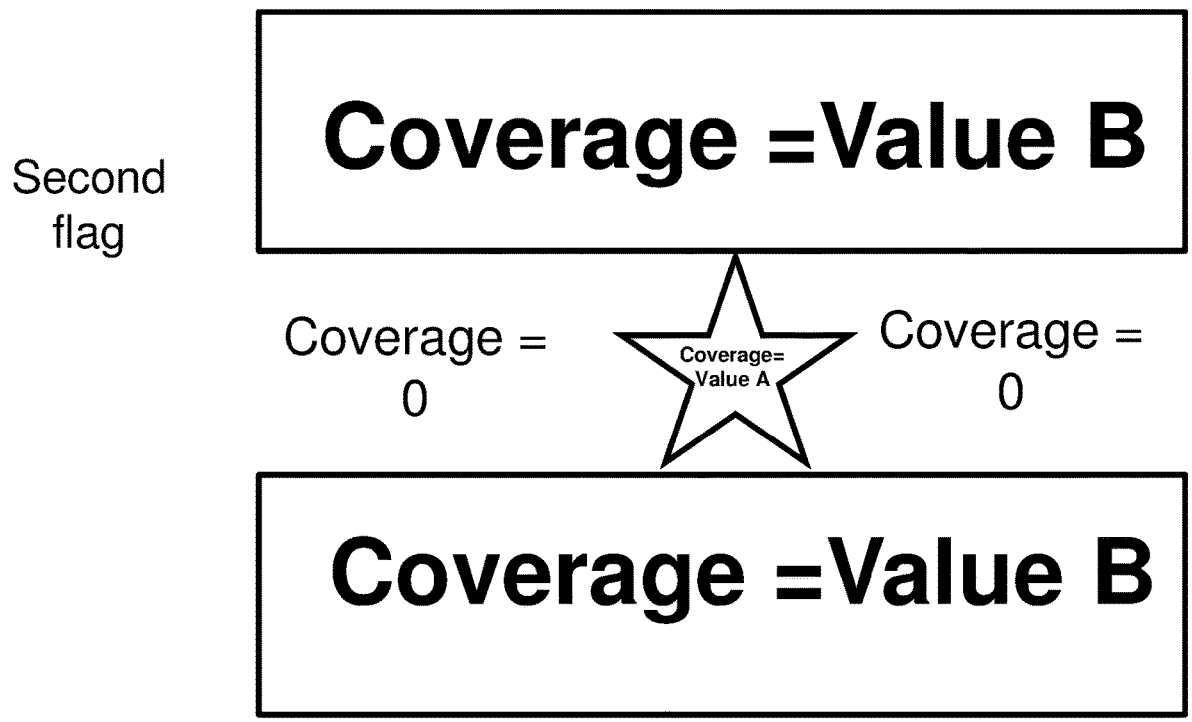
Figure 38A:
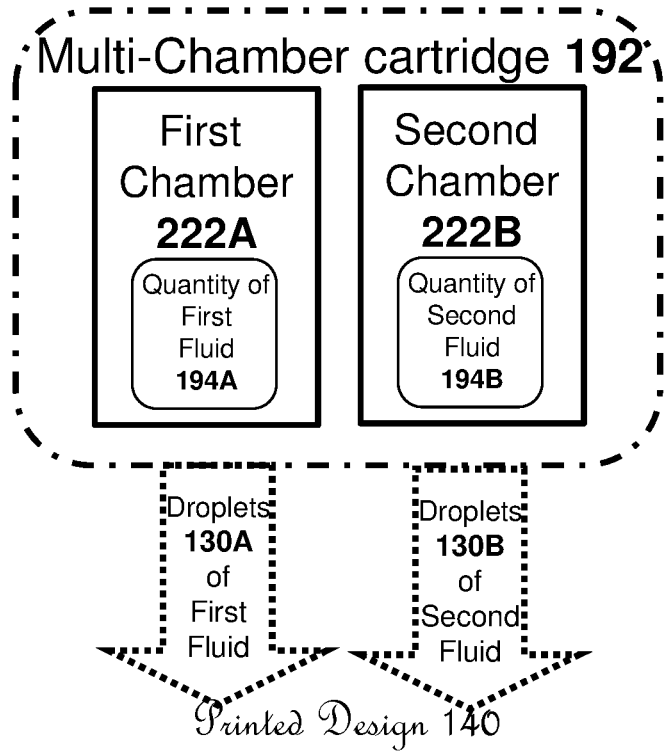
FIG. 38A relates to an embodiment employing a multi-chamber cartridge.
Figure 38B:
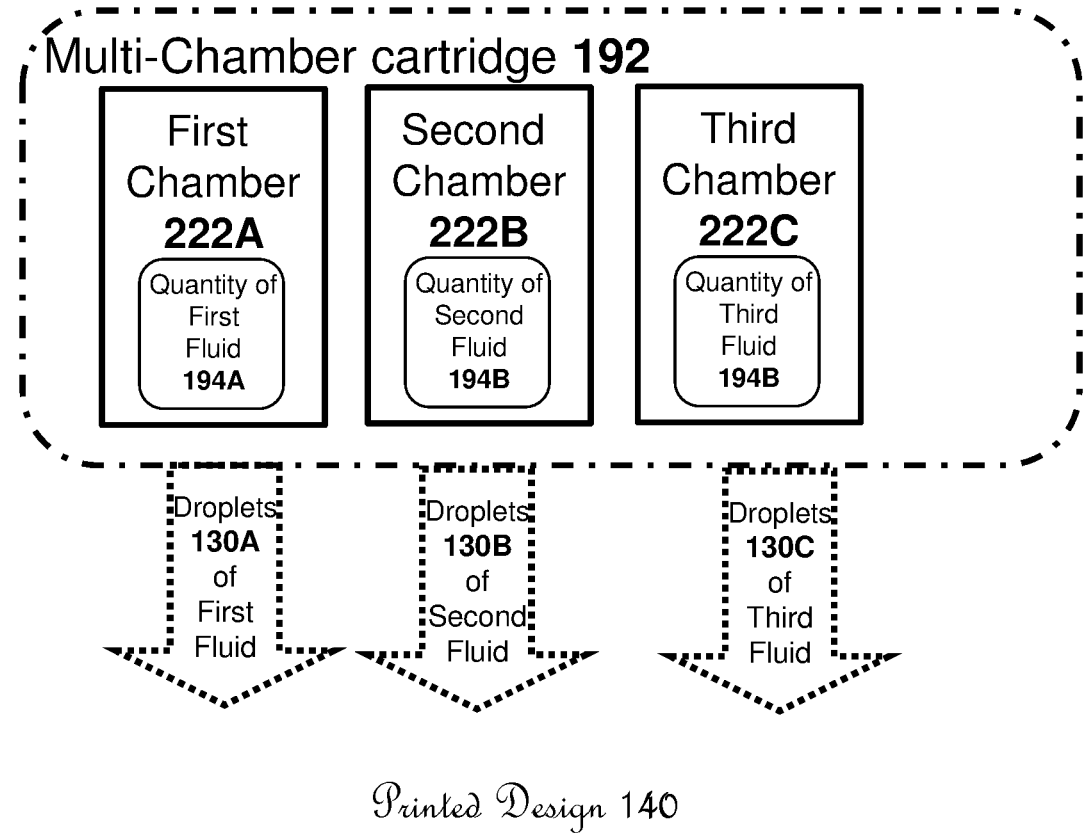
FIG. 38B relates to an embodiment employing a multi-chamber cartridge.

The multi-coloring-directive may be provided together with digital image 178 (e.g. as part of the image or as meta-data thereof) or in any other manner (e.g. via a user "coloring" interface). It is note that FIG. 34 shows an example of multi-color but single-ink calibration data and may be acquired, for example, by printing an image such as that of FIG. 6B at known coverages within the printed image and then photographing the ink-image under black-light conditions. The multi-color but single-ink calibration data describing a relationship between: (i) coverage fraction or line-thickness within an ink-image to be printed; and (ii) a predicted color of a group of pixels (e.g. of drink me or I taste good) when printed at the coverage fraction when viewed under fluorescence conditions. Thus, in FIG. 34, for a coverage fraction of 15% the resulting predicted color is yellow and for a coverage fraction of 70% the resulting predicted color is red. FIG. 34 shows only two datapoints—in some example, more datapoints (or interpolations therebetween or extrapolations thereof) may be provided as part of the calibration data.

The image may be printed using the printer of FIG. 1A or any other suitable printer (e.g. ink-jet printer).

FIGS. 35A-35B and 36A-36B relate to an example of the method of FIG. 37, performed with ink used to produce FIG. 6B on the surface thereof.

In FIG. 35A, it is desired to print an image which appears as a red and yellow flag when viewed under black light, and optionally, as red and white image (e.g. different greyscale shades of red) under white light. The desire to print the image which appears as the red and yellow thus includes a multi-coloring directive describing how to color different portions of the digital image—the portions are the horizontal and vertical lines (to be colored yellow (FIRST TARGET-COLOR of FIG. 37) when viewed under black light), and the four rectangles (to be colored red (SECOND TARGET-COLOR of FIG. 37) when viewed under black light). In response to the directive to color the lines yellow and to color the four rectangles red, the coverages are adjusted according to the multi-color but single-ink calibration data of FIG. 34 (e.g. lines are at 15% coverage and the rectangles are at 70% coverage). In FIG. 35A, the first target-color is YELLOW and the second target-color is RED FIG. 27 may simultaneously provide the following features: (A) the multi-color but single-ink calibration data includes data for first and second calibration-colors [red and yellow in FIG. 34] that are not greyscale shades of a common single color;

(B) the first target-color and a second target-colors [red and yellow in FIG. 35A-235] are not greyscale shades of a single common color.

The term "calibration data" (see FIG. 37) is data describing a relationship between fraction of coverage of a portion of an ink image and predicted color that portion of the ink image under black-light conditions. Optionally, the calibration data is obtained by an ink image (e.g. a "calibration image") or serious of images (i.e. calibration images) having portions with different coverage-fractions under black light conditions—however, this is not a requirement and how calibration data is acquired is not limiting.

Note about FIG. 37—in some embodiments, after receiving the input image of step S305 and before or during step S313, the input digital image is 'post-processed'—i.e. to thicken line(s) thereof and/or to thin line(s) thereof and/or to increase a coverage of a region thereof and/or to decrease a coverage of a region thereof to produce (e.g. in computer memory) a post-processed digital image. This post-processed digital image may be produced in accordance with the multi-coloring directive (e.g. which may be specific for black-light conditions or fluorescence conditions) and/or calibration data. This post-processed digital image may be printed in step S313.

In some embodiments, (I) the first target color and/or the first calibration color is yellow or a shade thereof or is distanced from the LAB point (77, 11, 94) (e.g. a shade of yellow) by at most 30 or at most 20 or at most 10 or at most 5 and (ii) the second target color and/or the second calibration color is red (or a shade thereof) or orange (or a shade thereof) or a color between red and orange or is purple (or a shade thereof) or a color between red and purple.

EXAMPLES

The following examples are intended to illustrate certain embodiments of the present invention, but do not exemplify the full scope of the invention. Non-limiting embodiments of the present invention will be described by way of example with reference to the accompanying figures, which are schematic and are not intended to be drawn to scale.

Example 1

An Edible and Fluorescent Ink Formulation Based on Black Carrot Extract and Riboflavin Ingredients—To prepare an edible ink formulation, the following ingredients are used:
(i) 46% wt/wt deionized water:
(ii) 20% wt/wt glycerol
(iii) 20% wt/wt black carrot extract concentrate, where the black carrot extract concentrate is 35% wt/wt water and 65% wt/wt black carrot extract solids
(iv) 0.1% wt/wt Riboflavin 5' phosphate
(v) 4% wt/wt apple cider vinegar
(vi) 10% wt/wt Ascorbic acid Preparation The Riboflavin 5' phosphate is mixed with the water. The glycerol, the black carrot extract concentrate, and the apple cider vinegar are added to the mixture bringing the pH to about 3.6. The cirtric acid is then added, reducing the pH down to about 3.05. The mixture is passed through a ~0.4-~0.5 micron filter (e.g. a Poly propylene (PP) memhrane)) to obtain the edible ink.

The edible ink is then loaded into an ink-jet cartridge.

Upon loading into the cartridge, the edible ink has a °Brix of about 40 and a viscosity of about 4.4 centipoise (cP).

Note about Ingredients—because the black carrot extract concentrate concentrate includes both water and solids, the ingredients of the edible formulation (i.e. which is loaded into the ink-jet cartridge) may be described as follows:
(i) 53% wt/wt water:
(ii) 20% wt/wt glycerol
(iii) 13% wt/wt black carrot extract solids (iv) 0.1% wt/wt Riboflavin 5' phosphate
(v) 4% wt/wt apple cider vinegar
(vi) 3% wt/wt Ascorbic acid

Example 2

An Edible and Fluorescent Ink Formulation Based on Grape Extract and Riboflavin

Ingredients—To prepare an edible ink formulation, the following ingredients are used:
(i) 69.9% wt/wt deionized water:
(ii) 10% wt/wt ethanol
(iii) 13% wt/wt grape extract concentrate, where the grape extract concentrate is 30% wt/wt water and 70% wt/wt grape extract solids
(iv) 0.1% wt/wt Riboflavin 5' phosphate
(v) 4% wt/wt apple cider vinegar
(vi) 3% wt/wt Ascorbic acid
Preparation
The Riboflavin 5' phosphate is mixed with the water. The ethanol, the grape extract concentrate, and the apple cider vinegar are added to the mixture.
The citric acid is then added and the mixture is mixture is passed through a ~0.4-~0.5 micron filter (e.g. a Poly propylene (PP)membrane)) to obtain the edible ink.
The edible ink is then loaded into an ink-jet cartridge.
Upon loading into the cartridge, the edible ink has a °Brix of about 17.2 and a viscosity of about 1.95 cP, and a pH below 3.5.
Note about Ingredients—because the grape concentrate includes both water and solids, the ingredients of the edible formulation (i.e. which is loaded into the ink-jet cartridge) may be described as follows:
(i) 73.8% wt/wt water:
(ii) 10% wt/wt ethanol
(iii) 9.1% wt/wt grape extract solids
(iv) 0.1% wt/wt Riboflavin 5' phosphate
(v) 4% wt/wt apple cider vinegar
(vi) 3% wt/wt Ascorbic acid

Example 3

An Edible and Fluorescent Ink Formulation Based on Malt Extract and Riboflavin

An unfermented wort is prepared according to example 5. The unfermented wort is prepared so that based on (i) the Lovibond number of the roasted and malted grain; and (ii) the °Brix after the grains are soaked, the final EBC (European Brewing Convention) number of the ink formulation (i.e. upon loading into the ink-jet cartridge) is about 2800.
The following ingredients are added to the unfermented wort: riboflavin 5-phosphate, apple cider vinegar, and glycerol.
The citric acid is then added and the mixture is passed through a ~0.4-~0.5 micron filter (e.g. a Poly propylene (PP)membrane)) to obtain the edible ink.
The edible ink is then loaded into an ink-jet cartridge.
Upon loading into the cartridge, the edible ink has a Brix of about 26.8 and a viscosity of about 3.9 centipoise cP, and a pH below 3.5.
An EBC number of the edible ink is about 2800.

Example 4

An Edible Ink Formulation Comprising Chlorophyll

This formulation has the following ingredients:
(i) 60% wt/wt deionized water
(ii) 25% wt/wt Lime green bland LWS Naturex vegebrite; and
(iii) 15% wt/wt Glycerol
The ingredients are mixed together and mixture is passed through a ~0.4-~0.5 micron filter (e.g. a Poly propylene (PP)rriernbrarte)) to obtain the edible innk.
The edible ink is then loaded into an ink-jet cartridge.
The ink has a °Brix of 28.1, a pH of 5.89 and a viscosity of 3.1 cP.
PH 5.89
Viscosty 3.09 (60 rpm), 3.15 (50 rpm)

Example 5

Preparation of an Unfermented Wort

Pre-ground malted and roasted grains having an extremely high (i.e. >300°) Lovibond value is obtained from a supplier. 2 kg of the pre-ground roasted and malted grains were boiled in 10 kg of water for 1 hour or more in a pressure cooker at 105-110° C. until obtaining 15.5 ° Brix malt extract. (water is evaporated or added until 15.5 ° Brix is obtained). A non-limiting list of grains that may be used to manufacture the unfermented wort is provided below.

| Grain Name | ° L |
|---|---|
| Blackprinz ®/Briess (item number 6643) | 500 |
| Midnight Wheat ®/Briess (item number 6629) | 550 |
| Weyermann Dehusked Carafa II ® | 425 |
| Dingemans Debitter Black | 515 |
| Simpson Black (United Kingdom) | 550 |
| Dark Chocolate/Briess (item number 5570) | 420 |
| Black Barley/Briess (item number 7047) | 500 |
| Weyermann Dehusked Carafa I ® | 337 |
| Weyermann Dehusked Carafa II ® | 425 |
| Weyermann Dehusked Carafa III ® | 470 |
| Weyermann ® CARAFA ® Type 3 | 490.6-566 |
| Weyermann ® Chocolate Wheat | 339.8-452.9 |
| Weyermann ® Chocolate Rye | 189-302 |

The Lovibond values are all as reported by the manufacturer. At this time, the preferred grain is Blackprinz®/Briess which is known as a 'debittered' grain, manufactured by removing a great deal of the husk.

Example 6

Preparing Ink Formulation from Extract of Unroasted Plant Matter

An extract of plant matter (e.g. grape concentrate or black carrot juice) is obtained. A concentration is adjusted to a target level—e.g. by evaporating and/or adding water.

Example 7

Black-Carrot Based Formulations

Black carrot juice/extract having a solids concentration of 39% wt/wt is obtained (e.g. according to Example 6). An edible ink is produced from the black carrot juice according to Example 1. A surface tension of the edible ink is about 40 dyes/cm and a 25° C. viscosity thereof is between 2 and 4 cP.

Humectant is added (e.g. while stirring)—e.g. to a target concentration of between 5% and 30% wt/wt. Natural antimicrobial agents are added. The ink formulation of 25° C. viscosity of between 2 and 10 cP, depending on the Brix of the formulation.

The ink formulation is filtered—e.g. first with a 1-micron filter and subsequently with a 0.2 micron filter.

Some example edible inks based on black carrot juice/extract are enumerated below ('vinegar' is specifically apple cider vinegar), GSE is grapefruit seed extract, the solids concentration of 'black carrot juice' is 39% wt/wt, and the 'water' is deionized water:

| color type | concentrating % |
| --- | --- |
| water | 66.50 |
| black carrot juice | 15.0 |
| sorbitol | 15.0 |
| vinegar | 3 |
| Citric acid | 3.5 |
| water | 56.50 |
| black carrot juice | 20.0 |
| glycerol | 20.0 |
| GSE | 3 |
| Tartaric acid | 4 |

Example 8

Grape-Extract Based Formulations

Grape extract having a solids concentration of 35% wt/wt is obtained. An edible ink is produced from the grape extract according to Example 6. A surface tension of the edible ink is about 46 dynes/cm and a 25° C. viscosity thereof is between 2 and 4 cP.

Humectant is added (e.g. while stirring)—e.g. to a target concentration of between 5% and 30% wt/wt. Natural antimicrobial agents are added. The ink formulation of 25° C. viscosity of between 2 and 10 cP, depending on the Brix of the formulation.

The ink formulation is filtered—e.g. first with a 1-micron filter and subsequently with a 0.2 micron filter.

Some example edible inks based on black carrot juice/extract are enumerated below where 'vinegar' is specifically apple cider vinegar, GSE is grapefruit seed extract, the solids concentration of 'grape extract' is 35% wt/wt, and the 'water' is deionized water:

| color type | concentrating % |
| --- | --- |
| water | 50.50 |
| grape concentrate | 15.0 |
| glycerol | 30.0 |
| vinegar | 4 |
| citric acid | 0.5 |

| color type | concentrating % |
| --- | --- |
| water | 40.50 |
| grape concentrate | 20.0 |
| glycerol | 15 |
| Sorbitol | 15 |
| vinegar | 4 |
| citric acid | 0.5 |

| color type | concentrating % |
| --- | --- |
| water | 66.50 |
| grape concentarte | 15.0 |
| sorbytol | 15.0 |
| vinegar | 3 |
| citric acid | 0.5 |

Additional Discussion

Inventive concept 1. An article of manufacture comprising:
  a. an ink-jet cartridge;
  b. an edible and aqueous ink disposed within the ink-jet cartridge and comprising black carrot extract, wherein the edible ink comprises:
    i. between 0.05% and 1% wt/wt riboflavin and/or riboflavin phosphate as a fluorophore;
    ii. at least 4% wt/wt black carrot extract solids, and optionally at most 20% wt/wt, the black carrot extract solids being the primary colorant of the ink under white-light conditions;
    iii. at least 5% wt/wt humectant or at least 10% wt/wt humectant or at least 15% wt/wt humectant or at least 20% wt/wt humectant or at least 25% wt/wt humectant or at least 30% wt/wt humectant or at least 35% wt/wt humectant; and
    iv. between 30% and 85% wt/wt water (e.g. between 40% wt/wt and 85% wt/wt water or between 40% wt/wt and 85% wt/wt water).

Inventive Concept 2. The article of any preceding Inventive Concept wherein under white light conditions the ink is orange or red or a shade therebetween, and wherein under black light, the riboflavin and/or riboflavin phosphate is a primary fluorophore of the ink.

Inventive Concept 3. The article of any preceding Inventive Concept, wherein the ink is ethanol-free or wherein a ratio between (i) wt/wt content of ethanol in the ink; and (ii) a ratio of a sum of glycerol and glycerin wt/wt contents is at most 3 or at most 2 or at most 1.5 or at most 1 or at most 0.5.

Inventive Concept 4. The article of any preceding Inventive Concept, wherein the ink is substantially devoid of sub-500 nm particles.

Inventive Concept 5. The article of any preceding Inventive Concept wherein under white light conditions a distance between an LAB value of the ink and the LAB point (77, 11, 94) (e.g. a shade of yellow) is at least 50 or at least 55 or at least 60.

Inventive Concept 6. An article of manufacture comprising:
  a. an ink-jet cartridge;
  b. an edible and aqueous ink disposed within the ink-jet cartridge and comprising grape extract, wherein the edible ink comprises:
    i. between 0.05% and 1% wt/wt riboflavin and/or riboflavin phosphate as a fluorophore;

ii. at least 4% wt/wt grape extract solids, and optionally at most 20% wt/wt, the grape extract solids being the primary colorant of the ink under white-light conditions;

iii. at least 5% wt/wt humectant or at least 10% wt/wt humectant or at least 15% wt/wt humectant or at least 20% wt/wt humectant or at least 25% wt/wt humectant or at least 30% wt/wt humectant or at least 35% wt/wt humectant; and iv. between 30% and 85% wt/wt water (e.g. between 40% wt/wt and 85% wt/wt water or between 40% wt/wt and 85% wt/wt water).

wherein under white light conditions the ink is purple or brown or a shade therebetween, and wherein under black light, the riboflavin and/or riboflavin phosphate is a primary fluorophore of the ink.

Inventive Concept 7. The article of Inventive Concept 6 further comprising ethanol.

Inventive Concept 8. The article of any preceding Inventive Concept wherein under white light conditions a distance between an LAB value of the ink and the LAB point (77, 11, 94) (e.g. a shade of yellow) is at least 50 or at least 55 or at least 60.

Inventive Concept 9. An article of manufacture comprising:
a. an ink-jet cartridge; and
b. a unfermented-wort-based ink formulation disposed within the ink-jet cartridge, the ink formulation comprising:
   i. between 0.05% and 1% wt/wt riboflavin and/or riboflavin phosphate as a fluorophore (for example, between 0.05% and 0.5% or between 0.05% and 0.4% or between 0.05% and 0.3% wt/wt);
   ii. an unfermented wort;
   iii. a humectant for providing moisture-retention; and
   iv. a pH controlling agent for maintaining a pH of the ink formulation at or below 4.0;
wherein ink formulation is edible, aqueous and has all of the following structural properties:
   i. the unfermented wort is the primary colorant of the ink formulation;
   ii. a 25° C. viscosity of the ink formulation is at most 7 centipoise;
   iii. the ink formulation is characterized by an EBC (European Brewing Convention) number of at least 1800 colorant units;
   iii. a ratio between the EBC number of the ink formulation and the 25° C. viscosity thereof is at least (centipoise)$^{-1}$ is at least 350.

Inventive Concept 10. The article of Inventive Concept 9 wherein the EBC of the formulation is at least 2500 colorant units, and wherein the ink is ethanol-free or wherein a ratio between (i) wt/wt content of ethanol in the ink; and (ii) a ratio of a sum of glycerol and glycerin wt/wt contents is at most 3 or at most 2 or at most 1.5 or at most 1 or at most 0.5.

Inventive Concept 11. The article of Inventive Concept 9 or Inventive Concept 10, wherein under white light the ink is brown or a shade therebetween, and wherein under black light, the riboflavin and/or riboflavin phosphate is a primary fluorophore of the ink.

Inventive Concept 12. The article of any preceding Inventive Concept wherein under white light conditions a distance between an LAB value of the ink and the LAB point (77, 11, 94) (e.g. a shade of yellow) is at least 50 or at least 55 or at least 60.

Inventive Concept 13. An edible and aqueous ink comprising extract of natural-colorant-bearing plant matter and one or more fluorophore(s), and wherein:
(i) the fluorophore(s) do not occur naturally within the natural-colorant-bearing plant matter or
(ii) a concentration of at least one of the fluorophores in the ink exceeds a naturally-occuring concentration within the natural-colorant-bearing plant matter.

Inventive Concept 14. An article of manufacture comprising:
a. an ink-jet cartridge;
b. the ink of Inventive Concept 13, disposed within the ink-jet cartridge.

Inventive Concept 15. The article or ink of any one of Inventive Concepts 13-14 wherein the ink comprises at least one of riboflavin, riboflavin phosphate, pyridoxine hydrochloride, folic acid, niacin, quinine sulfate, nicotinamide, D&C orange no. 5 or combinations thereof.

Inventive Concept 16. The article or ink of any one of Inventive Concepts 13-14 wherein the ink comprises at riboflavin and/or riboflavin phosphate.

Inventive Concept 16. The article or ink of any one of Inventive Concepts 13-14 wherein the ink comprises at least 0.05% wt/wt riboflavin and/or riboflavin phosphate.

Inventive Concept 17. The article or ink of any one of Inventive Concepts 13-16 wherein riboflavin and/or riboflavin phosphate is the primary fluorophore of the ink.

Inventive Concept 18. The article or edible ink of one of Inventive Concepts 13-17 wherein the extract of natural-colorant-bearing plant matter comprises extract of at least one of the following: grapes, cranberries, currant, blueberry, tomato, black currant, annatto, carrot, black carrot, beet, beetroot, spinach, yellow carrot, cabbage and/or red rice, and turmeric, paprika.

Inventive Concept 19. The article or edible ink of one of Inventive Concepts 13-18 wherein under white light conditions the extract of natural-colorant-bearing plant matter is the primary colorant of the ink.

Inventive Concept 20. The article of any preceding Inventive Concept wherein under white light conditions a distance between an LAB value of the ink and the LAB point (77, 11, 94) (e.g. a shade of yellow) is at least 50 or at least 55 or at least 60.

Inventive Concept 21. The ink or article of any preceding Inventive Concept wherein a ratio between (i) a visible-range optical density due to a presence of the natural-colorant-bearing plant matter in the edible ink; and (ii) a visible-range optical density due to a presence of the fluorophore(s) in the edible ink is a least 1.5 or at least 2 or at least 3

Inventive Concept 22. A method comprising:
Providing the article or ink of any preceding Inventive Concept or according to any Inventive Concept or embodiments disclosed herein;
Forming an ink-image on or in a target substrate (e.g. a foam or any flowable-matter substrate or an edible substrate such as a surface of a food or a beverage by droplet-deposition thereon or therein of the edible ink.

23. The method of Inventive Concept 22 further comprising viewing the ink-image under black light or under 450-nm-tuned LED light and/or viewing the ink-image in black-light conditions.

Inventive Concept 24. The method of any of Inventive Concepts 22-23 wherein under visible light the ink-image is monochromatic and under black light or 450-nm-tuned LED light the ink-image is multi-color.

Inventive Concept 25. The method of any of Inventive Concepts 22-24 wherein the ink-image is formed only from the edible ink and is a single-reservoir-generated ink-image.

Inventive Concept 26. A method of printing, the method comprising
- a. providing an edible ink comprising natural-colorant-bearing plant matter and a fluorophore;
- b. receiving a digital image, for example stored in computer-memory, the digital being providing non-uniform-geometry and/or non-uniform color features;
- c. depositing droplets of the edible ink onto or into a surface of a substrate, the substrate being optionally edible , so as to convert the digital image into an ink image which is monochrome under white light but multi-color under black light or 450-nm-LED light, wherein:
  - i. the ink image of formed by performing only single-reservoir droplet-deposition of the edible ink.

Inventive Concept 27. The method of Inventive Concept 26 wherein:
- ii. the printing is performed to enforce a mapping which maps colors or geometric features of the digital image into black-light-visible colors.

Inventive Concept 27. The method of Inventive Concept 26 wherein the enforcing is carried out by targeting black-light-viewable colors by modulating at least of a density of droplets of the edible ink, and a droplet-size.

Inventive Concept 28. A method of printing, the method comprising:
- a. receiving, into a digital computer, a color-print directive to:
  - (i) print a first portion of digital image and/or a first group of pixels and/or a first image subsection in a first color; and
  - (ii) print a first portion of digital image and/or a second group of pixels and/or a second image subsection in a second color;
- b. enforcing the color-print directive by depositing (e.g. ink-jetting) droplets of the ink of any preceding Inventive Concept onto a target surface by modulating droplet density and/or droplet size and/or grey-scale of portion of the ink-image wherein: in response to print in the first color, droplet size and/or density and/or coverage fraction and/or grey-scale is increased, and in response to print in the second color, droplet size and/or density and/or coverage fraction and/or grey-scale is decreased.

Inventive Concept 29. The method of step b is performed to print a single-ink image where the only a single ink is deposited to form the image.

Inventive Concept 30. The method of any one of Inventive Concepts 28-29 wherein step b is performed to print an image which is monochromatic when viewed under white light and multi-color when viewed under black light.

Inventive Concept 31. The method of any one of Inventive Concepts 28-30 wherein the directive is received via a user-interface of a computer device.

Inventive Concept 32. A system comprising:
- a. an ink-jet printer defining a target-location;
- b. first and second reservoirs of fluids respectively loaded with first and second fluids, wherein:
  - i. the first fluid is an acidic edible ink (e.g. may be any ink disclosed herein—e.g. having a pH below 4) whose color is pH sensitive, the first fluid optionally comprising natural-colorant-bearing plant matter (e.g.a primary colorant of the first fluid is extract of unroasted plant matter or solids thereof);
  - ii. the second fluid is a base solution;
- c. control circuitry for printing a digital image (e.g. a stored in computer memory) by causing the ink-jet printer to deposit, to the target location, droplets of both the first and second fluids.

Inventive Concept 33. The system of Inventive Concept 32 wherein control circuitry is configured to perform droplet deposition of the first and second fluids such that the relative droplet size between droplets of the first and second fluids and/or distances between droplets of the first and second fluids is determined according to a pH-color dependency of the first fluid and/or a pH of the base solution (e.g. a combination of the the pH -color dependencies and the pH of the base solution).

34. The system of Inventive Concept 32 wherein control circuitry is configured to perform droplet deposition of the first and second fluids such that the relative droplet size between droplets of the first and second fluids and/or distances between droplets of the first and second fluids is determined according to a combination of:
- A. a pH of a target substrate of the target-location;
- B. a pH-color dependency of the first fluid; and
- C. a pH of the base solution; and
- D. optionally, a pH of the first fluid (e.g. a titration curve between the first and second fluids).

Inventive Concept 35. The system of any of Inventive Concepts 32-34 wherein a multi-color digital image which has first and second regions respectively having first and second colors, and the ink-image is printed so that corresponding first and second regions of the ink-image are targeted to the first and second colors at respective first and second pHs corresponding to a pH-color dependency of the first fluid.

Inventive Concept 36. A method of printing a digital image having a first region at a first color and a second region of a second color, the method comprising:
- a. providing first and second reservoirs of fluids respectively loaded with first and second fluids, wherein:
  - i. the first fluid is an acidic edible ink whose color is pH sensitive, the ink comprising natural-colorant-bearing plant matter;
  - ii. the second fluid is a base solution; and
- b. printing, to a target substrate, the digital image by depositing droplets of form both first and second reservoirs such that:
  - i. for a first region of the target substrate corresponding to the first region of the digital image, the first color is targeted by droplet-deposition such that the relative quantities of droplets from the first and second reservoirs correspond to a pH at which the first fluid is the first color; and
  - ii. for a second region of the target substrate corresponding to the second region of the digital image, the second color is targeted by droplet-deposition such that the relative quantities of droplets from the first and second reservoirs correspond to a pH at which the first fluid is the second color.

Inventive Concept 37. An edible and aqueous ink comprising an extract of natural-colorant-bearing plant matter.

Inventive Concept 38. The edible ink of Inventive Concept 37 wherein the plant matter is unroasted plant matter.

Inventive Concept 39. The ink of any preceding Inventive Concept wherein the extract of the natural-colorant-bearing plant matter, or solids thereof, is the primary colorant of the ink.

Inventive Concept 40. The ink of any preceding Inventive Concept wherein a concentration, within the edible ink, of solids of the extract of natural-colorant-bearing plant matter is at least X % wt/wt, and a value of X is at least 4.

Inventive Concept 41. The ink of Inventive Concept 40 wherein a value of X is at least 5, or at least 6 or at least 7 or at least 8 or at least 9 or at least 10 or at least 11 or at least 12.

Inventive Concept 49. The edible ink of any preceding Inventive Concept wherein the plant mater comprises fruit matter and/or vegetable matter and/or root matter and/or batter and/or flower matter and/or stem matter and/or combinations thereof.

Inventive Concept 50. The edible ink of any preceding Inventive Concept wherein the plant mater comprises primarily vegetable matter.

Inventive Concept 51. The edible ink of any preceding Inventive Concept wherein the plant mater comprises primarily fruit matter.

Inventive Concept 52. The edible ink of any preceding Inventive Concept wherein one or more anti-microbials selected from the group consisting of apple cider vinegar, vinegar, Prune juice concentrate, Raisin paste concentrate, Raisin juice concentrate, Cinnamon, clove, and Grapefruit seed extract (GSE).

Inventive Concept 53. The edible ink of any preceding Inventive Concept comprising at least 2% wt/wt apple cider vinegar.

Inventive Concept 54. The edible ink of any preceding Inventive Concept comprising at least 2.5% wt/wt apple cider vinegar.

Inventive Concept 55. The edible ink of any preceding Inventive Concept comprising at least 3% wt/wt or at least 3.5% or at least 4% wt/wt) apple cider vinegar.

Inventive Concept 58. The edible ink of any of any preceding Inventive Concept wherein when the edible ink is diluted 1:90 with water to produce a diluted colorant formulation, an optical density of the diluted colorant formulation at a visible wavelength (e.g. 520 nanometers) is at least $OD_{MIN}$, a value of $OD_{MIN}$ being at least 0.5.

Inventive Concept 59. The edible ink of Inventive Concept 58 wherein a value of $OD_{MIN}$ is at least 0.6.

Inventive Concept 60. The edible ink of Inventive Concept 58 wherein a value of $OD_{MIN}$ is at least 0.7 or at least 0.9 or at least 1.0.

Inventive Concept 64. The edible ink of any preceding Inventive Concept wherein the edible ink is free of artificial colors.

Inventive Concept 65. The edible ink of any preceding Inventive Concept wherein the edible ink complies with USDA Policy book to carry a natural Inventive Concept.

Inventive Concept 66. The edible ink of any preceding Inventive Concept wherein the edible ink lacks metal ions and/or a concentration of metal ions within the ink formulation is at most 0.1% or at most 0.05% or at most 0.01% wt/wt.

Inventive Concept 67. The edible ink of any preceding Inventive Concept wherein the edible ink has a 25 C viscosity of at most Z centipoise, a value of Z being at most 10 or at most 8 or at most 6 or at most 5 or at most 4.

Inventive Concept 72. The edible ink of any preceding Inventive Concept, the edible ink being free of particles whose size exceeds 1 micron.

Inventive Concept 73. The edible ink of any Inventive Concept 72, the edible ink being free of particles whose size exceeds 0.75 micron.

Inventive Concept 74. The edible ink of any Inventive Concept 72, the edible ink being free of particles whose size exceeds 0.5 micron.

Inventive Concept 75. The edible ink of any preceding Inventive Concept, the edible ink comprising a pH controlling agent for regulating a pH of the edible ink to a target pH of at most $pH_{MAX}$, a value of $pH_{MAX}$ being at most 3.8 or at most 3.6 or at most 3.5 or at most 3.3 or at most 3.2 or at most 3.1 or at most 3.0.

Inventive Concept 82. The edible ink of any preceding Inventive Concept wherein the natural-colorant-bearing plant matter and the edible ink comprise at least one of the following plant-sourced colorant(s): anthocyanin, chlorophyllin (e.g. Copper chlorophyllin), carotenoid pigments, bixin, norbixin, flavonoids, indole-derived pigments (e.g. betalains), carmine, lutein, xanthophyll or combinations thereof.

Inventive Concept 83. The edible ink of any preceding Inventive Concept wherein the natural-colorant-bearing plant matter and the edible ink comprise at least one of the following plant-sourced colorant(s): anthocyanin, chlorophyllin (e.g. Copper chlorophyllin), carotenoid pigments, bixin, norbixin, flavonoids, indole-derived pigments (e.g. betalains), carmine, lutein, xanthophyll or combinations thereof, a concentration of the colorant(s) being at least W mg per 100 grams of ink, a value of W being at least 20 or at least 30 or at least 40 or at least 50 or at least 75 or at least 100 or at least 150 or at least 200 or at least 250 or at least 500 or at least 750 or at least 1000.

Inventive Concept 84. The edible ink of any preceding Inventive Concept wherein the extract of natural-colorant-bearing plant matter comprises extract of at least one of the following: grapes, cranberries, currant, blueberry, tomato, black currant, annatto, carrot, black carrot, beet, beetroot, spinach, yellow carrot, cabbage and/or red rice, and turmeric, paprika.

Inventive Concept 85. The edible ink of any preceding Inventive Concept comprising at least 40% wt/wt water or at least 50%.

Inventive Concept 88. The edible ink of any preceding Inventive Concept comprising at most 80% wt/wt water or at most 75% wt/wt or at most 70% wt/wt or at most 65% wt/wt or at most 50% wt/wt.

Inventive Concept. The edible ink of any preceding Inventive Concept comprising at least 15% wt/wt humectant.

Inventive Concept 94. A method comprising: ink-jetting droplets of the edible ink of any of Inventive Concepts onto a food or beverage target to print an image on or in the food or beverage target.

Inventive Concept 95. The method of Inventive Concept 94 wherein image is printed onto a foamed surface of a beverage.

Inventive Concept 96. The method of Inventive Concept 95 wherein the foamed surface is selected from the group consisting of beer foam, egg-whites foam, milk-foam, and milk-substitute foam, soybean foam, aquafaba foam, chickpea foam, nitro foam (meaning a beverage infused with nitrogen, causing a foam mixture of the beverage and nitrogen bubbles)

Inventive Concept 97. The method of any of Inventive Concepts 94-96 wherein the target is selected from the group consisting of a cocktail, a beer, a coffee, tea (i.e. chai, matcha), milk shakes, fruit shakes, and vegetable shakes.

Inventive Concept 98. The method of any of Inventive Concepts 93-97 wherein the ink-jetting of droplets is performed by thermal ink-jet.

Inventive Concept 99. The method of any of Inventive Concepts 94-98 wherein the ink-jetting of droplets is performed by piezo ink-jet.

Inventive Concept 100. The method of any of Inventive Concepts 94-99 wherein the ink-jetted droplets each have a size of at most 60 or at most 50 or at most 40 picoliters.

Inventive Concept 101. An article of manufacture comprising:
 a. a reservoir array of one or more ink-reservoir(s);
 b. a first ink disposed within one or more the reservoir(s), the first ink comprising a first colorant, said first colorant being a visible light colorant.

Inventive Concept 102. The article of Inventive Concept 101 wherein the first ink is an edible ink.

Inventive Concept 103. The article of any one of Inventive Concepts 101-102 wherein the first ink is an aqueous ink.

Inventive Concept 104. The article of any one of Inventive Concepts 101-103 wherein the reservoir array comprises an ink-jet cartridge, the first ink disposed within ink-chamber(s) thereof.

Inventive Concept 105. The article of Inventive Concept 104 wherein ink-jet cartridge is a thermal ink-jet cartridge.

Inventive Concept 106. The article of Inventive Concept 104 wherein ink-jet cartridge is a piezo ink-jet cartridge.

Inventive Concept 107. The article of any one of Inventive Concepts 104-106, wherein: (i) the ink-jet cartridge is a multi-chamber ink-jet cartridge comprising a plurality of ink-chambers, (ii) the first aqueous ink is disposed in a first ink-chamber of the plurality of ink-chambers; and (iii) an additional ink is disposed in a second ink-chamber of the plurality of ink-chambers, said aqueous ink comprising at least one fluorophore.

Inventive Concept 108. The article of Inventive Concept 107 wherein the additional aqueous ink is an edible ink.

Inventive Concept 109. The article of any one of Inventive Concepts 107-108 wherein the additional aqueous ink is an edible ink.

Inventive Concept Inventive Concept 110. The article of any one of Inventive Concepts 107-109 wherein the fluorophore is selected from the group consisting of riboflavin, riboflavin 5-phosphate, pyridoxine hydrochloride, folic acid, niacin, quinine sulfate, nicotinamide, D&C orange no. 5 or combinations thereof.

Inventive Concept 111. The article of any one of Inventive Concepts 101-110 wherein the first aqueous ink comprises a colorant-bearing-plant-sourced material CBPSM selected from the CBPSM-group consisting of (i) solids of extract of unroasted plant matter ; (ii) solids of black carrot extract ; (iii) solids of grape extract; (iv) solids of coffee extract; (v) solids of roasted coffee extract; and (vi) solids of extract of roasted and/or malted grain.

Inventive Concept 112. The article of Inventive Concept 111 wherein the CBPSM-group selected colorant-bearing-plant-sourced material is solids of extract of unroasted plant matter.

Inventive Concept 113. The article of Inventive Concept 112 wherein the solids of extract of unroasted plant matter comprises solids of extract of unroasted fruit matter and/or solids of extract of unroasted vegetable matter and/or solids of extract of unroasted root matter and/or solids of extract of unroasted grains and/or f solids of extract of unroasted lower matter and/or solids of extract of unroasted stem matter and/or combinations thereof.

Inventive Concept 114. The article of any one of Inventive Concepts 112-113 wherein the solids of extract of unroasted comprises primarily solids of extract of unroasted vegetable matter.

Inventive Concept 115. The article of any one of Inventive Concepts 112-113 wherein the plant mater comprises primarily solids of extract of unroasted fruit matter.

Inventive Concept 116. The article of Inventive Concept 111 wherein the CBPSM-group selected colorant-bearing-plant-sourced material is solids of black carrot extract.

Inventive Concept 117. The article of Inventive Concept 111 wherein the CBPSM-group-selected colorant-bearing-plant-sourced material is solids of solids of grape extract.

Inventive Concept 118. The article of Inventive Concept 111 wherein the CBPSM-group-selected colorant-bearing-plant-sourced material is solids of coffee extract.

Inventive Concept 119. The article of Inventive Concept 111 wherein the CBPSM-group-selected colorant-bearing-plant-sourced material is solids of roasted coffee extract.

Inventive Concept 120. The article of Inventive Concept 111 wherein the CBPSM-group-selected colorant-bearing-plant-sourced material is solids of extract of roasted and/or malted grain.

Inventive Concept 121. The article of Inventive Concept 111 wherein the CBPSM-group-selected colorant-bearing-plant-sourced material is solids of extract of roasted and malted grain.

Inventive Concept 122. The article of Inventive Concept 111 wherein the CBPSM-group-selected colorant-bearing-plant-sourced material is the primary visible-light colorant of the first ink.

Inventive Concept 123. The article of any one of Inventive Concepts 111-122 wherein a concentration, within the first ink, of the CBPSM-group-selected colorant-bearing-plant-sourced material is at least 3% wt/wt.

Inventive Concept 124. The article of any one of Inventive Concepts 111-122 wherein a concentration, within the first ink, of the CBPSM-group-selected colorant-bearing-plant-sourced material is at least 4% wt/wt.

Inventive Concept 125. The article of any one of Inventive Concepts 111-122 wherein a concentration, within the first ink, of the CBPSM-group-selected colorant-bearing-plant-sourced material is at least 5% wt/wt.

Inventive Concept 126. The article of any one of Inventive Concepts 111-122 wherein a concentration, within the first ink, of the CBPSM-group-selected colorant-bearing-plant-sourced material is at least 8% wt/wt.

Inventive Concept 127. The article of any one of Inventive Concepts 111-122 wherein a concentration, within the first ink, of the CBPSM-group-selected colorant-bearing-plant-sourced material is at least 10% wt/wt.

Inventive Concept 128. The article of any one of Inventive Concepts 111-122 wherein a concentration, within the first ink, of the CBPSM-group-selected colorant-bearing-plant-sourced material is at least 10% wt/wt.

Inventive Concept 129. The article of any one of Inventive Concepts 111-128 wherein a concentration, within the first ink, of the CBPSM-group-selected colorant-bearing-plant-sourced material is at most 25% wt/wt.

Inventive Concept 130. The article of any one of Inventive Concepts 111-128 wherein a concentration, within the first ink, of the CBPSM-group-selected colorant-bearing-plant-sourced material is at most 20% wt/wt.

Inventive Concept 131. The article of any one of Inventive Concepts 111-128 wherein a concentration, within the first ink, of the CBPSM-group-selected colorant-bearing-plant-sourced material is at most 15% wt/wt.

Inventive Concept 132. The article of any one of Inventive Concepts 111-128 wherein a concentration, within the first ink, of the CBPSM-group-selected colorant-bearing-plant-sourced material is at most 12% wt/wt.

Inventive Concept 133. The article of any one of Inventive Concepts 101-132 wherein the first ink and/or additional ink comprise one or more anti-microbials selected from the group consisting of apple cider vinegar, vinegar, Prune juice concentrate, Raisin paste concentrate, Raisin juice concentrate, Cinnamon, clove, and Grapefruit seed extract (GSE).

Inventive Concept 134. The article of any one of Inventive Concepts 101-133 wherein the first ink and/or additional ink comprise at least 2% wt/wt, or at least 2.5% wt/wt, or at least 3% wt/wt, or at least 3.5% wt/wt, or at least 4% wt/wt, apple cider vinegar.

Inventive Concept 135. The article of any one of Inventive Concepts 101-134 wherein when the first ink and/or additional ink is diluted 1:90 with water to produce a diluted colorant formulation, an optical density of the diluted colorant formulation at a visible wavelength (e.g. 520 nanometers) is at least $OD_{MIN}$, a value of $OD_{MIN}$ being at least 0.5, or at least 0.6, or at least 0.7, or at least 0.8, or at least 0.9, or at least 1.

Inventive Concept 136. The article of any one of Inventive Concepts 101-135 wherein the first ink and/or additional ink ink lacks metal ions and/or a concentration of metal ions within the ink formulation is at most 0.1% or at most 0.05% or at most 0.01% wt/wt.

Inventive Concept 137. The article of any one of Inventive Concepts 101-136 wherein the first ink and/or additional ink has a 25 C viscosity of at most Z centipoise, a value of Z being at most 10.

Inventive Concept 138. The article of Inventive Concept 137 wherein a value of Z is at most 8 or at most 6 or at most 5 or at most 4.

Inventive Concept 142. The article of any preceding Inventive Concept, the first and/or additional ink being free of particles whose size exceeds 1 micron.

Inventive Concept 143. The article of any Inventive Concept 142, the first and/or additional ink being free of particles whose size exceeds 0.75 micron.

Inventive Concept 144. The article of any Inventive Concept 142, the edible ink being free of particles whose size exceeds 0.5 micron.

Inventive Concept 145. The article of any one of Inventive Concepts 101-144, the edible ink comprising a pH controlling agent for regulating a pH of the edible ink to a target pH of at most $pH_{MAX}$, a value of $pH_{MAX}$ being at most 4.5, at most 4.2, or at most 4.0 or at most 3.8, or at most 3.6, or at most 3.5, or at most 3.4, or at most 3.3, or at most 3.2, or at most 3.1, or at most 3.0.

Inventive Concept 146. The article of any one of Inventive Concepts 101-145 wherein the natural-colorant-bearing plant matter of the first ink comprises comprise at least one of the following plant-sourced colorant(s): anthocyanin, chlorophyllin (e.g. Copper chlorophyllin), carotenoid pigments, bixin, norbixin, flavonoids, indole-derived pigments (e.g. betalains), carmine, lutein, xanthophyll or combinations thereof.

Inventive Concept 147. The article of any one of Inventive Concepts 101-146 wherein the first ink comprises at least one of the following plant-sourced colorant(s): anthocyanin, chlorophyllin (e.g. Copper chlorophyllin), carotenoid pigments, bixin, norbixin, flavonoids, indole-derived pigments (e.g. betalains), carmine, lutein, xanthophyll or combinations thereof, a concentration of the colorant(s) being at least W mg per 100 grams of ink, a value of W being at least 20 or at least 30 or at least 40 or at least 50 or at least 75 or at least 100 or at least 150 or at least 200 or at least 250 or at least 500 or at least 750 or at least 1000.

Inventive Concept 148. The article of any one of Inventive Concepts 101-147 wherein the extract of natural-colorant-bearing plant matter comprises extract of at least one of the following: grapes, cranberries, currant, blueberry, tomato, black currant, annatto, carrot, black carrot, beet, beetroot, spinach, yellow carrot, cabbage and/or red rice, and turmeric, paprika.

Inventive Concept 149. The article of any one of Inventive Concepts 101-148 where the first and/or additional ink comprise at least 40% wt/wt water or at least 50% wt/wt water.

Inventive Concept 150. The article of any one of Inventive Concepts 101-149 where the first and/or additional ink comprise at most 85% wt/wt water or at most 80% wt/wt water or at most 75% wt/wt water.

Inventive Concept 151. The article of any one of Inventive Concepts 101-149 where the first and/or additional ink comprise at most 70% wt/wt water.

Inventive Concept 152. The article of any one of Inventive Concepts 101-151 wherein the first ink lacks artificial colorants other than riboflavin or riboflavin 5 phosphate, or comprises at most 250 ppm or at most 150 ppm or at most 100 ppm or at most 50 ppm or at most 25 ppm or at most 15 ppm or at most 10 ppm or at most 5 ppm artificial colorants other than riboflavin or riboflavin phosphate.

Inventive Concept 153. The article of any one of Inventive Concepts 101-152 wherein the first ink lacks non-fluorescent artificial colorants comprises at most 250 ppm or at most 150 ppm or at most 100 ppm or at most 50 ppm or at most 25 ppm or at most 15 ppm or at most 10 ppm or at most 5 ppm non-fluorescent artificial colorants.

Inventive Concept 154. The article of any one of Inventive Concepts 101-152 wherein the first ink comprises a pH controlling agent for maintaining the pH of the ink formulation (i) in the range of 2.0 to 4.0 or (ii) in the range of 2.0 to 3.8 or (iii) in the range of 2.0 to 3.6; or (iv) in the range of 2.0 to 3.5; or (v) in the range of 2.5 to 4.0 or (vi) in the range of 2.5 to 3.8 or (vi) in the range of 2.5 to 3.6; or (vii) in the range of 2.5 to 3.5; or (viii) in the range of 3.0 to 4.0 or (ix) in the range of 3.0 to 3.8 or (x) in the range of 3.0 to 3.6; or (xi) in the range of 3.0 to 3.5;

Inventive Concept 155. The article of any one of Inventive Concepts 101-154 wherein the first ink has the following properties:
(a) a glycerol concentration wt/wt of the ink formulation is at least X1% wt/wt, a value of X1 being zero or a positive number;
(b) a sorbitol concentration wt/wt of the ink formulation is at least X2% wt/wt, a value of X2 being zero or a positive number; and
(c) a sum of X1 and X2 is at least 10% or at 15% or at least 20% or at least 25% or at least 30% (e.g. at most 50% or at most 40% or at most 31%)

Inventive Concept 156. The article of any one of Inventive Concepts 101-155 wherein the first ink is ethanol-free or comprises at most 2% or at most 1% or at most 0.5% or at most 0.1% wt/wt ethanol.

Inventive Concept 157. The article of any one of Inventive Concepts 101-156 wherein the first ink further comprises riboflavin and/or riboflavin 5 phosphate, and a sum of respective concentrations of riboflavin and riboflavin 5 phosphate is at least 0.05% wt/wt.

Inventive Concept 158. The article of any one of Inventive Concepts 101-156 wherein the first ink further comprises riboflavin and/or riboflavin 5 phosphate, and a sum of respective concentrations of riboflavin and riboflavin 5 phosphate is at least 0.1% wt/wt.

Inventive Concept 159. The article of any one of Inventive Concepts 157-158 wherein a sum of respective concentrations of riboflavin and riboflavin 5 phosphate is at most 0.1% wt/wt.

Inventive Concept 160. The article of any one of Inventive Concepts 157-158 wherein a sum of respective concentrations of riboflavin and riboflavin 5 phosphate is at most 0.5 wt/wt.

Inventive Concept 161. The article of any one of Inventive Concepts 101-160 wherein under white light, a distance between an LAB value of the first ink and the LAB point (77, 11, 94) (e.g. a shade of yellow) is at least 50 or at least 55 or at least 60.

Inventive Concept 162. The article of any one of Inventive Concepts 101-156 where the first ink lacks artificial colorants, or comprises at most 1000 ppm or at most 500 ppm or at most 250 ppm or at most 150 ppm or at most 100 ppm or at most 50 ppm or at most 25 ppm artificial colorants.

Inventive Concept 163. The article of manufacture of one of Inventive Concepts 1-162 where the ink-jet cartridge is a thermal ink-jet cartridge.

164. The article of manufacture of one of Inventive Concepts 1-162 where the ink-jet cartridge is a piezo ink-jet cartridge.

Inventive Concept 165. An article of manufacture comprising:
 a. an ink-jet cartridge;
 b. an edible and aqueous ink disposed within the ink-jet cartridge and comprising black carrot extract, wherein the edible ink comprises:
  i. at least 9% wt/wt black carrot extract solids;
  ii. at least 15% wt/wt humectant and/or a sum of a wt/wt glycerol and a wt/wt sorbitol concentration is at 15% wt/wt; and
  iii. between 40% wt/wt and 80% wt/wt (e.g. between 50% wt/wt and 70% wt/wt water).

Inventive Concept 166. The article of Inventive Concept 165 wherein black carrot extract solids is the primary colorant of the edible ink.

Inventive Concept 167. An article of manufacture comprising:
 a. an ink-jet cartridge;
 b. an edible and aqueous ink disposed within the ink-jet cartridge and comprising grape solids extract, wherein the edible ink comprises:
  i. at least 8% wt/wt grape extract solids;
  ii. at least 15% wt/wt humectant and/or a sum of a wt/wt glycerol and a wt/wt sorbitol concentration is at 15% wt/wt; and
  iii between 40% wt/wt and 80% wt/wt (e.g. between 50% wt/wt and 70% wt/wt water).

168. The article of Inventive Concept 167 wherein the edible ink comprises at least 9% or at least 10% wt/wt grape extract solids.

Inventive Concept 169. The article of any one of Inventive Concepts 167-168 wherein grape extract solids is(are) is the primary colorant of the edible ink.

Inventive Concept 170. A system comprising:
 a. an ink-jet printer defining a target-location;
 b. first and second reservoirs of fluids respectively loaded with first and second fluids, wherein:
  i. the first fluid is an acidic edible ink whose color is depends a quantity of the second fluid that is mixed with the first fluid;
  ii. the second fluid is a clear solution;
 c. control circuitry for printing a digital image (e.g. a stored in computer memory) by causing the ink-jet printer to deposit, to the target location, droplets of both the first and second fluids.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification, including the appendices, are hereby incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. An article of manufacture for producing fluorescent ink-images, the article of manufacture comprising:
 a. an ink-jet cartridge; and
 b. a unfermented-wort-based ink formulation disposed within the ink-jet cartridge, the ink formulation comprising:
  i. between 0.05% and 1% wt/wt riboflavin and/or riboflavin phosphate as a fluorophore;
  ii. an unfermented wort;
  iii. a humectant for providing moisture-retention; and
  iv. a pH controlling agent for maintaining a pH of the ink formulation at or below 4.0;
 wherein ink formulation is edible, aqueous and has all of the following structural properties:
  i. the unfermented wort is the primary colorant of the ink formulation;
  ii. a 25° C. viscosity of the ink formulation is at most 7 centipoise;
  iii. the ink formulation is characterized by an EBC (European Brewing Convention) number of at least 1800 colorant units; and
  iv. a ratio between the EBC number of the ink formulation and the 25° C. viscosity thereof is at least (centipoise)$^{-1}$ is at least 350.

2. The article of claim 1 wherein the EBC of the formulation is at least 2500 colorant units, and wherein the ink is ethanol-free or wherein a ratio between (i) wt/wt content of ethanol in the ink; and (ii) a ratio of a sum of glycerol and glycerin wt/wt contents is at most 3 or at most 2 or at most 1.5 or at most 1 or at most 0.5.

3. The article of claim 1, wherein under white light the ink is brown or reddish brown a shade therebetween, and wherein under black light, the riboflavin and/or riboflavin phosphate is a primary fluorophore of the ink.

4. The article of claim 1 wherein under white light conditions a distance between an LAB value of the ink and the LAB point (77, 11, 94) is at least 50 or at least 55 or at least 60.

5. The article of claim 1 wherein the unfermented-wort-based ink formulation comprises between 0.05% and 0.5% or between 0.05% and 0.4% or between 0.05% and 0.3% wt/wt riboflavin and/or riboflavin phosphate.

6. The article of claim 1 wherein a ratio between (i) a visible-range optical density due to a presence of the wort in the edible ink; and (ii) a visible-range optical density due to a presence of the fluorophore(s) in the edible ink is a least 1.5 or at least 2 or at least 3.

7. The article of claim 1 wherein a ratio between (i) a visible- range optical density due to a presence of the natural-colorant-bearing plant matter in the edible ink; and (ii) a visible-range optical density due to a presence of the edible(s) in the debit ink is a least 1.5 or at least 2 or at least 3.

8. A method of printing comprising:
Providing the article of manufacture of claim 1; and
Forming an ink-image on or in a target substrate or an edible substrate such as a surface of a food or a beverage by droplet-deposition thereon or therein of the edible ink.

9. The method of claim 8 wherein the ink-image is edible.

10. The method of claim 8 further comprising viewing the ink-image under black light or under 450-nm-tuned LED light and/or viewing the ink-image in black-light conditions.

11. The method of claim 8 wherein under visible light the ink-image is monochromatic and under black light or 450-nm-tuned LED light the ink-image is multi-color.

12. The method of claim 8 wherein the ink-image is formed only from the edible ink and is a single-reservoir-generated ink-image.

13. A method of printing, the method comprising
  a. providing an edible ink comprising natural-colorant-bearing plant matter and a fluorophore;
  b. receiving a digital image, for example stored in computer-memory, the digital being providing non-uniform-geometry and/or non-uniform color features;
  c. depositing droplets of the edible ink onto or into a surface of a substrate, the substrate being edible, so as to convert the digital image into an ink image which is monochrome under white light but multi-color under black light or 450-nm-LED light, wherein:
  i. the ink image of formed by performing only single-reservoir droplet-deposition of the edible ink.

14. The method of claim 13 wherein: :
  ii. the printing is performed to enforce a mapping which maps colors or geometric features of the digital image into black-light-visible colors.

15. The method of claim 13 wherein the enforcing is carried out by targeting black-light-viewable colors by modulating at least of a density of droplets of the edible ink, and a droplet-size.

16. The method of claim 13, wherein the edible substrate is a foam.

17. A method of printing, the method comprising:
  a. providing an article of manufacture comprising:
    (i). an ink-jet cartridge; and
    (ii). an edible and aqueous ink disposed within the ink-jet cartridge, the edible ink formulation comprising a fluorophore;
  b. receiving, into a digital computer, a color-print directive to:
    (i) print a first portion of digital image and/or a first group of pixels and/or a first
    Image subsection in a first color; and
    (ii) print a first portion of digital image and/or a second group of pixels and/or a second image subsection in a second color;
  c. providing multi-color but single-ink calibration data describing a relationship between: (i) coverage fraction or line-thickness within ink-image to be printed: and (ii) a predicted color of a group pixels when printed at the coverage fraction when viewed under black light conditions;
  d. enforcing the color-print directive by depositing droplets of the edible and aqueous ink, the from the ink-jet cartridge, the droplets deposited onto a target surface by modulating droplet density and/or droplet
    size and/or grey-scale of portion of the ink-image wherein: in response to print in
    the first color, droplet size and/or density and/or coverage fraction and/or grey scale
    is increased,
    and in response to print in the second color, droplet size and/or density and/or coverage fraction and/or grey-scale is decreased,
    wherein the droplets of the edible ink are deposited at coverage fractions and/or to produce line-thicknesses that are determined so as to enforce the multi-coloring directive in accordance with multi-color but single-ink calibration data.

18. The method of claim 17 wherein step b is performed to print a single-ink image where the only a single ink is deposited to form the image.

19. The method claim 17 wherein step b is performed to print an image which is monochromatic when viewed under white light and multi-color when viewed under black light.

20. The method of claim 17, wherein the target substrate is a foam.

* * * * *